US006487500B2

(12) United States Patent
Lemelson et al.

(10) Patent No.: US 6,487,500 B2
(45) Date of Patent: *Nov. 26, 2002

(54) GPS VEHICLE COLLISION AVOIDANCE WARNING AND CONTROL SYSTEM AND METHOD

(76) Inventors: Jerome H. Lemelson, 930 Tahoe Blvd., Unit 802, Suite 286, Incline Village, NV (US) 89451-9436; Robert D. Pedersen, 7808 Glenneagle, Dallas, TX (US) 75248

( * ) Notice: Subject to any disclaimer, the term of this patent is extended or adjusted under 35 U.S.C. 154(b) by 0 days.

This patent is subject to a terminal disclaimer.

(21) Appl. No.: 09/923,252

(22) Filed: Aug. 2, 2001

(65) Prior Publication Data

US 2002/0022927 A1 Feb. 21, 2002

Related U.S. Application Data

(63) Continuation of application No. 09/436,097, filed on Nov. 8, 1999, now Pat. No. 6,275,773, and a continuation of application No. 08/717,807, filed on Sep. 24, 1996, now Pat. No. 5,983,161, which is a continuation-in-part of application No. 08/105,304, filed on Aug. 11, 1993, now abandoned.

(51) Int. Cl.$^7$ ............................................. G01C 21/26
(52) U.S. Cl. ........................... 701/301; 701/27; 701/98; 701/214; 340/903; 340/436
(58) Field of Search .............................. 701/23, 24, 27, 701/200, 213, 214, 93, 98, 300, 301; 340/903, 905, 435, 436; 342/29, 41, 454, 455; 180/167–170

(56) References Cited

U.S. PATENT DOCUMENTS

| 3,892,438 A | 7/1975 | Saufferer ........................ 356/4 |
| 4,257,703 A | 3/1981 | Goodrich ........................ 356/4 |
| 4,384,293 A | 5/1983 | Deem et al. ................. 343/113 |
| 4,418,350 A | 11/1983 | Rosen ........................ 343/359 |

(List continued on next page.)

FOREIGN PATENT DOCUMENTS

| JP | 4-15799 | 1/1992 |
| JP | 4-2199002 | 8/1992 |
| JP | 5-124529 | 5/1993 |
| JP | 5-143897 | 6/1993 |

OTHER PUBLICATIONS

Kitter, Josef, "Image Processing and System Architectures" (video). 1985, John Wiley & Sons.

(List continued on next page.)

Primary Examiner—Gary Chin
(74) Attorney, Agent, or Firm—Douglas W. Rudy

(57) ABSTRACT

GPS satellite (4) ranging signals (6) received (32) on comm1, and DGPS auxiliary range correction signals and pseudolite carrier phase ambiguity resolution signals (8) from a fixed known earth base station (10) received (34) on comm2, at one of a plurality of vehicles/aircraft/automobiles (2) are computer processed (36) to continuously determine the one's kinematic tracking position on a pathway (14) with centimeter accuracy. That GPS-based position is communicated with selected other status information to each other one of the plurality of vehicles (2), to the one station (10), and/or to one of a plurality of control centers (16), and the one vehicle receives therefrom each of the others' status information and kinematic tracking position. Objects (22) are detected from all directions (300) by multiple supplemental mechanisms, e.g., video (54), radar/lidar (56), laser and optical scanners. Data and information are computer processed and analyzed (50,52,200,452) in neural networks (132, FIGS. 6–8) in the one vehicle to identify, rank, and evaluate collision hazards/objects, an expert operating response to which is determined in a fuzzy logic associative memory (484) which generates control signals which actuate a plurality of control systems of the one vehicle in a coordinated manner to maneuver it laterally and longitudinally to avoid each collision hazard, or, for motor vehicles, when a collision is unavoidable, to minimize injury or damage therefrom. The operator is warned by a heads up display and other modes and may override. An automotive auto-pilot mode is provided.

33 Claims, 18 Drawing Sheets

U.S. PATENT DOCUMENTS

| | | | |
|---|---|---|---|
| 4,549,181 A | 10/1985 | Tachibana et al. | 340/904 |
| 4,611,209 A | 9/1986 | Lemelson et al. | 343/6.6 |
| 4,621,705 A | 11/1986 | Etoh | 180/169 |
| 4,623,966 A | 11/1986 | O'Sullivan | 364/461 |
| 4,626,850 A | 12/1986 | Chey | 340/903 |
| 4,644,358 A | 2/1987 | Sekine | 342/356 |
| 4,673,937 A | 6/1987 | Davis | 342/72 |
| 4,681,431 A | 7/1987 | Sims et al. | 356/4 |
| 4,703,429 A | 10/1987 | Sakata | 364/426 |
| 4,719,469 A | 1/1988 | Beier et al. | 342/434 |
| 4,731,613 A | 3/1988 | Endo et al. | 342/357 |
| 4,741,245 A | 5/1988 | Malone | 89/41.03 |
| 4,743,913 A | 5/1988 | Takai | 342/357 |
| 4,751,512 A | 6/1988 | Longaker | 341/357 |
| 4,757,450 A | 7/1988 | Etoh | 364/426 |
| 4,758,959 A | 7/1988 | Thoone et al. | 364/454 |
| 4,785,463 A | 11/1988 | Janc et al. | 375/1 |
| 4,786,164 A | 11/1988 | Kawata | 356/4 |
| 4,812,991 A | 3/1989 | Hatch | 364/458 |
| 4,814,711 A | 3/1989 | Olsen et al. | 324/331 |
| 4,825,211 A | 4/1989 | Park | 340/941 |
| 4,833,469 A | 5/1989 | David | 340/901 |
| 4,835,537 A | 5/1989 | Manion | 342/30 |
| 4,837,700 A | 6/1989 | Ando et al. | 364/449 |
| 4,849,731 A | 7/1989 | Melocik | 340/435 |
| 4,870,422 A | 9/1989 | Counselman, III | 342/357 |
| 4,872,051 A | 10/1989 | Dye | 358/103 |
| 4,884,208 A | 11/1989 | Marinelli et al. | 364/460 |
| 4,894,662 A | 1/1990 | Counselman | 342/357 |
| 4,899,285 A | 2/1990 | Nakayama et al. | 364/453 |
| 4,901,362 A | 2/1990 | Terzian | 382/22 |
| 4,912,645 A | 3/1990 | Kakihara et al. | 364/449 |
| 4,918,442 A | 4/1990 | Bogart, Jr. | 340/961 |
| 4,918,609 A | 4/1990 | Yamawaki | 364/449 |
| 4,926,103 A | 5/1990 | Summerville et al. | 318/587 |
| 4,926,170 A | 5/1990 | Beggs et al. | 340/904 |
| 4,926,171 A | 5/1990 | Kelley | 340/961 |
| 4,928,107 A | 5/1990 | Kuroda et al. | 342/357 |
| 4,931,937 A | 6/1990 | Kahinami et al. | 364/424 |
| 4,933,852 A | 6/1990 | Lemelson | 364/424 |
| 4,949,089 A | 8/1990 | Ruszkowski, Jr. | 342/52 |
| 4,949,268 A | 8/1990 | Nishikawa et al. | 364/449 |
| 4,954,833 A | 9/1990 | Evans et al. | 342/357 |
| 4,954,959 A | 9/1990 | Moroto et al. | 364/449 |
| 4,963,889 A | 10/1990 | Hatch | 342/357 |
| 4,965,583 A | 10/1990 | Broxmeyer | 342/42 |
| 4,969,038 A | 11/1990 | Lemelson | 358/107 |
| 4,979,029 A | 12/1990 | Lemelson | 358/93 |
| 4,994,812 A | 2/1991 | Uematsu et al. | 342/359 |
| 5,003,317 A | 3/1991 | Gray et al. | 342/357 |
| 5,014,206 A | 5/1991 | Scribner et al. | 364/449 |
| 5,018,689 A | 5/1991 | Yasunobu et al. | 246/182 B |
| 5,032,845 A | 7/1991 | Velasco | 342/457 |
| 5,036,329 A | 7/1991 | Ando | 342/357 |
| 5,039,217 A | 8/1991 | Maekawa et al. | 356/1 |
| 5,043,736 A | 8/1991 | Darnell et al. | 342/357 |
| 5,055,851 A | 10/1991 | Sheffer | 342/457 |
| 5,081,585 A | 1/1992 | Kurami et al. | 364/424.02 |
| 5,087,919 A | 2/1992 | Odagawa et al. | 342/357 |
| 5,091,726 A | 2/1992 | Shyu | 340/904 |
| 5,101,356 A | 3/1992 | Timothy et al. | 364/449 |
| 5,119,101 A | 6/1992 | Barnard | 342/357 |
| 5,119,102 A | 6/1992 | Barnard | 342/357 |
| 5,119,301 A | 6/1992 | Shimizu et al. | 364/450 |
| 5,119,504 A | 6/1992 | Durboraw, III | 455/54.1 |
| 5,122,796 A | 6/1992 | Beggs et al. | 340/904 |
| 5,129,605 A | 7/1992 | Burns et al. | 246/5 |
| 5,142,573 A | 8/1992 | Barnea et al. | 364/449 |
| 5,146,219 A | 9/1992 | Zechnall | 340/995 |
| 5,146,231 A | 9/1992 | Ghaem et al. | 342/419 |
| 5,148,179 A | 9/1992 | Allison | 342/357 |
| 5,148,452 A | 9/1992 | Kennedy et al. | 375/96 |
| 5,153,836 A | 10/1992 | Fraughton et al. | 364/461 |
| 5,155,491 A | 10/1992 | Ando | 342/357 |
| 5,155,688 A | 10/1992 | Tanaka et al. | 364/454 |
| 5,161,107 A | 11/1992 | Mayeaux et al. | 364/436 |
| 5,164,904 A | 11/1992 | Sumner | 364/436 |
| 5,165,497 A | 11/1992 | Chi | 180/169 |
| 5,177,462 A | 1/1993 | Kajiwara | 340/435 |
| 5,177,489 A | 1/1993 | Hatch | 342/357 |
| 5,177,490 A | 1/1993 | Ando et al. | 342/357 |
| 5,179,377 A | 1/1993 | Hancock | 340/961 |
| 5,179,519 A | 1/1993 | Adachi et al. | 364/449 |
| 5,181,038 A | 1/1993 | Asbury et al. | 342/70 |
| 5,185,606 A | 2/1993 | Verbaarshot et al. | 340/961 |
| 5,185,610 A | 2/1993 | Ward et al. | 342/357 |
| 5,185,761 A | 2/1993 | Kawasaki | 375/1 |
| 5,187,485 A | 2/1993 | Tsui et al. | 342/357 |
| 5,187,805 A | 2/1993 | Bertiger et al. | 455/12.1 |
| 5,189,426 A | 2/1993 | Asbury et al. | 342/70 |
| 5,189,619 A | 2/1993 | Adachi et al. | 364/426.04 |
| 5,194,871 A | 3/1993 | Counselman, III | 342/357 |
| 5,197,562 A | 3/1993 | Kakinami et al. | 180/169 |
| 5,203,030 A | 4/1993 | Kawasaki | 455/164.2 |
| 5,210,540 A | 5/1993 | Masumoto | 342/357 |
| 5,220,509 A | 6/1993 | Takemura et al. | 364/449 |
| 5,220,876 A | 6/1993 | Monson et al. | 111/130 |
| 5,222,245 A | 6/1993 | Ando et al. | 455/13.2 |
| 5,223,844 A | 6/1993 | Mansell et al. | 342/357 |
| 5,225,842 A | 7/1993 | Brown et al. | 342/357 |
| 5,230,400 A | 7/1993 | Kakinami et al. | 180/169 |
| 5,235,316 A | 8/1993 | Qualizza | 340/436 |
| 5,235,633 A | 8/1993 | Dennison et al. | 379/60 |
| 5,247,440 A | 9/1993 | Capurka et al. | 364/424 |
| 5,248,968 A | 9/1993 | Kelly et al. | 340/961 |
| 5,248,981 A | 9/1993 | Yoshihara et al. | 342/357 |
| 5,249,157 A | 9/1993 | Taylor | 340/903 |
| 5,257,195 A | 10/1993 | Hirata | 364/449 |
| 5,270,936 A | 12/1993 | Fukushima et al. | 364/444 |
| 5,272,483 A | 12/1993 | Kato | 342/357 |
| 5,276,451 A | 1/1994 | Odagawa | 342/357 |
| 5,276,620 A | 1/1994 | Bottesch | 364/424.05 |
| 5,278,764 A | 1/1994 | Iizuka et al. | 364/461 |
| 5,283,575 A | 2/1994 | Kao et al. | 701/200 |
| 5,283,743 A | 2/1994 | Odagawa | 364/457 |
| 5,291,196 A | 3/1994 | Defour | 340/961 |
| 5,293,163 A | 3/1994 | Kakihara et al. | 340/995 |
| 5,293,318 A | 3/1994 | Fukushima | 364/449 |
| 5,296,861 A | 3/1994 | Knight | 342/357 |
| 5,298,882 A | 3/1994 | Tsai | 340/468 |
| 5,301,368 A | 4/1994 | Hirata | 455/78 |
| 5,302,956 A | 4/1994 | Asbury et al. | 342/70 |
| 5,304,980 A | 4/1994 | Maekawa | 340/435 |
| 5,307,136 A | 4/1994 | Saneyoshi | 356/1 |
| 5,307,271 A | 4/1994 | Everett, Jr. et al. | 364/424.02 |
| 5,311,195 A | 5/1994 | Mathis et al. | 342/357 |
| 5,311,197 A | 5/1994 | Sorden et al. | 342/457 |
| 5,314,037 A | 5/1994 | Shaw et al. | 180/169 |
| 5,317,323 A | 5/1994 | Kennedy et al. | 342/457 |
| 5,317,515 A | 5/1994 | Matsuzaki | 364/454 |
| 5,325,302 A | 6/1994 | Izidon et al. | 364/454 |
| 5,327,117 A | 7/1994 | Kohsaka | 340/525 |
| 5,332,057 A | 7/1994 | Butsuen et al. | 180/169 |
| 5,334,974 A | 8/1994 | Simms et al. | 340/990 |
| 5,334,986 A | 8/1994 | Fernhout | 342/357 |
| 5,334,987 A | 8/1994 | Teach | 342/357 |
| 5,339,075 A | 8/1994 | Abst et al. | 340/903 |
| 5,339,246 A | 8/1994 | Kao | 364/357 |
| 5,341,301 A | 8/1994 | Shirai et al. | 364/449 |
| 5,341,344 A | 8/1994 | O'Brien et al. | 367/96 |
| 5,344,105 A | 9/1994 | Youhanaie | 244/3.14 |

| | | |
|---|---|---|
| 5,347,286 A | 9/1994 | Babitch ...................... 342/359 |
| 5,357,438 A | 10/1994 | Davidian .................... 364/461 |
| 5,359,332 A | 10/1994 | Allison et al. .............. 342/357 |
| 5,359,528 A | 10/1994 | Haendel et al. ........ 364/424.04 |
| 5,365,450 A | 11/1994 | Schuchman et al. ........ 364/449 |
| 5,369,591 A | 11/1994 | Broxmeyer ................ 364/461 |
| 5,374,059 A | 12/1994 | Kyrtsos et al. ............. 364/449 |
| 5,379,045 A | 1/1995 | Gilbert et al. .............. 342/357 |
| 5,381,338 A | 1/1995 | Wysocki et al. ............ 364/449 |
| 5,383,127 A | 1/1995 | Shibata ....................... 364/449 |
| 5,387,916 A | 2/1995 | Cohn ........................... 342/44 |
| 5,389,934 A | 2/1995 | Kass ............................ 342/357 |
| 5,390,124 A | 2/1995 | Kyrtsos ...................... 364/449 |
| 5,390,125 A | 2/1995 | Sennott et al. .............. 364/449 |
| 5,394,333 A | 2/1995 | Kao ............................ 364/450 |
| 5,396,540 A | 3/1995 | Gooch ......................... 379/59 |
| 5,400,254 A | 3/1995 | Fujita ......................... 364/449 |
| 5,406,489 A | 4/1995 | Timothy et al. ............ 364/434 |
| 5,416,712 A | 5/1995 | Geier et al. ................. 364/450 |
| 5,418,537 A | 5/1995 | Bird ............................ 342/357 |
| 5,422,813 A | 6/1995 | Schuchnan et al. ......... 364/449 |
| 5,430,656 A | 7/1995 | Dekel et al. ................. 364/449 |
| 5,434,787 A | 7/1995 | Okamoto et al. ........... 364/449 |
| 5,434,788 A | 7/1995 | Seymour et al. ............ 701/214 |
| 5,436,835 A | 7/1995 | Emry .................... 364/426.01 |
| 5,438,337 A | 8/1995 | Aguado ....................... 342/357 |
| 5,438,517 A | 8/1995 | Sennott et al. .............. 364/449 |
| 5,545,960 A | 8/1996 | Ishikawa .................... 318/587 |
| 5,596,332 A | 1/1997 | Coles et al. ................. 701/301 |
| 5,774,831 A | 6/1998 | Gupta ......................... 701/214 |
| 5,983,161 A * | 11/1999 | Lemelson et al. .......... 701/301 |
| 6,275,773 B1 * | 8/2001 | Lemelson et al. .......... 701/301 |

OTHER PUBLICATIONS

Soucek, B. "Neural and Massively Parallel Computers", 1988, John Wiley & Sons, New York, p. 245–273.

Wasserman, Philip. "Neural Computing Theory and Practice", 1989, Van Norstrand Reinhold, New York.

Teuber, Jan. *Digital Image Processing*, 1989 Teknisk Forlag A/S (Danish Technical Press), 1993 1$^{st}$ English edition Prentice Hall International (UK) Ltd., p. 1–255.

Suaya, Robert. "VLSI and Parallel Computation and Neural Networks", 1990, Morgan Kauffman Publishing, San Mateo, California.

Pearson, Don. "Image Processing", 1991, McGraw Hill, New York.

Carpenter, Gail. "Neural Networks for Vision and Image Processing", 1992, MIT Press, Cambridge, Mass.

Masaki, Ichiro. "Vision Based Vehicle Guidance", 1992, Springer–Verhling, New York, p. 1–47.

Lisboa, P.G.J. "Neural Networks", 1992, Chapman Hall; New York.

Fenton, Robert. "On Future Traffic Control: Advanced Systems Hardware", *IEEE Transactions on Vehicular Technology*, May 1980, vol. VT 29, No. 2.

MacAdams, Charles. "Application of an Optimal Preview Control for Simulation of Closed Loop Automobile Driving", *IEEE Transactions on System, Man & Cybernetics*, Jun. 1981, vol. SMC–11, No. 6.

Belohoubek, Erwin F. "Radar Control for Automotive Collision Mitigation and Headway Spacing", *IEEE Transportation on Vehicular Technology*, May 1982, vol. 31, No. 2.

Dickmanns, E. D. "Guiding Land Vehicles Along Roadways and Computer Vision", p. 233–245.

Hatwal, H. "Some Inverse Solutions to an Automobile Path–Tracking Problem with Input Control of Steering and Brakes", *Vehicle Systems Dynamics*, 1986, vol. 15, p. 61–71.

Lippmann, Richard P. "An Introduction to Computing with Neural Nets", *IEEE ASSP*, Apr. 1987, vol. 4, No. 2, p. 4–23.

Maresca, Massimo. "Parallel Architectures for Vision", *Proceedings of the IEEE*, Aug. 1988, vol. 76, No. 8, p. 970–981.

LeMoigne, Jacqueline. "Domain–Dependent Reasoning for Visual Navigation of Roadways", *IEEE Journal of Robotics and Automation*, Aug. 1988, vol. 4, No. 4, pp. 419–427.

Aggarwal, J.K. "On the Computation of Motion from Sequences of Images—A Review", *Proceedings of the IEEE*, Aug. 1988, vol. 76, No. 8, p. 416–435.

Kuan, Darwin. "Autonomous Robotic Vehicle Road Following", *IEEE Transactions on Paterns Analysis and Maching Intelligence*, Sep. 1988, vol. 76, No. 5, p. 648–658.

Krakiwsky, Edward. "A Kalman Filter for Integrating Dead Reckoning, Map Matching and GPS Positioning", *IEEE Plans '88 Position Location and Navigation Symposium Record*, Nov. 29, 1988–Dec. 2, 1988, p. 39–46.

Alspector, Joshua. "Neural–Style Microsystem that Learn", *IEEE Communication*, Nov. 1989, vol. 27, No. 11, p. 29–35.

Roth, Michael. "System Neural Networks for Extraction of Weak Targets in High Clutter Environments", *IEEE System, Man and Cybernetics Society*, Sep. 1989, vol. 19, No. 5, p. 1210–1217.

Psaltis, Demetri. "Optoelectronic Implementation of Neural Networks", *IEEE Communication*, Nov. 1989, vol. 27, No. 11, p. 37–40.

Abu–Mostafa, Yaser. "Information Theory, Complexity and Neural Networks", *IEEE Communication*, Nov. 1989, vol. 27, No. 11, p. 25–28.

Lippman, Richard. "Pattern Classification Using Neural Networks", *IEEE Communication*, Nov. 1989, vol. 27, No. 11, p. 46–65.

Yuhas, Ben. "Integration of Acoustic and Visual Speech (Lipreading) Signals Using Neural Networks", *IEEE Spectrum Smart Highways*, Nov. 1989, vol. 27, No. 11, p. 65–71.

Lupo, Jasper. "Defense Application of Neural Networks", *IEEE Communication*, Nov. 1989, vol. 27, No. 11, p. 82–88.

Lee, Chuen. "Fuzzy Logic in Control Systems", *IEEE System, Man and Cybernetics*, Mar. 1991, vol. 20, No. 2, p. 419–433.

Bender, James. "An Overview of System Studies of Automated Highways Systems (AHS)", *IEEE Transactions on Vehicular Technology*, Feb. 1991, vol. 40, No. 1, p. 82–97.

Jurgen, Ronald. "Smart Cars and Highways Go Global", *IEEE Spectrum Smart Highways*, May 1991, vol. 28, No. 5, p. 26–37.

Aurrand–Lions, J.P. "Application of Fuzzy Control for ISIS Vehicle Braking", *Peugot S.A. Direction des Recherches et Affaires Scientifiques, 78140 Velizy, France*, Nov. 1991, Paper #32, p. 1–7.

Nijhuis, Jos. "Evaluation of Fuzzy and Neural Vehicle Control for an Automated Guided Vehicle", *IEEE Technology Update Series/Fuzzy Logic Technology and Applications*, 1994, p. 50–55.

Sabharwal, Deepak. "Design of Rule–Based Fuzzy Controller for the Pitch Axis for an Unmanned Research Vehicle", *IEEE Technology Update Series/Fuzzy Logic Technology and Applications*, 1994, p. 81–87.

Maeda, Yoichiro. "Hierarchical Control for Autonomous Mobile Robots with Behavior–Decision Fuzzy Algorithm", *Proceedings of the 1992 IEEE International Conference on Robotics and Automation, Nice, France*, May 1992, p. 135–139.

Pin, Francois. "Autonomous Navigation of a Mobile Robot Using Custom–Designed Qualitative Reasoning VLSI Chips and Boards", *Proceedings of the 1992 IEEE International Conference on Robotics and Automation, Nice, France*, May 1992, p. 319–324.

"NHTSA IVHS Plan", *National Highway Traffic Safety Administration U.S. Department of Transportation*, Jun. 1992.

Song, Kai–Tai. "Fuzzy Navigation of a Mobile Robot", *Proceedings of the IEEE/RSI International Conference on Intelligent Robot System*, Jul. 1992, p. 141–147.

Sekine, Nanabu. "Design Method for an Automotive Laser Radar System and Future Prospects for Laser Radar", *Proceedings of the IEEE Intelligent Vehicles Symposium, Detroit*, 1992, p. 120–125.

Schwartz, Daniel. Fuzzy Logic Flowers in Japan:, *IEEE Spectrum Dec Bets on 'Alpha'*, Jul. 1992, vol. 29, No. 7, p. 32–35.

Hartmann, G. "A Hierarchical Vision System", *Proceedings of the IEEE Intelligent Vehicle Systems Symposium, Detroit*, 1992, p. 18–23.

Suzuki, Akihiro. "Lane Recognition for Guiding of Autonomous Vehicle", *Proceedings of the IEEE Intelligent Vehicle Symposium, Detroit*, 1992, p. 196–201.

Altan, O.D. "Computer Architecture and Implementation of Vision Based Real–Time Lane Sensing", *Proceedings of the IEEE Intelligent Vehicle Symposium, Detroit*, 1992, p. 202–206.

Ito, Toshio. "A Real–Time Distance Headway Measurement Method Using Stereo and Optical Flow", *Proceedings of the IEEE Intelligent Vehicle Symposium, Detroit*, 1992, p. 230–235.

Ooka, Naota. "Development of Automatic Driving System on Rough Road–Fault Tolerance Structure for Electronic Computer", *Proceedings of the IEEE Intelligent Vehicle Symposium, Detroit*, 1992, p. 160–165.

Marko, Kenneth. "Application of Genetic Programming to Control of Vehicle Systems", *Proceedings of the IEEE Intelligent Vehicle Symposium*, Detroit, 1992, p. 191–195.

Bruyelle, J.L. "Disparity Analysis for Real–Time Obstacle Detection by Linear Stereo Vision", *Proceedings of the IEEE Intelligent Vehicle Symposium, Detroit*, 1992, p. 51–56.

Siegle, G. "Autonomous Driving on a Road Network", *Proceedings of the IEEE Intelligent Vehicles Symposium, Detroit*, 1992, p. 403–408.

Hashimoto, Kinshiro. "An Image Processing Architecture and a Motion Control Method for an Autonomous Vehicle", *Proceedings of the IEEE Intelligent Vehicles Symposium, Detroit*, 1992, p. 213–218.

Ulmer, Berthound. "VITA—An Autonomous Road Vehicle (ARV) for Collision Avoidance in Traffic", *Proceedings of the IEEE Intelligent Vehicles Symposium, Detroit*, 1992, p. 36–41.

Riseman, E.M. "Visual Processing for Vehicle Control Functions", *Proceedings of the IEEE Vehicles Symposium, Detroit*, 1992, p. 397–402.

Schwarzinger, Michael. "Vision Based Car–Following: Detection, Tracking and Identification", *Proceedings of the IEEE Intelligent Vehicles Symposium, Detroit*, 1992, p. 24–29.

Lubin, Joseph. "Lateral Control of an Autonomous Road Vehicle in a Simulated Highway Environment Using Adaptive Resonance Neural Networks", *Proceedings of the IEEE Intelligent Vehicles Symposium, Detroit*, 1992, p. 85–91.

Hatsopoulous, Nicholas. "Collision Avoidance System Based on Optical Flow", *Proceedings of the IEEE Intelligent Vehicles Symposium, Detroit*, 1992, p. 79–82.

Pomerleau, Dean. "Progress in Neural Network–based vision for Autonomous Robot Driving", *Proceedings of the IEEE Intelligent Vehicles Symposium, Detroit*, 1992, p. 79–82.

Nguyen, H. G. "Obstacle Detection Using Bi–Spectrum CCD Camera and Image Processing", *Proceedings of the IEEE Intelligent Vehicles Symposium, Detroit*, 1992, p. 42–62.

Yung, Gin–Shu. "Obstacle Detection for a Vehicle Using Optical Flow", *Proceedings of the IEEE Intelligent Vehicles Symposium, Detroit*, 1992, p. 185–190.

Yu, Xuan. "Road Tracking, Lane Segmentation and Other Recognition by Mathematical Morphology", *Proceedings of the IEEE Intelligent Vehicles Symposium, Detroit*, 1992, p. 166–172.

Hattori, Akira. "Driving Control System for an Autonomous Vehicle Using Multiple Observed Point Information", *Proceedings of the IEEE Intelligent Vehicles Symposium, Detroit*, 1992, p. 207–212.

Ohinishi, Kenichi. "Development of Automatic Driving on Rough Road–Realization of High Reliable Automatic Driving System", *Proceedings of the IEEE Intelligent Vehicles Symposium, Detroit*, 1992, p. 148–153.

Efenberger, Wolfgang. "Automatic Recognition of Vehicles Approaching from Behind", *Proceedings of the IEEE Intelligent Vehicles Symposium, Detroit*, 1992, p. 57–62.

Hassoun, M. "Reactive Motion Planning for an Intelligent Vehicle", *Proceedings of the IEEE Intelligent Vehicles Symposium, Detroit*, 1992, p. 259–264.

Gareth, Funk–Lea. "Vision for Vehicle Guidance Using Two Road Cues", *Proceedings of the IEEE Intelligent Vehicle Symposium*, 1992, p. 126–131.

Cox, Earl. "Fuzzy Fundamentals Applicable to Auto Braking systems", *IEEE Spectrum E–Mail Pervasive and Persuasive*, Nov. 1992, vol. 29, No. 10, p. 58–61.

Enkelman, W., "Realization of a Driver's Warning Assistance for Intersections", *Proceedings of the IEEE Intelligent Vehicles Symposium, Tokyo*, 1993, p. 72–77.

Graefe, Volker. "Vision for Intelligent Road Vehicles", *Proceedings of the IEEE Intelligent Vehicles Symposium, Tokyo*, 1993, p. 135–140.

Nashman, Marilyn. "Real–Time Visual Processing for Autonomous Driving", *Proceedings of the IEEE Intelligent Vehicles Symposium, Tokyo*, 1993, p. 373–378.

Saneyoshi, Keiji. "3–D Image Recognition System for Drive Assist", *Proceedings of the IEEE Intelligent Vehicles Symposium, Tokyo*, 1993, p. 60–65.

DeMicheli, E. "Vehicle Guidance from One Dimensional Optical Flow", *Proceedings of the IEEE Intelligent Vehicles Symposium, Tokyo*, 1993, p. 183–188.

Gomi, Takashi. "Collision Avoidance Using Behavioral––Based AI Techniques", *Proceedings of the IEEE Intelligent Vehicles Symposium, Tokyo*, 1993, p. 141–145.

Madau, D.P. "Fuzzy Logic Anti–Lock Brake System for a Limited Range Coefficient of Friction Surface", *IEEE Technology Update Series/Fuzzy Logic Technology and Applications*, 1994, p. 68–73.

Yokoyama, Tatsuaki. "Automated Vehicle System Using Both a Computer Vision and Magnetic Field Sensors", *Proceedings of the IEEE Intelligent Vehicle Symposium, Tokyo*, 1993, p. 157–162.

Romano, Maurizio. "Real–Time Visual Reflex for Autonomous Navigation", *Proceedings of the IEEE Intelligent Vehicles Symposium, Tokyo*, 1993, p. 50–55.

Yokoi, Hiroshi. "An Approach to Avoiding Obstacle Problem by the Vibrating Potential Method", *Proceedings of the IEEE Intelligent Vehicles Symposium, Tokyo*, 1993, p. 235–239.

Campani, M. "Visual Routines for Outdoor Navigation", *Proceedings of the IEEE Intelligent Vehicles Symposium, Tokyo*, 1993, p. 107–112.

Tomita, Kohju. "Preview Lateral Control with Machine Vision for Intelligent Vehicle", *Proceedings of the IEEE Intelligent Vehicles Symposium, Tokyo*, 1993, p. 467–472.

Zhao, Guo–Wei. "Obstacle Detection by Vision System for an Autonomous Vehicle", *Proceedings of the IEEE Intelligent Vehicles Symposium, Tokyo*, 1993, p. 31–36.

Arain, Manzoor A. "Action Planning for the Collision Avoidance System Using Neural Networks", *Proceedings of the IEEE Intelligent Vehicles Symposium, Tokyo*, 1993, p. 119–124.

Kim, K.I. "An Autonomous Land Vehicle: Design Concept and Preliminary Road Test Results", *Proceedings of the IEEE Intelligent Vehicles Symposium, Tokyo*, 1993, p. 146–151.

Braithwaite, R. Neil "A Vehicle Steering Algorithm Based on Bearing Measurements", *Proceedings of the IEEE Intelligent Vehicles Symposium, Tokyo*, 1993, p. 287–292.

Liu, Lurng–Kuo. "Real–Time Neural Vision for Vehicle Navigation and Safety", *Proceedings of the IEEE Intelligent Vehicles Symposium, Tokyo*, 1993, p. 283–286.

Pomerleau, Dean. "Neural Network for Intelligent Vehicles", *Proceedings of the IEEE Intelligent Vehicles Symposium, Tokyo*, Jul. 1993, p. 19–24.

Mori, Hideo. "Recent Progress in Mobile Robot Harunobu", *Proceedings of the IEEE Intelligent Vehicles Symposium, Tokyo*, Jul. 1993, p. 169–176.

Ito, Toshio. "Preceding Vehicle Algorithm Using Fusion of Laser Radar and Image Processing", *Proceedings of the IEEE Intelligent Vehicles Symposium, Tokyo*, Jul. 1993, p. 420–425.

Mertsching, Barbel. "Interpretation of Traffic Scenes Using A Hierarchical Data Structure", *Proceedings of the IEEE Intelligent Vehicles Symposium, Tokyo*, Jul. 1993, p. 163–168.

Sukthanker, Rahul. "RACCOON Vision Based System tracks Taillights at Night for Road Following", *Proceedings of the IEEE Intelligent Vehicles Symposium, Tokyo*, Jul. 1993, p. 37–42.

Kamat, H. "Hough Transform for Vehicle Identification", *Proceedings of the IEEE Intelligent Vehicles Symposium, Tokyo*, Jul. 1993, p. 231–234.

Hush, Don. "Progress in Supervised Neural Networks", *IEEE Signal Processing*, Jan. 1993, p. 8–38.

Kim, Junguk. "The Areawide Real–Time Traffic Control (ARTC) System: A New Traffic Control Concept", *IEEE Transactions on Vehicular Technology*, May 1993, vol. No. 2.

Hammerstrom, Dan. "Neural Networks at Work", *IEEE Spectrum Personal Wireless*, Jun. 1993, vol. 30, No. 6.

Kosko, Bart. "Fuzzy Logic", *Scientific America*, Jul. 1993, p. 76–81.

"FAA Tests DGPS River Approaches In Washington, D.C.", *GPS Report/Phillips Business Information, Inc.*, Sep. 1993, vol. 3, No. 19.

*Popular Mechanics*, Nov. 1993, p. 51–52.

Hughes, David. "Aerospace Electronics May Guide Smart Cars", *Aviation Week & Space Technology*, Nov. 1993, p. 63–64.

Getting, Ivan. "The Global Positioning System", *IEEE Spectrum*, Dec. 1993, p. 36–47.

Yashiro, Tomoyuki. "A Network Based on Inter–vehicle Communication", *Proceedings of the IEEE Intelligent Vehicles Symposium, Tokyo*, Jul. 1993, p. 345–350.

Rössle, S. "Real–Time Vision–Based Intersection Detection for a Driver's Warning Assistant", *Proceedings of the IEEE Intelligent Vehicle Symposium, Tokyo*, Jul. 1993, p. 340–344.

Bosacchi, Bruno. "Fuzzy Logic Technology and the Intelligent Highway System (IHS)", *IEEE Technology Update Series, Fuzzy Logic Technology and Applications*, 1994, p. 13–18.

Rock, Dennis. "Intelligent Road Transit: The Next Generation", *AI Expert*, Apr. 1994, p. 16–24.

Walter, T. "Flight Trials of the Wide–Area Augmentation System (WAAS)", *ION GPS '94*.

"Stanford Students' Device Allows Centimeter–Accuracy GPS Landings", *AIR Safety Week/Phillips Business Information, Inc.*, Oct. 24, 1994, vol. 8, No. 41.

Ulmer, Berthold. "Autonomous Automated Driving in Real Traffic", Diamler–Benz Research Institute, Dec. 1994.

Pervan, Boris. "High Integrity GPS Based Precision Based Landing Using Integrity Beacon Pseudolites", *ISPA 95*, Germany, Feb. 1995.

Kwong, Waihon. "Expert Supervision of Fuzzy Learning Systems for Fault Tolerant Aircraft Control", *Proceedings of the IEEE*, Mar. 1995, vol. 83, No. 3, p. 446–483.

Lawrence, David. "A Real–Time Architecture for Kinematic GPS Applied to the Integrity Beacon Landing System", Department of Aeronautics and Astronautics, Stanford University, Presented at $51^{st}$ ION Meeting, Colorado Springs, CO., Jun. 1995.

Zetsch, Dieter. "The Automobile: Clean and Customized", *Scientific America*, Sep. 1995, p. 102–105.

Kundar, Sridhar. "Vision Based Fuzzy Controllers for Navigation Tasks".

Walter, Todd. "Weighted RAIM for Precision Approach", *Stanford University*, Sep. 1995.

Cobb, Stewart. "Precision Landing Tests with Improved Integrity Beacon Pseudolites", Presented at ION GPS, Palm Springs, CA., Department of Astronautics Stanford University, Sep. 1995.

Hischke, Mark. "Collision Warning Radar Interface", *Proceedings of the IEEE Intelligent Vehicles Symposium, Detroit*, Sep. 1995, p. 13–18.

Chadwick, D.J. "A New, Robust, High Data Rate Digital FM Subcarrier System for Mobile ITS Applications", *Proceedings of the IEEE Intelligent Vehicles Symposium, Detroit*, Sep. 1995, p. 19–23.

Jochem, Todd. "Vision Guided Lane Transition", *Proceedings of the IEEE Intelligent Vehicles Symposium, Detroit*, Sep. 1995, p. 30–35.

Woll, Jerry. "Monopulse Doppler Radar for Vehicle Applications", *Proceedings of the IEEE Intelligent Vehicles Symposium, Detroit*, Sep. 1995, p. 42–47.

Ito, Toshio. "Understanding Driving Situations Using a Network Model", *Proceedings of the IEEE Intelligent Vehicles Symposium, Detroit*, Sep. 1995, p. 48–53.

Klug, Karl. "A Deformable–Template Approach to Lane Detection", *Proceedings of the IEEE Symposium, Detroit*, Sep. 1995, p. 54–59.

Kenue, Surrender, "Embedding Fuzzy Knowledge into Neural Networks for Control Applications", *Proceedings of the IEEE Intelligent Vehicles Symposium, Detroit*, Sep. 1995, p. 72–77.

Broggi, Albert. "A Massively Parallel Approach to Real–Time Vision–Based Road Markings Detction", *Proceedings of the IEEE Intelligent Vehicles Symposiom, Detroit*, Sep. 1995, p. 84–89.

Sullivan, Mark. "Pedestrian Tracking from a Stationary Camera Using Archive Deformable Models", *Proceedings of the IEEE Intelligent Vehicles Symposium, Detroit*, Sep. 1995, p. 90–95.

Selsis, Muriel. "Automatic Tracking and 3D Localization of Moving Objects by Active Contour Models", *Proceedings of the IEEE Intelligent Vehicles Symposium, Detroit*, Sep. 1995, p. 96–100.

Noll, Detler. "Real–Time Vehicle Tracking and Classification", *Proceedings of the IEEE Intelligent Vehicles Symposium, Detroit*, Sep. 1995, p. 101–106.

Wan, Yue. "A New Edge Detector for Obstacle Detection with a Linear Stereo Vision System", *Proceedings of the IEEE Intelligent Vehicles Symposium, Detroit*, Sep. 1995, p. 130–135.

Werner, Martin. "A Nonlinear Approach to Vehicle Guidance", *Proceedings of the IEEE Intelligent Vehicles Symposium, Detroit*, Sep. 1995, p. 136–140.

Choi, Doo–Hyun. "Fitness–Based Modular Visual Steering Architectures for Super Cruise Control of Automobiles", *Proceedings of the IEEE Intelligent Vehicles Symposium, Detroit*, Sep. 1995, p. 170–175.

Singer, Gross. "A Fault–Tolerant Sensory Diagnostic System for Intelligent Vehicle Application", *Proceedings of the IEEE Intelligent Vehicles Symposium, Detroit*, Sep. 1995, p. 176–182.

Kim, Kwang. "Collision Avoidance Using Artificial Retina Sensor in ALV", *Proceedings of the IEEE Intelligent Vehicles Symposium, Detroit*, Sep. 1995, p. 183–187.

Wu, C. "A Coordinated Motion Planar Among Moving Machines and Objects", *Proceedings of the IEEE Intelligent Vehicle Symposium, Detroit*, Sep. 1995, p. 188–193.

Parodi, P. "A Feature–Based Recognition Scheme for Traffic Scenes", *Proceedings of the IEEE Intelligent Vehicle Symposium, Detroit*, Sep. 1995, p. 229–234.

Choi, Myung. "Real–Time Moving Automotive Vehicles Identification System (AVIS)", *Proceedings of the IEEE Intelligent Vehicles Symposium, Detroit*, Sep. 1995, p. 241–246.

Yoda, Shigeru. "Road Surface Recognition Sensor Using an Optical Spatial Filter", *Proceedings of the IEEE Intelligent Vehicles Symposium, Detroit*, Sep. 1995, p. 253–257.

Kim, K.I. "An Autonomous Land Vehicle PRV II, Progress and Performance Enhancement Computer Vision and Neural Network", *Proceedings of the IEEE Intelligent Vehicles Symposium, Detroit*, Sep. 1995, p. 264–269.

Kawashima, Shinobu. "Traffic Condition Monitoring by Laser Radar for Advanced Safety Driving", *Proceedings of the IEEE Intelligent Vehicle Symposium, Detroit*, Sep. 1995, p. 299–303.

Kruger, W. "Real–Time Estimation and Tracking of Optical Flow Vectors for Obstacle Detection", *Proceedings of the IEEE Intelligent Vehicle Symposium, Detroit*, Sep. 1995, p. 304–309.

Priese, Lutz. "Ideogram Identification in a Real–Time Traffic Sign Recognition", *Proceedings of the IEEE Intelligent Vehicles Symposium, Detroit*, Sep. 1995, p. 310–314.

Ninomiya, Yoshiki. "A Real–Time Vision for Intelligent Vehicles", *Proceedings of the IEEE Intelligent Vehicles Symposium, Detroit*, Sep. 1995, p. 315–320.

Ganci, Paul. "A Forward Looking Automotive Radar Sensor", *Proceedings of the IEEE Intelligent Vehicles Symposium, Detroit*, Sep. 1995, p. 321–326.

Azami, Satoshi. "Route Guidance Sign Recognition" *Proceedings of the IEEE Intelligent Vehicles Symposium, Detroit*, Sep. 1995, p. 337–338.

Fernandez–Maloigne, Christine. "Texture and Neural Network for Road Segmentation", *Proceedings of the IEEE Intelligent Vehicles Symposium, Detroit*, Sep. 1995, p. 334–349.

Reed, John. "Side Zone Automotive Radar Criteria for Target Classification", *Proceedings of the IEEE Intelligent Vehicle Symposium, Detroit*, Sep. 1995, p. 361–363.

Singh, Daljit. "Autonomous Vehicle Using WA DGPS", *Proceedings of the IEEE Intelligent Vehicles Symposium, Detroit*, Sep. 1995, p. 370–375.

Bourbakis, Wikolaos. "An Efficient Vehicle's Navigation Methodology Using Dynamic Change sin Local Mass", *Proceedings of the IEEE Intelligent Vehicles Symposium, Detroit*, Sep. 1995, p. 406–411.

Yu, Gening. "Road Following with Continuous Learning", *Proceedings of the Intelligent Vehicles Symposium, Detroit*, Sep. 1995, p. 412–417.

Baten, Stefan. "Recursive Surface Structure Recognition for Safe Navigation", *Proceedings of the IEEE Intelligent Vehicles Symposium, Detroit*, Sep. 1995, p. 424–429.

Hatipoglu, Cem. "On Optimal Design of a Lange Change Controller", *Proceedings of the IEEE Intelligent Vehicles Symposium, Detroit*, Sep. 1995, p. 436–441.

Kehtarnavaz, N. "Traffic Sign Recognition in Noisy Outdoor Scenes", *Proceedings of the IEEE Intelligent Vehicles Symposium, Detroit*, Sep. 1995, p. 460–465.

DeMicheli, E. De. "Color Cues for Traffic Scene Analysis", *Proceedings of the IEEE Intelligent Vehicles Symposium, Detroit*, Sep. 1995, p. 466–471.

Wasielewski, S. "Calibration of a Multi–Sensor System Laser Rangefinder/Camera", *Proceedings of the IEEE Intelligent Vehicles Symposium, Detroit*, Sep. 1995, p. 472–477.

Guinand, Yves. "Low Cost Sensors for Collision Avoidance Applications", *Proceedings of the IEEE Intelligent Vehicles Symposium, Detroit*, Sep. 1995, p. 478–482.

Gillner, Walter. "Motion Based Vehicle Detection on Motorways", *Proceedings of the IEEE Intelligent Vehicles Symposium, Detroit*, Sep. 1995, p. 483–487.

Kluge, Karl. "Statistical Characterization of the Visual Characteristics of Painted Lane Markings", *Proceedings of the IEEE Intelligent Vehicles Symposium, Detroit*, Sep. 1995, p. 488–495.

Reichart, D. "A Real–Time Approach to Traffic Situations Representation from Image Processing Data", *Proceedings of the IEEE Intelligent Vehicles Symposium, Detroit*, Sep. 1995, p. 500–505.

Pomerleau, Dean. "RALPH: Rapidly Adapting Lateral Position Handler", *Proceedings of the IEEE Intelligent Vehicles Symposium, Detroit*, Sep. 1995, p. 507–511.

Gengenbach, V. "Model–Based Recognition of Intersections and Lane Structures", *Proceedings of the IEEE Intelligent Vehicles Symposium, Detroit*, Sep. 1995, p. 512–517.

David, William. "Retroreflective Data/Voice Communication Sensor for Cooperative Automatic Vehicle Control", *Proceedings of the IEEE Intelligent Vehicles Symposium, Detroit*, Sep. 1955, p. 518–525.

Ruichek, Yassine. "Real–Time Neural Vision for Obstacle Detection Using Linear Cameras", *Proceedings of the IEEE Intelligent Vehicles Symposium, Detroit*, Sep. 1995, p. 524–529.

Weber, J. "New Results in Stereo–Based Automatic Vehicle Guidance", *Proceedings of the IEEE Intelligent Vehicle Symposium, Detroit*, Sep. 1995, p. 530–535.

Robinson, Gail. "Wireless Communications: The Next Generation", *Design News*, Oct. 23, 1995, p. 64–70.

"Wide Areas Differential GPS to Three Meter Accuracy Tested at Stanford", *Stanford News Service*, Dec. 1995.

Herring, Thomas. "The Global Positioning System", *Scientific America*, Feb. 1996, p. 44–50.

* cited by examiner

| V\D | VL | L | M | H | VH |
|---|---|---|---|---|---|
| VC | Y-LB-NØ | R-LB-SØ | R-MB-SØ | R-HB-MØ | R-HB-MØ |
| C | Y-NB-NØ | Y-LB-NØ | R-MB-SØ | R-HB-SØ | R-HB-MØ |
| M | G-NB-NØ | Y-NB-NØ | Y-LB-NØ | R-MB-NØ | R-HB-SØ |
| F | G-NB-NØ | G-NB-NØ | G-NB-NØ | Y-LB-NØ | Y-LB-NØ |
| VF | G-NB-NØ | G-NB-NØ | G-NB-NØ | Y-LB-NØ | Y-LB-NØ |

ACCELERATION = LP

FIG. 12A

| V\D | VL | L | M | H | VH |
|---|---|---|---|---|---|
| VC | R-MB-NØ | R-HB-NØ | R-HB-SØ | R-HB-HØ | R-HB-HØ |
| C | R-MB-NØ | R-MB-NØ | R-MB-SØ | R-HB-MØ | R-HB-HØ |
| M | Y-LB-NØ | R-MB-NØ | R-MB-SØ | R-HB-MØ | R-HB-MØ |
| F | Y-NB-NØ | Y-NB-NØ | Y-NB-NØ | R-LB-NØ | R-LB-NØ |
| VF | G-NB-NØ | G-NB-NØ | Y-NB-NØ | Y-NB-NØ | R-MB-NØ |

ACCELERATION = HP

FIG. 12B

| V\D | VL | L | M | H | VH |
|---|---|---|---|---|---|
| VC | Y-LB-NØ | Y-LB-NØ | Y-MB-NØ | R-HB-SØ | R-HB-MØ |
| C | Y-NB-NØ | Y-NB-NØ | Y-LB-NØ | Y-LB-SØ | R-MB-SØ |
| M | G-NB-NØ | G-NB-NØ | Y-MB-NØ | Y-MB-SØ | R-MB-SØ |
| F | G-NB-NØ | G-NB-NØ | G-NB-NØ | G-NB-NØ | Y-NB-NØ |
| VF | G-NB-NØ | G-NB-NØ | G-NB-NØ | G-NB-NØ | Y-NB-NØ |

ACCELERATION = MN

FIG. 12C

| V D | VL | L | M | H | VH |
|---|---|---|---|---|---|
| VC | R-MB-NØ | R-MB-SØ | R-HB-MØ | R-HB-HØ | R-HB-HØ |
| C | Y-LB-NØ | R-MB-NØ | R-MB-SØ | R-HB-MØ | R-HB-HØ |
| M | Y-NB-NØ | Y-LB-NØ | R-MB-NØ | R-HB-NØ | R-HB-SØ |
| F | G-NB-NØ | G-NB-NØ | Y-NB-NØ | Y-LB-NØ | R-LB-NØ |
| VF | G-NB-NØ | G-NB-NØ | Y-NB-NØ | Y-LB-NØ | Y-LB-NØ |

ACCELERATION =MP

FIG. 12D

| V D | VL | L | M | H | VH |
|---|---|---|---|---|---|
| VC | Y-LB-NØ | Y-LB-NØ | R-MB-NØ | R-HB-SØ | R-HB-MØ |
| C | Y-NB-NØ | Y-MB-NØ | Y-MB-NØ | R-HB-NØ | R-HB-SØ |
| M | G-NB-NØ | G-NB-NØ | Y-SB-NØ | R-MB-SØ | R-MB-SØ |
| F | G-NB-NØ | G-NB-NØ | G-NB-NØ | Y-NB-NØ | Y-NB-NØ |
| VF | G-NB-NØ | G-NB-NØ | G-NB-NØ | G-NB-NØ | Y-NB-NØ |

240

ACCELERATION =LN

FIG. 12E

| V D | VL | L | M | H | VH |
|---|---|---|---|---|---|
| VC | Y-NB-NØ | Y-LB-NØ | Y-LB-NØ | Y-MB-SØ | R-MB-MØ |
| C | G-NB-NØ | G-NB-NØ | G-NB-NØ | Y-LB-NØ | Y-LB-NØ |
| M | G-NB-NØ | G-NB-NØ | G-NB-NØ | Y-LB-NØ | Y-LB-NØ |
| F | G-NB-NØ | G-NB-NØ | G-NB-NØ | G-NB-NØ | G-NB-NØ |
| VF | G-NB-NØ | G-NB-NØ | G-NB-NØ | G-NB-NØ | G-NB-NØ |

ACCELERATION =HN

FIG. 12F

| STATE VECTOR | HAZARD HF | HAZARD HB | HAZARD HL | HAZARD HR | OBSTACLE CF | OBSTACLE CB | OBSTACLE CL | OBSTACLE CR |
|---|---|---|---|---|---|---|---|---|
| 1 | 0 | 0 | 0 | 0 | | | | |
| 2 | 0 | 0 | 0 | 1 | 0 | 0 | 0 | |
| 3 | 0 | 0 | 0 | 1 | 0 | 0 | 1 | |
| 4 | 0 | 0 | 0 | 1 | 0 | 1 | 0 | |
| 5 | 0 | 0 | 0 | 1 | 0 | 1 | 1 | |
| 6 | 0 | 0 | 0 | 1 | 1 | 0 | 0 | |
| 7 | 0 | 0 | 0 | 1 | 1 | 0 | 1 | |
| 8 | 0 | 0 | 0 | 1 | 1 | 1 | 0 | |
| 9 | 0 | 0 | 0 | 1 | 1 | 1 | 1 | |
| 10 | 0 | 0 | 1 | 0 | 0 | 0 | | 0 |
| 11 | 0 | 0 | 1 | 0 | 0 | 0 | | 1 |
| 12 | 0 | 0 | 1 | 0 | 0 | 1 | | 0 |
| 13 | 0 | 0 | 1 | 0 | 0 | 1 | | 1 |
| 14 | 0 | 0 | 1 | 0 | 1 | 0 | | 0 |
| 15 | 0 | 0 | 1 | 0 | 1 | 0 | | 1 |
| 16 | 0 | 0 | 1 | 0 | 1 | 1 | | 0 |
| 17 | 0 | 0 | 1 | 0 | 1 | 1 | | 1 |
| 18 | 0 | 0 | 1 | 1 | 0 | 0 | | |
| 19 | 0 | 0 | 1 | 1 | 0 | 1 | | |
| 20 | 0 | 0 | 1 | 1 | 1 | 0 | | |
| 21 | 0 | 0 | 1 | 1 | 1 | 1 | | |
| 22 | 0 | 1 | 0 | 0 | 0 | | 0 | 0 |
| 23 | 0 | 1 | 0 | 0 | 0 | | 0 | 1 |
| 24 | 0 | 1 | 0 | 0 | 0 | | 1 | 0 |
| 25 | 0 | 1 | 0 | 0 | 0 | | 1 | 1 |
| 26 | 0 | 1 | 0 | 0 | 1 | | 0 | 0 |
| 27 | 0 | 1 | 0 | 0 | 1 | | 0 | 1 |
| 28 | 0 | 1 | 0 | 0 | 1 | | 1 | 0 |
| 29 | 0 | 1 | 0 | 0 | 1 | | 1 | 1 |
| 30 | | | | | | | | |
| 31 | 0 | 1 | 0 | 1 | 0 | | 0 | |
| 32 | 0 | 1 | 0 | 1 | 0 | | 1 | |
| 33 | 0 | 1 | 0 | 1 | 1 | | 0 | |
| 34 | 0 | 1 | 0 | 1 | 1 | | 1 | |
| 35 | 0 | 1 | 1 | 0 | 0 | | | 0 |
| 36 | 0 | 1 | 1 | 0 | 0 | | | 1 |
| 37 | 0 | 1 | 1 | 0 | 1 | | | 0 |
| 38 | 0 | 1 | 1 | 0 | 1 | | | 1 |
| 39 | 0 | 1 | 1 | 1 | 0 | | | |
| 40 | 0 | 1 | 1 | 1 | 1 | | | |
| 41 | 1 | 0 | 0 | 0 | | 0 | 0 | 0 |
| 42 | 1 | 0 | 0 | 0 | | 0 | 0 | 1 |
| 43 | 1 | 0 | 0 | 0 | | 0 | 1 | 0 |
| 44 | 1 | 0 | 0 | 0 | | 0 | 1 | 1 |
| 45 | 1 | 0 | 0 | 0 | | 1 | 0 | 0 |
| 46 | 1 | 0 | 0 | 0 | | 1 | 0 | 1 |
| 47 | 1 | 0 | 0 | 0 | | 1 | 1 | 0 |
| 48 | 1 | 0 | 0 | 0 | | 1 | 1 | 1 |
| 49 | 1 | 0 | 0 | 1 | | 0 | 0 | |
| 50 | 1 | 0 | 0 | 1 | | 0 | 1 | |
| 51 | 1 | 0 | 0 | 1 | | 1 | 0 | |
| 52 | 1 | 0 | 0 | 1 | | 1 | 1 | |
| 53 | | | | | | | | |
| 54 | 1 | 0 | 1 | 0 | | 0 | | 0 |
| 55 | 1 | 0 | 1 | 0 | | 0 | | 1 |
| 56 | 1 | 0 | 1 | 0 | | 1 | | 0 |
| 57 | 1 | 0 | 1 | 0 | | 1 | | 1 |
| 58 | 1 | 0 | 1 | 1 | | 0 | | |
| 59 | 1 | 0 | 1 | 1 | | 1 | | |
| 60 | 1 | 1 | 0 | 0 | | | 0 | 0 |
| 61 | 1 | 1 | 0 | 0 | | | 0 | 1 |
| 62 | 1 | 1 | 0 | 0 | | | 1 | 0 |
| 63 | 1 | 1 | 0 | 0 | | | 1 | 1 |
| 64 | 1 | 1 | 0 | 1 | | | 0 | |
| 65 | 1 | 1 | 0 | 1 | | | 1 | |
| 66 | 1 | 1 | 1 | 0 | | | | 0 |
| 67 | 1 | 1 | 1 | 0 | | | | 1 |
| 68 | 1 | 1 | 1 | 1 | | | | |

GPS VEHICLE COLLISION AVOIDANCE WARNING AND CONTROL SYSTEM AND METHOD

CROSS REFERENCE TO RELATED APPLICATION

This application is a continuation of Ser. No. 08/717,807 filed Sep. 24, 1996, now U.S. Pat. No. 5,983,161 and a continuation of Ser. No. 09/436,097 filed Nov. 8, 1999, now U.S. Pat. No. 6,275,773 which is a continuation-in-part of application Ser. No. 08/105,304 filed Aug. 11, 1993 now abandoned.

BACKGROUND OF THE INVENTION

1. Fields of the Invention

The invention relates generally to an apparatus and method of precisely determining the actual position and attitude of a host vehicle operating on a select course or path, such as, a highspeed highway and/or in congested traffic, or an aircraft in a landing pattern, and of multiple moving or fixed targets which represent potential collision hazards with a host vehicle, and, then, generating and displaying warning signals and avoidance maneuvers to avoid the collision and, in the absence of effective timely action by the host operator, automatically controlling the host vehicle to avoid the collisions or minimize any injuries and damage therefrom. More particularly, the invention relates to the use of a Global Positioning System ("GPS"), and a differential GPS ("DGPS") supplemented by a Local or Psuedolite Positioning System ("LPS" or "Psuedolite") as the primary host vehicle and target locating system with centimeter accuracy, further supplemented by any of a plurality of conventional all-weather and/or visual scanners and digital computer systems to detect, recognize, track and predict the collision impact point of all relevant potential targets, including other vehicles, fixed geographical obstructions, pedestrians and the like. More particularly, the invention further relates to multiple antennae, GPS determined vehicle attitude for use in generating automobile-on-the-highway, multiple target relative location, and collision avoidance warnings and maneuvers. More particularly, the invention further relates to an inter-vehicle and vehicle to base or satellite communication system for transmitting GPS, DGPS, and LPS position data, as well as, relevant target data to other vehicles and central or local control centers for information and control action. More particularly, the present invention still further relates to the use of neural networks and fuzzy logic rule sets for generating and developing optimal and prioritized warning and avoidance maneuvers, and generating related optimally coordinated control signals for all relevant host automobile control systems which are then automatically implemented, subject to operator intervention and override, to avoid collisions or to optimize prevention of injury or damage.

2. Discussion of Background and Prior Art a. General

Automobile accidents are one of the most serious problems faced by our society, both in terms of personal deaths and injuries, and in financial losses suffered as a result of accidents. Human suffering caused by death or injury from such accidents is immense. In addition, the costs of medical treatment, permanent injury to accident victims resulting in loss of life opportunities, and financial losses resulting from damage to automobiles and other valuable objects or structures involved in such accidents are staggering. Providing improved systems and methods to minimize such personal and financial losses is an urgent and very important problem deserving the highest possible priority. Increasing populations and increased use of automobiles worldwide with resulting increased congestion on our highways and roadways makes development of improved control and warning systems for collision avoidance even more important. While many advances have been made in vehicle safety, including, for example, the use of seatbelts, airbags and more rigid and safer automobile body structures, much room for improvement exists in automotive systems, in general, and in automobile-on-the-highway warning and control systems, in particular.

b. Positioning Self and Multiple Targets by GPS

For example, impressive advances have been made in various areas of technology that can be applied to the automotive collision avoidance and warning system problem. One dynamic area of rapid technological development exists today in the form of GPS satellite location and tracking systems. Many patents have been issued for various applications of GPS for locating and tracking objects, and for navigation purposes. Also, such GPS systems have been augmented with earthbound pseudo-satellite ("Pseudolite") systems and methods that provide centimeter accuracy with real time, kinematic positioning information for use in aircraft landing systems. Various configurations of GPS-based tracking and communication systems and methods, including Pseudolite systems and methods, are described in the following documents, each of which is incorporated in its entirety herein by reference: Logsdon, Tom, The Navstar Global Positioning System, Van Nostrand Reinhold, New York (1992), ISBN 0-422-01040-0; Leick, Alfred, GPS Satellite Surveying, John Wiley & Sons, New York (1990), ISBN 0-471-81990-5; Hurn, Jeff, GPS—A Guide to the Next Utility, Trimble Navigation, Ltd., Sunnyvale, Calif. (1989); Hurn, Jeff, Differential GPS Explained, Trimble Navigation Ltd., Sunnyvale, Calif. (1993); Singh, M. S. and Grewal, H. K., Autonomous Vehicle Using WADGPS, IEEE Intelligent Vehicle Symposium, September, (1995); Walter, T., et.al., Flight Trials of the Wide-Area Augmentation System (WAAS), ION GPS-94, September, (1994); Ndili, A., GPS Pseudolite Signal Design, ION GPS-94, September, (1994); Cobb, H. S., Precision Landing Tests with Improved Integrity Beacon Pseudolites, ION GPS-95, September, (1995); Walter, T. and Euge, P., Weighted RAIM for Precision Approach, ION GPS-95, September, (1995); and U.S. Pat. Nos.: Remondi U.S. Pat. No. 5,442,363; Okamoto U.S. Pat. No. 5,434,787; Dekel U.S. Pat. No. 5,430,656; Sprague U.S. Pat. No. 5,422,816; Schuchman U.S. Pat. No. 5,422,813; Penny U.S. Pat. No. 5,414,432; Smith U.S. Pat. No. 5,408,238; Gooch U.S. Pat. No. 5,396,540; Sennott U.S. Pat. No. 5,390,125; Kass U.S. Pat. No. 5,389,934; FitzGerald U.S. Pat. No. 5,382,958; Brown U.S. Pat. No. 5,379,224; Class U.S. Pat. No. 5,361,212; Allison U.S. Pat. No. 5,359,332; Bird U.S. Pat. No. 5,418,537; Izidon U.S. Pat. No. 5,325,302; Gildea U.S. Pat. No. 5,345,244; Brown U.S. Pat. No. 5,311,194; Mueller U.S. Pat. No. 5,323,322; Teare U.S. Pat. No. 5,243,652; Brown U.S. Pat. No. 5,225,842; Mansell U.S. Pat. No. 5,223,844; Geier U.S. Pat. No. 5,202,829; Bertiger U.S. Pat. No. 5,187,805; Ferguson U.S. Pat. No. 5,182,566; Hatch U.S. Pat. No. 5,177,489; Fraughton U.S. Pat. No. 5,153,836; Allison U.S. Pat. No. 5,148,179; Joguet U.S. Pat. No. 4,894,655.

The most pertinent of these GPS references are those that deal with some phase of collision avoidance technology, especially in an automobile-on-the-highway environment.

(1) Providing GPS Position Data All-weather and Inter-vehicle, Detecting/Tracking Multiple Targets, and Warning of Collision In a system to Izidon U.S. Pat. No. 5,325,302 there is disclosed a GPS based anti-collision warning system in which each vehicle is equipped with GPS to provide location and trajectory to predict collision and warn of the same. By virtue of its ability to also receive GPS position information only from similarly equipped vehicles, as well as, for itself, Izidon provides a restricted, but nonetheless, all-weather, day/night, radar-less, and vision-less system for detecting obstacles that represent collision hazards, analyzing the target and own path and computing a trajectory for each object and self to predict a collision hazard and provide a warning to operator. Izidon discloses that fixed objects in space (land hazards) may also be stored in memory and a collision hazard therewith also warned. The reference discloses a conventional TDMA, random access, communication system using 2 ms time slices and 600 μs to transmit 300 bits of data and a 200 ms cycle time enabling 100 vehicles to participate, with each vehicle receiving the GPS position data of all other vehicles. If redundant broadcasting is used, only 50 aircraft are enabled to participate, with position updates at a 10 Hz rate, which is half the 20 Hz rate at which visual images could be processed by the human eye. However,the Izidon reference fails to disclose any automatic control mechanism, and, while it specifically states that it is applicable to aircraft, sea, and land vehicles, it is, nonetheless, designed primarily for fighter aircraft and fails to disclose a GPS or other position locating system which would be sufficiently accurate or fast enough to enable it to be effectively operated in an automobile-on-the-highway environment where multiple target data with centimeter accuracy is rapidly and repeatedly required rather than the 100 m accuracy and 200 ms cycle time disclosed by Izidon.

(2) Controlling Automobile-on-the-Highway with Centimeter Accurate GPS Data, Computer Vision, Neural Networks and Adaptive Learning In an experimental system to Singh published Sep. 25, 1995 there is described an autonomous vehicle using a wide area differential GPS system ("WADGPS") applied in a robust system that readily deals with selective availability errors, ephemeris, and satellite clock errors which Singh claims guarantees an error level of decimeter/centimeter accuracy in a ground vehicle control algorithm. Singh discloses a fully automatic ground vehicle using a digital computer control system which includes guidance, navigation, mission handling, GPS model, road model, atmospheric model, engine propulsion model, and actuator model. Singh claims the human intervention is completely eliminated by using reliable sensors/actuators to make performance collision-free and congestion-free. Additional sensors which aid the GPS calculations include dead reckoning, radar, and video camera. The vehicle transmits information about its position and velocity to other immediate participants for collision avoidance and lane changing. Singh provides centerline deviation autosteering by pulse code modulation ("PCM") and acceleration/braking control for longitudinal control using an adaptive learning system. The Singh reference is incorporated herein by reference in its entirety. Singh does not disclose a warning system, any type of lateral control algorithm or the use of fuzzy logic inference rule sets. Moreover, Singh points out that only one meter accuracy is all that is required for his collision avoidance control and only five meter accuracy is all that is needed for his collision avoidance of hazardous situations.

(3) Controlling Aircraft and Miscellaneous Mobile Receivers to Centimeter Accuracy In a system by Stanford University a prototype kinematic GPS system with integrity beacon landing system ("IBLS") for aircraft provides a real-time architecture with centimeter level positioning accuracy. See, Stanford Students' Device Allows Centimeter-Accuracy GPS Landing, Air Safety Week, Oct. 24, 1994, V. 8, No. 41; Lawrence, David, A Real-Time Architecture for Kinematics GPS Applied to the Integrity Beacon Landing System, ION GPS-95, June 1995; FAA Tests DGPS River Approaches in Washington, D.C., GPS Report, Sep. 23, 1993, V. 3, No. 19; and, references cited supra, for example, articles to Cobb and Walter and patents to Hatch, Allison, Brown, and Remondi. While these references are all aircraft landing system applications, it appears that for some time centimeter accuracy has been obtainable in selected GPS ground applications where differential GPS has been employed with carrier tracking techniques. See Herring, Thomas, The Global Positioning System, Scientific America, February 1996, pgs. 44–50.

In summary, it appears that heretofore, an automobile has not been controlled to GPS-based centimeter accuracy in a fully integrated collision avoidance and warning system which detects targets in all directions, develops collision avoidance maneuvers through use of fuzzy logic inference rules and is capable of reliable automatic control in a multiple target, high speed, on-the-highway environment.

Accordingly, it is a further object of the present invention to provide such an automobile-on-the-highway collision warning control system and method which is implemented to avoid collisions between motor vehicles and/or between motor vehicles and other hazardous roadway obstacles and to warn drivers of impending collisions so that evasive action may be taken.

It is still a further object of the invention to provide such a system and method that uses GPS technology augmented by Psuedolite technology to not only accurately locate multiple vehicles on a roadway and to derive vehicle velocity and acceleration vectors for use in combination with such GPS Psuedolite augmented coordinates to determine hazardous situations and derive control and warning signals to attempt to avoid and minimize the effects of imminent collisions, but also, to provide such kinematic calculations with centimeter accuracy and in due time such that adequate corrective action may be taken.

(4) GPS Vehicle Attitude Determination

It is also known to place multiple GPS antennae on the extremities of a vehicle and, by comparing the phase differences in signals received simultaneously, determine the attitude of the vehicle relative to a reference plane in space or on the ground. See U.S. Patents as follows: Deem U.S. Pat. No. 4,384,293; Rosen U.S. Pat. No. 4,418,358; Sekine U.S. Pat. No. 4,644,358; Beier U.S. Pat. No. 4,719,469; Uematsu U.S. Pat. No. 4,994,812; Hatch U.S. Pat. No. 4,963,889; Hatch U.S. Pat. No. 5,177,489; Timothy U.S. Pat. No. 5,101,356; Ward U.S. Pat. No. 5,185,610; Timothy U.S. Pat. No. 5,406,489; Knight U.S. Pat. No. 5,296,861; Babitch U.S. Pat. No. 5,347,286; Counselman U.S. Pat. No. 4,870,422; Evans U.S. Pat. No. 4,599,620; Timothy U.S. Pat. No. 5,101,356; Knight U.S. Pat. No. 5,296,861; Babitch U.S. Pat. No. 5,347,286; Timothy U.S. Pat. No. 5,406,489. Each of these references is incorporated herein by reference. However, it remains to be fully developed, and, accordingly, it is an object of the present invention to provide a multiple antennae, GPS based, automobile-on-the-highway, centimeter accurate, attitude determination system which not only determines the vehicle attitude at any given time, but also, generates host automobile attitude compensated warning information and host automobile attitude compensated anti-collision maneuver information which, inter ali, helps the driver get out of an unusual attitude situation, such as, a skid or spin, while taking corrective action to avoid a collision or minimize the effects of an unavoidable collision.

(5) Communicating GPS Data Inter-vehicle/ Worldwide

Numerous additional GPS references disclose inter-vehicle GPS communications or GPS communications with satellites or a central control. See, for example, Popular Mechanics, November 1993 pgs. 51–52; Yashiro, Tomyuki, A Network Based on Inter-vehicle Communications, pgs. 345–350, and Aguado U.S. Pat. No. U.S. Pat. No. 5,438,337; Benard U.S. Pat. No. 5,119,102; Durboraw U.S. Pat. No. 5,199,504; Simms U.S. Pat. No. 5,334,974, Mansell U.S. Pat. No. 5,223,844; Gooch U.S. Pat. No. 5,396,540; Dekel U.S. Pat. No. 5,430,656; and Bertiger U.S. Pat. No. 5,187,805 each of which is incorporated herein by reference in its entirety. However, none of the aforesaid systems provide communications as part of an integrated GPS/DGPS/LPS automobile-on-the-highway, fuzzy logic implemented, anti-collision system which transmits inter-vehicle and to central control a comprehensive set of such GPS based position and related vehicular data.

Accordingly, it is another object of the present invention is to provide GPS-based communications between vehicles and between individual vehicles and motor vehicle control centers, directly, or indirectly via an intermediate receiver, such as via a satellite, for optimum real time dissemination of vehicle location and movement vectors and related vehicular data to permit real time calculation of imminent dangerous situations.

(6) GPS and Scanning

Also of interest is Ruszkowski U.S. Pat. No. 4,949,089 which is a rifle-type laser portable target locator system housing a GPS receiver to visually bounce light off of a target and transmit the calculated target coordinates to a weapons system on a continuously updated basis to cause the weapon to collide with the target. Multiple target capabilities are included along with target recognition by visual comparison to stored data images. While a scanning type laser system, as suggested by Shaw U.S. Pat. No. 5,314,037, is possible, such a scanning system has not been suggested for use in a congested on-the-road automotive environment involving handling multiple targets simultaneously. Each of these references are incorporated herein by reference in their entirety. Accordingly, it is another object of the present invention to scan multiple targets in a congested automobile-on-the-highway, locate the position of the host automobile and relevant targets in GPS coordinates and transmit that data inter-vehicle and to a fixed control center for use in an anti-collision and warning system.

(7) Controlling Other Automobile-on-the-Highway Apparatuses From GPS Data

It is also known that certain ones of automotive control apparatuses and mechanisms may be operated based on a GPS position calculation, such as, in Capurka U.S. Pat. No. 5,247,440 which preferably operates vehicle lights based on local lighting rules, but could operate other vehicle systems, as well, as a result of certain performance parameters, such as, temperature, 1s altitude, relative humidity. Of a similar nature is Dekel U.S. Pat. No. 5,430,656 which operates engine, steering, transmission, windows, doors, or air conditioning as a result of GPS location automatically transmitted by stolen vehicles to a central station or another vehicle. Dekel's operation, however, is of a limited nature and for a limited purpose. Each of these references are incorporated herein by reference in their entirety.

Accordingly, it is a further object of the present invention to use an apparatus and method which broadly uses GPS based data to operate a plurality of host automobile systems in an improved automobile-on-the-highway collision avoidance and warning system.

c. Conventional Multiple Target Detection and Tracking Systems for Making Automobile-on-the-Road Collision Avoidance Determinations A wide variety of mechanisms are well known for detecting targets and obstacles and for determining a wide variety of collision relevant parameters relative to the detected targets. The sensed and calculated information from the detected targets is employed in a wide variety of known contexts to avoid collision. Such known systems include a wide variety of optical, electro-optical, radar, lidar, and magnetic sensor and video imaging devices, including Maekawa U.S. Pat. No. 5,039,217; Taylor U.S. Pat. No. 5,249,157; Kajiwara U.S. Pat. No. 5,177,462; DeFour U.S. Pat. No. 5,291,196; Lemelson U.S. Pat. No. 4,979,029; Lemelson U.S. Pat. No. 4,969,038; Kelley U.S. Pat. No. 4,926,171; O'Brien U.S. Pat. No. 5,341,344; Shaw U.S. Pat. No. 5,314,037; Asbury U.S. Pat. No. 5,189,426; Asbury U.S. Pat. No. 5,181,038; Asbury U.S. Pat. No. 5,302,956; Butsuen U.S. Pat. No. 5,332,057; Broxmeyer U.S. Pat. No. 5,369,591; Shyu U.S. Pat. No. 5,091,726; Chi U.S. Pat. No. 5,165,497; Mayeau U.S. Pat. No. 5,161,107; Kurami U.S. Pat. No. 5,081,585; Schwarzinger, Michael, Vision-Based Car-Following: Detection, Tracking, and Identification July 1992, pgs. 24–29; Masaki, Ichiro, Vision-based Vehicle Guidance, Springer-Verlag, NY, 1992; Yu, Xuan, Road Tracking, Lane Segmentation and Obstacle Recognition by Mathematical Morphology, July 1992, pgs. 166–172; Ulmer, Berhold, VITA—An Autonomous Road Vehicle (ARV) for Collision Avoidance in Traffic, July 1992, pgs. 36–41; Ulmer, Berhold, Autonomous Automated Driving in Real Traffic, December 1994, pgs. 2118–2125; Sekine, Manabu, Design Method for An Automotive Laser Radar System and Future Prospects for Laser Radar, July 1992, pgs. 120–125; Rock, Denny, Intelligent Road Transit: The Next Generation, AI Expert, April 1994, pgs. 17–24; Teuber, Jan, Digital Image Processing, Prentice Hall, NY, 1989; Graefe, Volker, Vision for Intelligent Road Vehicles, July 1992, pgs. 135–140; Enkelman, W., Realization of Driver's Warning Assistant for Intersections, July 1992, pgs. 72–77; Efenberger, Wolfgang, Automatic Recognition of Vehicles Approaching From Behind, July 1992, pgs. 57–62; Rossle, S., Real-Time Vision-Based Intersection Detection for a Driver's Warning Assistant, July 1992, pgs. 340–44 each of which is incorporated herein by reference in its entirety. However, these systems fail to provide such back-up scanning and multiple target detection and tracking as part of an integrated GPS/DGPS/LPS collision avoidance and warning system capable of omni-directional multiple target, fuzzy logic, centimeter accurate, automobile-on-the-highway, operational environment.

Accordingly, it is another object of the present invention to provide information descriptive of particular hazards and objects in the pathway of vehicles that represent dangerous situations derived from conventional image analysis systems and methods carried on individual vehicles which use television or other conventional roadway scanning technologies and to integrate such information in real time with vehicle location and tracking information derived from GPS and Pseudolite vehicle positioning and tracking information.

Another object of the present invention is to use such real time image analysis systems and methods to derive relative kinematic positioning information between automobiles-on-the-highway and between such vehicles and other roadway objects and hazards, and to use such image analysis derived relative position and movement information to augment and supplement information derived using GPS and Pseudolite vehicle tracking technology to provide accurate potential collision data.

Yet another object of these inventions is to integrate additional ranging information between roadway vehicles and between vehicles and other roadway hazards and objects using conventional radar and/or lidar techniques and methods to derive that information.

It is yet another object of the present invention to provide a motor vehicle collision avoidance warning control system and method that is responsive to hazards in all directions around individual vehicles including hazards and/or objects that may become hazards in the front, to the rear and to both sides of individual vehicles.

d. Displaying Symbology of Self and Multiple Targets to Avoid Collision and Synthesizing Speech It is also known to display multiple target information and symbols with selected collision avoidance data, maneuvers, and symbols supplemented by voice synthesis. See O'Sullivan U.S. Pat. No. 4,623,966, Zechnall U.S. Pat. No. 5,146,219, and Hancock U.S. Pat. No. 5,179,377 each of which is incorporated by reference herein in its entirety. Such displays have not been suggested, however, in an integrated GPS/DGPS/LPS collision avoidance and warning system capable of a multiple target, centimeter accurate, fuzzy logic implemented, automobile-on-the-highway operational environment.

Accordingly, it is another object of the present invention to provide an automobile-on-the-highway, fuzzy logic implemented collision avoidance, and warning control system and method that uses speech recognition and speech synthesis technology to optimally integrate spoken commands and warnings from vehicle drivers or other personnel and to synthesize on a real time basis audible vehicle warning commands to vehicle drivers.

e. Neural Networking, Parallel computing, Weighting Factors Relative to Multiple Targets in Automobile-on-the-Highway In a system by Lupo, Jasper, Defense Applications of Neural Networks, IEEE Communications, November 1989, Vol. 27, No. 11, pgs 82–7, there is disclosed a defense application of neural networks in which the human cerebral cortex has biological neurons numbering $10^{11}$ each of which has 100 dendrites which form $10^4$ synapses. Lupo says the human brain systems function at 100 Hz which is a cycle time of 10ms. He says it functions at about $10^{16}$ interconnections per second and that this capability is beyond anything that can be reconstructed or modeled. However, by understanding how biological brains perform information processing, it is possible to model that understanding and implement it in hardware. Lupo says that projected technologies within the next years with digital signal processing can provide $10^{10}$ interconnections per second with optics at $10^{12}$ interconnections per second. Potential applications include multiple targets and battle scenarios acquired by radar/electro-optical process real-time. Lupo concludes neural networks can break the lock jam.

Pomerleau, Dean A., Progress in Neural Network-Based Vision for Autonomous Robot Driving, July 1992, pgs. 391–96, discloses a neural network based vision system which quickly learns to steer an automobile by watching a person drive. More rare scenarios had to be modeled and integrated into the system in order to generalize a good result over a 25 mile stretch at 55 miles per hour.

Emry U.S. Pat. No. 5,436,835 disclosed a motor vehicle collision avoidance method and system which determined safe stopping distance by storing weighing factors corresponding to a range of vehicle parameters/driving conditions, entering actual parameters/driving conditions/speed and calculating safe driving distance. Thus, Emry brings weighing factors into combination with neural networks. As seen below, it is also generally known to combine neural networks and fuzzy logic. The Lupo, Pomerleau, and Emry references are incorporated herein by reference in their entirety.

Accordingly, it is a further object of the present invention to provide improvements using advanced image analysis techniques and methods including the use of neural networks and advanced high-speed image processor architectures to derive roadway image information as part of an automobile-on-the-highway, collision avoidance and warning system which provides omni-directional, fuzzy logic implemented collision avoidance warnings and maneuvers.

f. Controlling Automobile-on-the-Highway Using Fuzzy Values

In general, expert systems using fuzzy logic inference rules are well known, as described in the following publications, each of which is incorporated herein by reference in its entirety: Gottwald, Siegried, Fuzzy Sets and Fuzzy Logic: The Foundations of Application—from a Mathematical Point of View, Vieweg & Sohn, Braunschweig Wiesbaden (1993), ISBN 3-528-05311-9; McNeil, Daniel, Fuzzy Logic, Simon & Schuster, New York (1993), ISBN 0-671-73843-7; Marks, Robert J. II, Fuzzy Logic Technology and Applications, IEEE Technology Update Series (1994), ISBN 0-7803-1383-6, IEEE Catalog No. 94CR0101-6; Bosacchi, Bruno and Bezdek, James C, Applications of Fuzzy Logic Technology, Sept. 8–10, 1993, Boston, Mass., sponsored and published by the SPIE—The International Society for Optical Engineering, SPIE No. 2061, ISBN 0-8194-1326-7; Mendel, Jerry M., "Fuzzy Logic Systems for Engineering: A Tutorial", Proceedings of the IEEE, Vol. 83, No. 3, March 1995, pgs. 345–377; Jang, Jyh-Shing Roger, Sun, Chuen-Tsai, "Neuro-Fuzzy Modeling and Control", Proceedings of the IEEE, Vol. 83, No. 3, March 1995, pgs. 378–406; Schwartz, Klir, "Fuzzy Logic Flowers in Japan", IEEE Spectrum, July 1992, pgs. 32–35; Kosko, Isaka, "Fuzzy Logic", Scientific American, July 1993, pgs. 76–81; Cox, "Fuzzy Fundamentals", IEEE Spectrum, October 1992, pgs. 58–61; Brubaker, "Fuzzy Operators", EDN, Nov. 9th, 1995, pgs. 239–241.

It is also known to generally use fuzzy logic values in connection with a collision avoidance system. See the references described below each of which is incorporated by reference in its entirety. Apparently, the earliest known use was by Yasunobu U.S. Pat. No. 5,018,689 in a patent filed in Japan Apr. 25, 1983. Yasunobu's system was for stopping an automobile at a specific point by measuring distance, velocity, and acceleration between the host and target by selecting an amount of braking maintained by comparing to and using fuzzy values of the same. In a system by Kurami U.S. Pat. No. 5,081,585 a pair of scanning video cameras to develop local data and global data which when processed through a fuzzy logic system generated control signals for steering, braking, and accelerator and turn signals. Since that disclosure, fuzzy logic has achieved further development in the collision avoidance field. See also, Adachi U.S. Pat. No. 5,189,619 which controlled throttle and brake, and Lee, C. C., Fuzzy Logic in Control Systems: Fuzzy Logic Controller, Part II, IEEE, March/April 1990, Vol. 20, No. 2, pgs. 419–35, which discloses the capability of a fuzzy computer capable of 10 Megaflips. Aurrand-Lions, J. P., Application of Fuzzy Control for ISIS Vehicle Braking, November 1991, pgs. 1–7, described an application of fuzzy logic for the ISIS vehicle braking system in which the vehicle was braked when the driver failed to act. The fuzzy controller calculated brake pressure to observe speed limits from roadway beacons wherein the clock rate was 100 ms. More recent published articles combined fuzzy logic and neural networks. See Nijhius, Jos, Evaluation of Fuzzy and Neural Vehicle Control, March 1996, pgs. 51–55 and Kenue, Surender, Embedding Fuzzy Knowledge into Neural Networks for Control Applications, Vehicle System Dept. General Motors R&D Center, Warren, Mich., Sep. 25, 1995, pgs. 72–7. See also, Hashimoto, Kinshiro, An Image Processing Architecture and A Motion Control Method For An Autonomous Vehicle, July 1992, pgs 213–18, which discloses an image processing architecture and a motion control method for an autonomous vehicle in which road boundaries are extracted and images are processed with an action decision being made using a fuzzy logic trajectory calculation.

Overall, however, the prior development of fuzzy logic in combination with neural networks falls far short of that necessary to provide a truly integrated system for optimizing coordinated control of steering, brakes and accelerator in an automobile-on-the-highway environment which detects targets omni-directionally and provides prioritized collision avoidance maneuvers with centimeter accuracy.

While the above listed patents and known applications of GPS and fuzzy logic/expert system technology represent important innovations, none of these systems or methods takes full advantage of the capability of centimeter accurate GPS based systems used in combination with video scanning systems, radar/lidar, neural network, and fuzzy logic/expert systems and methods to implement a truly integrated motor vehicle collision avoidance and warning system and method. In view of the ever increasing danger of automobile collisions, it is critically important that these advanced technologies be brought together in an organized manner to implement effective collision avoidance and warning systems and methods useful in minimizing the effects of such collisions.

Accordingly, it is a further object of these inventions to provide a motor vehicle collision avoidance warning control system and method that uses fuzzy logic and/or expert system techniques and methods to derive optimal vehicle control and warning signals based on multiple vehicle motion vectors, hazard and object location information, roadway condition information, weather information, and other similar data pertinent to evaluating a dangerous driving situation and deriving optimal control responses.

It is a still further object of the present invention to provide a motor vehicle collision avoidance and warning control system and method that serves to warn drivers of impending dangerous situations and, in the event that the driver does not take corrective action, to automatically control the vehicle braking, steering and acceleration in a coordinated manner in response to the dangerous situation.

Still another object of the present invention is to provide a motor vehicle collision avoidance warning and control system and method that derives signals for automated control of vehicle braking, acceleration and steering wherein such control represents an optimum combination of braking, acceleration and steering in an attempt to avoid and minimize the effects of impending collisions.

It is yet another object of the invention to provide a motor vehicle collision avoidance and warning control system and method that is responsive to multiple simultaneous hazards that may exist with respect to individual vehicles, and to derive control and warning signals that attempt to simultaneously avoid collisions with such multiple hazards, or to at least minimize collision impact effects with these hazards.

Another object of the present invention is to provide a motor vehicle collision avoidance and warning control system and method that may be integrated with vehicle position locating systems that provide vehicle location information to the vehicle driver or to others interested in the vehicle location, for example, to locate stolen vehicles or provide emergency assistance to individual vehicles and occupants.

It is a further object of the present invention is to use on-board speedometers and/or accelerometers to derive yet further vehicle motion vectors for use in collision avoidance and driver warning system calculations.

Accordingly, in addition to the specific objects of the present invention set forth above, further objects of the present invention will be apparent from the Summary and Detailed Description of the Invention which follows.

SUMMARY OF INVENTION

The above and other objects and advantages of the present invention are achieved by the preferred embodiments which are both summarized and described in detail below.

One aspect of the invention is a computer controlled collision avoidance and warning method which includes the steps of receiving continuously from a network of satellites on a first communication link at one of a plurality of automobiles GPS ranging signals for initially accurately determining the one's position on a highway on a surface of the earth; receiving continuously at the one automobile on a second communication link from one of a plurality of stations having a known fixed position on the surface of the earth DGPS auxiliary range correction signals for correcting propagation delay errors in the GPS ranging signals and pseudolite signals for assistance in making further measurements for still further improving the accuracy of the GPS ranging signals and of determining the one's position on a highway on a surface of the earth; determining continuously at the one automobile from the GPS, DGPS, and pseudolite signals the one's kinematic tracking position on the surface of the earth with centimeter accuracy; communicating the one's status information including the kinematic tracking position to each other one of the plurality of automobiles and to the one station or one of a plurality of control centers, and receiving at the one automobile each of the others' of the plurality of automobiles status information including the others' kinematic tracking position; determining in a fuzzy logic associative memory the one's expert driving response relative to each collision hazard; generating expert driving response control signals for actuating a plurality of control systems of the one automobile in a coordinated manner; intelligibly indicating a warning of a collision hazard; and, coordinately actuating the control systems of the one automobile with the control signals to operate the one automobile laterally and longitudinally in real time sufficiently in due time to avoid each collision hazard or, when a collision is unavoidable, then to minimize any injury or damage therefrom.

A further feature of this aspect of the invention includes the step of determining the one automobile's attitude relative to a predetermined direction over the earth's surface using multiple antennae supported on the extremities of the one automobile and phase comparing the GPS signals simultaneously received at the antennae, analyzing the one's attitude, and attitude compensating the expert driving response.

Another feature of this aspect of the present invention includes communicating using a speech synthesizer computer which recognizes the voice of the one automobile's operator.

Another feature of this aspect of the present invention includes displaying on a heads up display in the one automobile a response to the one operator's speech received in the one automobile.

A still further feature of this aspect of the invention includes the steps of detecting multiple objects in all directions relative to the one automobile, analyzing all objects and ranking all potential hazards and objects for determining the most effective collision avoidance strategy, and determining in a fuzzy logic associative memory the one's expert driving response relative to each object which is a potential collision hazard.

In this feature of the invention the detecting step includes detecting objects by scanning with one or more television cameras supported on the one automobile, detecting objects by scanning with one or more radar-based ranging mechanisms supported on the one automobile, and detecting objects on or about the roadway in the vicinity of the one automobile by scanning a motion sensing device embedded in the roadway and transmitting to the one automobile signals indicative of the bearing, distance and elevation of the detected objects relative to a reference. The analyzing step includes processing and analyzing digital signals indicative of video images detected by the one or more television cameras, and processing and analyzing digital signals indicative of the bearing, distance, and elevation to the objects detected by the radar-based ranging mechanisms. The objects detected may include fixed or moving, or known or unknown obstacles, people, bicycles, animals, signs, terrain, roadway features and turns, or the like.

A still further feature of this aspect of the invention warning the operator of the one automobile of an expert driving response, and coordinately actuating the control systems only if a collision remains imminent. The warning step includes, for example, visually indicating the existence of a hazardous condition, such as, displaying a visually perceptible symbol on a windshield of the one automobile including the relative position and motion between the one automobile and any collision hazard. A variety of other warning modes are disclosed including speech synthesis.

A still further feature of this aspect of the invention the step of includes operating one or more of the following systems depending on the kind of expert driving response determined by the fuzzy logic associative memory: a brake, acceleration, steering, horn, light, windshield wiper, seat, mirror, air conditioning, heater, defogger and communication.

BRIEF DESCRIPTION OF DRAWINGS

The various hardware and software elements used to carry out the invention described herein are illustrated in the form of system diagrams, block diagrams, flow charts, and depictions of neural network and fuzzy logic algorithms and structures. The preferred embodiment is illustrated in the following figures:

FIG. 12 is a schematic diagram illustrating typical fuzzy associative memory ("FAM") maps for the fuzzy logic algorithms useful in the automobile-on-the-highway collision avoidance, warning, and control system and method of FIG. 3.

FIG. 15 is a table of hazard/object state vectors indicating possible combinations of hazards and objects useful in the fuzzy associative memory access system of the present invention.

Figure 1:
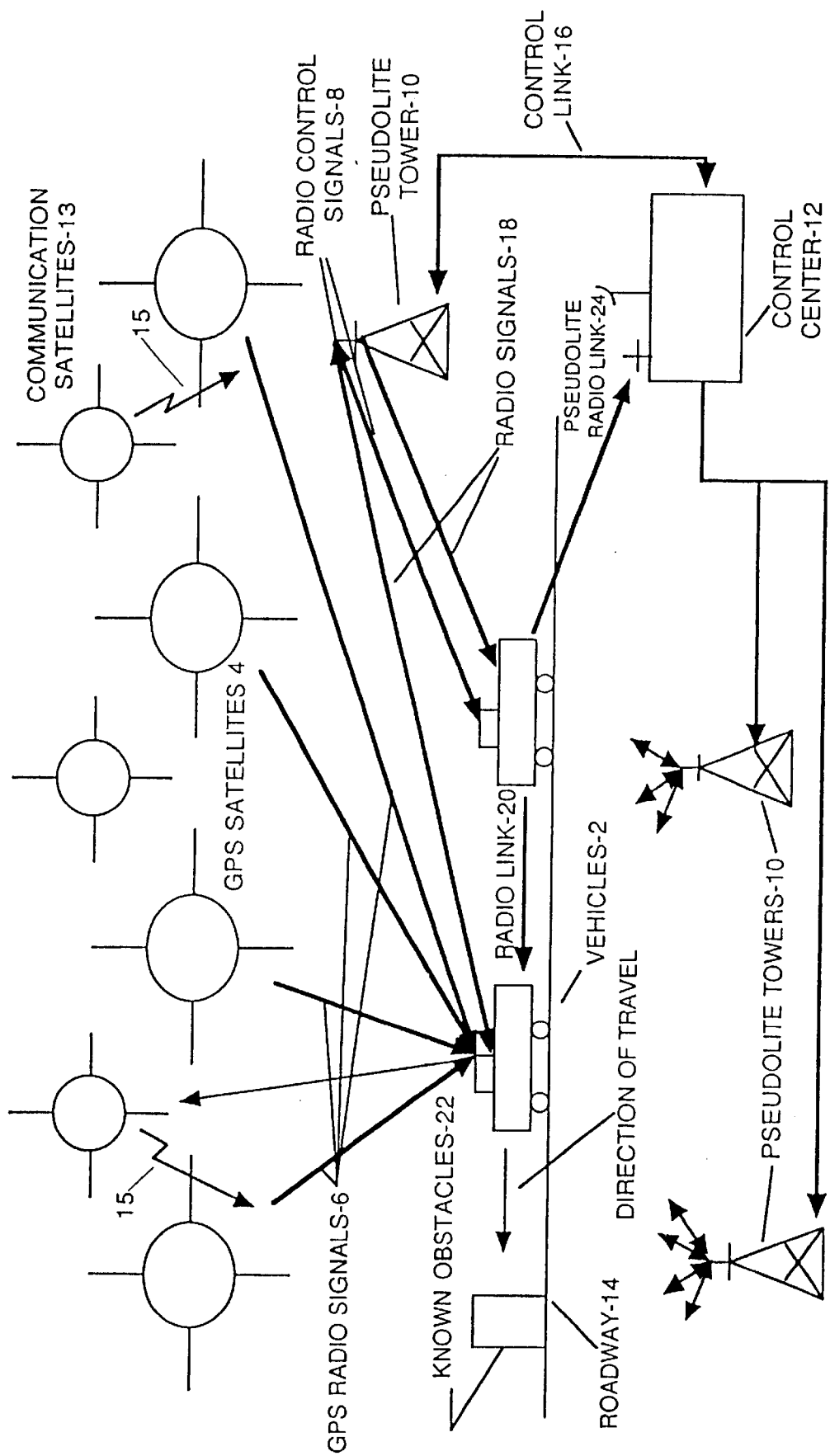
FIG. 1 is a schematic system diagram of the present invention illustrating the principal system elements in a GPS automobile-on-the-highway collision avoidance, warning, and control system including GPS satellites, master control center and pseudolite transmission stations.

DETAILED DESCRIPTION OF THE PREFERRED EMBODIMENT a. Scope of the Disclosure

The preferred embodiments of the inventions are described above in the Figures and Detailed Description. Unless specifically noted, it is applicant's intention that the words and phrases in the specification and claims be given the ordinary and accustomed meaning to those of ordinary skill in the applicable art(s). If applicant intends any other meaning, he will specifically state he is applying a special meaning to a word or phrase.

Likewise, applicant's use of the word "function" in the Detailed Description is not intended to indicate that the seeks to invoke the special provisions of 35 U.S.C. Section 112, paragraph 6 to define his invention. To the contrary, if applicant wishes to invoke the provision of 35 U.S.C. Section 112, paragraph 6, to define his invention, he will specifically set forth in the claims the phrases "means for" or "step for" and a function, without also reciting in that phrase any structure, material or act in support of the function. Moreover, even if applicant invokes the provisions of 35 U.S.C. Section 112, paragraph 6, to define his invention, it is applicant's intention that his inventions not be limited to the specific structure, material or acts that are described in his preferred embodiments. Rather, if applicant claims his invention by specifically invoking the provisions of 35 U.S.C. Section 112, paragraph 6, it is nonetheless his intention to cover and include any an all structures, materials or acts that perform the claimed function, along with any and all known or later developed equivalent structures, materials or acts for performing the claimed function.

For example, the present inventions make use of GPS satellite location technology, including the use of so called "Pseudolites" or Pseudo Satellites, to derive kinematic vehicle location and motion trajectory parameters for use in a vehicle collision avoidance system and method. The inventions described herein are not to be limited to the specific GPS devices disclosed in the preferred embodiments, but rather, are intended to be used with any and all such applicable satellite location devices, systems and methods, as long as such devices, systems and methods generate input signals that can be analyzed by a computer to accurately quantify vehicle location and kinematic motion parameters in real time. Thus, the GPS devices and methods shown and referenced generally throughout this disclosure, unless specifically noted, are intended to represent any and all devices appropriate to determine such location and kinematic motion parameters.

Likewise, for example, the present inventions generate surveillance image information for analysis by scanning using any applicable image or video scanning system or method. The inventions described herein are not to be limited to the specific scanning or imaging devices disclosed in the preferred embodiments, but rather, are intended to be used with any and all applicable electronic scanning devices, as long as the device can generate an output signal that can be analyzed by a computer to detect dangerous situations. Thus, the scanners or image acquisition devices are shown and referenced generally throughout this disclosure, and unless specifically noted, are intended to represent any and all devices appropriate to scan or image a given area. Accordingly, the words "scan" or "image" as used in this specification should be interpreted broadly and generically.

Further, there are disclosed several computers or controllers, that perform various control operations. The specific form of computer is not important to the invention. In its preferred form, applicant divides the computing and analysis operations into several cooperating computers or microprocessors. However, with appropriate programming well known to those of ordinary skill in the art, the inventions can be implemented using a single, high power computer. Thus, it is not applicant's intention to limit his invention to any particular form of computer.

Further examples exist throughout the disclosure, and it is not applicant's intention to exclude from the scope of his invention the use of structures, materials, or acts that are not expressly identified in the specification, but nonetheless are capable of performing a claimed function.

b. Overview of the Invention

The above and other objects are further achieved in the present inventions which provide motor vehicle collision avoidance, warning and control systems and methods using GPS satellite location systems augmented with Pseudolite (pseudo satellites) to provide centimeter location accuracy, and to derive vehicle attitude and position coordinates and vehicle kinematic tracking information. Ground based control center computers are used to communicate with vehicles on designated roadways for the purpose of receiving location and vehicle trajectory information and broadcasting control information to respective vehicles, such GPS location and computing systems being integrated with vehicle video scanning, radar/lidar, and on board speedometer and/or accelerometers to provide accurate vehicle location information together with information concerning hazards and/or objects that represent impending collision situations for each vehicle. Advanced image processing techniques are used to quantify video information signals and to derive vehicle warning and control signals based upon detected hazards.

Outputs from multiple sensors as described above are used in onboard vehicle fuzzy logic/expert system computing algorithms to derive optimum vehicle warning and control signals designed to avoid or minimize the effect of vehicle collisions with other vehicles or with other objects or hazards that may be present on given roadways. In the preferred embodiment, fuzzy logic control algorithms are used to develop coordinated braking, acceleration and steering control signals to control individual vehicles in an optimal manner to avoid or minimize the effects of potential collisions. Video, radar/lidar and GPS position and trajectory information are made available to each individual vehicle describing the movement of that vehicle and other vehicles in the immediate vicinity of that vehicle.

In addition, hazards or other obstacles that may represent a potential danger to a given vehicle are also included in the fuzzy logic calculations. Object, obstacles and/or other vehicles located anywhere to the front, rear or sides of a given vehicle are considered in the fuzzy logic control algorithms in the derivation of optimal control and warning signals. For example, if a vehicle is in a situation where a collision is imminent with an obstacle or another vehicle in front of that vehicle, it may be desirable to apply the brakes to slow the vehicle down to avoid the rear end collision. However, if another vehicle is rapidly approaching from the rear, then applying the brakes may avoid the collision with the vehicle in the front only to result in perhaps an even more serious collision with the vehicle located behind the controlled vehicle. Depending on the situation, it may be better to lightly apply the brakes and steer the vehicle to the right or to the left in a coordinated manner to avoid or minimize collisions with vehicles both to the front and to the rear. However, such decisions to steer to the right or left must also take into account the presence of other vehicles or obstacles that may be present in the direction of the steering of the vehicle. It can be seen then that a coordinated decision on braking, acceleration and steering must take into account potential collisions with vehicles or other objects in the total area surrounding the other vehicle. Such methods for achieving optimal integrated control and warning using fuzzy logic are herein disclosed.

c. FIG. 1 Overview

FIG. 1 illustrates an embodiment of the motor vehicle warning and control system and method herein disclosed based on the use of GPS (Global Positioning System) and image scanning technology and methods.

(1) GPS

Image scanning is used to augment the GPS location and vehicle velocity/acceleration data and to evaluate and classify road and highway hazards as described below. Lidar, radar and other vehicle sensor date is used to further augment the GPS and imaging data to develop vehicle warning and control signals based on comprehensive, integrated sensory information gathering and analysis. GPS is used to determine the exact location, velocity and acceleration of the motor vehicles, which information is used with other scanning inputs described above and with the computer control and fuzzy logic, expert system/decision methods herein disclosed for generation of warning and control signals for motor vehicles. GPS positioning technology has been developed by the United States Department of Defense (DOD) for military purposes and is generally available as a public service for precise location and tracking of objects located anywhere on the surface of the earth. GPS operates by transmitting precisely timed ranging signals from earth orbiting satellites, which signals are received by ground based receivers that in-turn calculate precise global locations using triangulation methods. The calculations are based on measured distances to multiple (typically four) earth orbiting GPS satellites.

As illustrated in FIG. 1, GPS Satellites 4 transmit such precise ranging signals 6 to motor vehicles 2 on roadway 14. The GPS signals are modulated with pseudo-random ranging codes that permit precise determination of the distance from individual satellites to each of the vehicles 2. The distance calculations are based on accurately measured time delays encountered by the ranging signals transmitted from individual satellites 4 to individual motor vehicles 2. GPS makes use of very accurate atomic clocks and precisely known earth orbits for individual satellites to make such precise position calculations. Multi-channel GPS receivers may be used in vehicles 2 to simultaneously track and determine ranges from multiple satellites to enhance real-time location calculation times.

The accuracy and response time performance of the real-time GPS motor vehicle warning and control systems and methods herein disclosed may be enhanced with the use of differential GPS implementations. Standard GPS satellite signals, such as the signals 6 of FIG. 1, encounter ionospheric and atmospheric propagation delays while traveling from satellites 4 to motor vehicles 2. Such delays give rise to uncertainties in the exact positions of the vehicles 2 when calculated using time-based triangulation methods. That is to say, because the propagation times from the satellites may vary depending on ionospheric and atmospheric conditions, the calculated range to the individual satellites is only known within certain tolerance ranges. Clock uncertainties likewise give rise to errors. Consequently, there is some uncertainty in the position information derived using these satellite signals.

(2) DGPS/Pseudolites

Differential GPS is one method of removing errors caused by uncertainties in propagation times in GPS ranging calculations. Differential GPS makes use of auxiliary ranging information from a stationary GPS receiver, the position of which is very precisely known. The use of differential GPS is illustrated in FIG. 1. The Pseudolite (Pseudo-Satellite) communication towers 10 receive ranging signals 6 from GPS satellites 4. The towers 10 are connected through control links to Communication Control Center 12 wherein precise GPS tower location information is computed and stored. Because the control towers 10 are stationary, very accurate location information can be determined.

GPS receivers use two PRN codes, the C/A and P codes to determine unambiguous range to each satellite. These codes are transmitted with "chip" rates of 1.203 MHz and 10.23 MHz respectively, resulting in wavelengths of about 300 meters and 30 meters, respectively. Hence the location resolution using these codes alone is insufficient for a real-time automotive collision avoidance and warning system. GPS satellites transmit on two frequencies, L1 (1575.42 MHz) and L2 (1227.6 MHz). The corresponding carrier wavelengths are 19 and 24 centimeters. In known techniques of range measurement described in the above cited incorporated references, the phase of these signals is detected, permitting range measurements with centimeter accuracy. Various techniques are known to resolve these ambiguities in real time for kinematic positioning calculations. Using known methods, the pseudo-lite stations of FIG. 1 are used both to transmit auxiliary ranging codes and to assist in carrier phase ambiguity resolution to permit precise vehicle tracking data for the disclosed invention. Pseudolite ranging signals are transmitted via radio signals 18.

The motor vehicle control and warning system and method of FIG. 1 is configured so that the vehicles are in separate radio contact with the Pseudolite Towers 10 by radio control links 8. The Pseudolite Tower 10 is in the same general vicinity as the motor vehicles 2. The tower 10 might be positioned, for example, to cover the principal highway or roadway 14, or, perhaps, an entire metropolitan area with the vehicles in the metropolitan area communicating with the tower 10 via radio control links such as the illustrated links 8. The tower 10 of FIG. 1 receives the same GPS ranging signals 6 from the GPS satellites 4 that are received by the vehicles 2. Based on the calculated propagation delay at a given instant for the GPS radio signals 6, the control center 12 may compute the predicted position of the tower 10 using known GPS code and carrier ranging and triangular calculation methods. Because the Control Center 12 also knows the true and accurate location of the tower 10, it may very precisely determine propagation delays caused by ionospheric and atmospheric anomalies encountered by the GPS radio signals 6.

Because the tower 10 is in the same general vicinity as the motor vehicles 2 on FIG. 1, it may be assumed that the signals that are received at the motor vehicles 2 will encounter the same propagation delays as those signals received at the tower 10. This being the case, the instantaneous propagation delay information may be communicated by radio control links 8 to vehicles 2, enabling the equipment in vehicles 2 to correct ranging calculations based on received GPS radio signals 6. This correction permits elimination of uncertainly in position information derived at the vehicles 2. Using differential GPS and carrier phase ranging, very accurate location information can be derived for the vehicles 2 for use in the motor vehicle warning, collision avoidance and control methods herein disclosed. The position and propagation correction information is broadcast on radio control signals 8 using, for example, a signal of known frequency that may be monitored by all vehicles 2 in the vicinity of the tower 10.

(3) Communications

Radio control signals 8 from control center 12 may also be used to command processing equipment in vehicles 2 to use particular GPS ranging calculation methods. The radio control signals 8 connecting motor vehicles 2 to the tower 10 of FIG. 1 are full-duplex communication links permitting bidirectional communication between the towers 10 and the vehicles 2 as illustrated. Using radio links 8, status information may be transmitted from control center 12 to the individual vehicles 2 and from the individual vehicles 2 back to control center 12. Each vehicle may transmit a unique identification code to control center 12. For example, each of the vehicles 2 in the vicinity of tower 10 may transmit precise location, velocity and acceleration vectors to the control center 12. The control center 12 may then return by radio link 8 position, velocity and acceleration vectors for other vehicles 2 in the vicinity of an individual vehicle, which other vehicles may represent a collision danger. In addition, the control center 12 has stored in its data base the location of known obstacles, such obstacle 22, on roadway 14. Example obstacles include bridge abutments, telephone poles, buildings, traffic light controls, walls, construction equipment, or any other known obstacle located along the roadway 14 which may pose a particular danger to a vehicle 2 traveling on that roadway. Such known obstacle locations can in turn be used in the herein above described vehicle collision avoidance control and warning systems and methods to properly control the steering, braking and acceleration of vehicles 2 to avoid such known obstacles or to minimize the effect a conclusion with such obstacles.

The GPS motor vehicle warning and control system and methods of FIG. 1 require radio communication between the motor vehicles 2 and the control and communication tower 10 via radio control signals 8 or via communication satellites 13 and radio control signals 15. Low orbit earth satellite, such as, currently proposed for worldwide cellular telephone service, are especially appropriate for two-way communications via radio links 15. In addition, radio communication links may be implemented between the individual vehicles 2 using radio links 20 as illustrated FIG. 1. Having determined its own precise location, velocity and acceleration vector, each vehicle 2 may broadcast that information via radio links 20 to surrounding vehicles, which may in turn use that information to derive vehicle warning and control signals to avoid or minimize the effects of collisions as herein above described. Alternatively, or in addition to radio links 20, radio control signals 8, 15, alone or in combination, may be used to inform individual vehicles 2 of the position, velocity and acceleration vectors of other vehicles in the immediate vicinity of each individual vehicle. Such information can then be used in the control systems and methods taught herein to derive vehicle warning and control signals to avoid or to minimize the effects of collisions with other vehicles.

Each of the individual vehicles 2 computes its own precise attitude, with respect to X, Y, and Z reference planes using conventional technology. Attitude of the automobile 2 on the highway 14 may be sensed by supporting multiple GPS antennae on the extremities of the vehicle and then comparing carrier phase differences of GPS signals 6 or DGPS psuedolite signals 8 simultaneously received at the antennae using conventional technology. Relative to a desired path of travel or relative to true or magnetic north, the precise deviation of the longitudinal or transverse axis of the automobile may be precisely measured along with the acceleration forces about these axis. These inputs may be sent to the calculating, analysis, control, and speech recognition computers 36,38,50,52 where they are analyzed and evaluated along with a multitude of other inputs in the formation of a collision hazard/object determination and collision avoidance maneuver. Through this process, it is recognized whether the automobile is skidding or spinning, what corrective action is needed to counteract whatever unusual attitude the automobile may be in to regain control, and then develop the best anti-collision maneuver for the particular situation. Thus, the system is capable of generating an attitude-compensated, collision avoidance solution. As further described below, separate fuzzy logic control inference rules may be used for spinning or skidding vehicles in collision avoidance maneuvers. A separate GPS receiver 32 may be connected to each antennae.

Each of the individual vehicles 2 computes its own precise location, velocity and X-Y-Z acceleration vectors, which are then transmitted via radio control signal 8 to control center 12, which, in-turn, may broadcast that information to other vehicles in the vicinity of an individual vehicle, thereby enabling the computation of warning and control signals at each vehicle based on the received control vector information. Communication between individual vehicles 2 and the control tower 10, and direct communication between vehicles 2 via radio links such as radio link 20, may be implemented using multiple access communication methods including frequency division multiple access (FDMA), timed division multiple access (TDMA), or code division multiple access (CDMA) in a manner to permit simultaneous communication with and between a multiplicity of vehicles, and, at the same time, conserve available frequency spectrum for such communications. Broadcast signals from individual vehicles to surrounding vehicles and from the control tower 10 to individual vehicles will permit simultaneous communication with and between a multiplicity of vehicles using such radio signals.

The GPS motor vehicle and warning control system method of FIG. 1 may be used in combination with video and radar/lidar image acquisition and processing vehicle location systems and methods such as those taught in applicant's co-pending application Ser. No. 08/105,304, Motor Vehicle Warning and Control System and Methods, herein incorporated by reference and as further described below.

In one embodiment of the present invention, the GPS receiver, GPS transceiver, radar/lidar, and other scanning sub-systems disclosed herein may be embodied in a single, low cost, very large scale integrated circuit. The same is also true of other sub-systems disclosed herein, such as, the processors. Such scanning systems may also be supported on a trackable airborne platform, such as, drone aircraft flying race-track patterns carrying T.V. scanning cameras, infrared or optical scanners and radar/lidar scanners with related computers and processing equipment.

For example, one mode of the invention involves two vehicles on a roadway each sharing its GPS determined position with the other. As described below, supplemental scanners using various technologies also provide position fixes on nearby vehicles. Thus, each vehicle using its own and the other's GPS determined position and the position of the other provided by the back-up scanners, is able to more accurately determine position, e.g., for itself or the other vehicle as a form of a more accurate positioning. For example, obvious errors caused by erroneous signals may be eliminated using multiple sensor inputs. One way of combining such multiple positions may be by an averaging method or a majority rule method.

Figure 2:
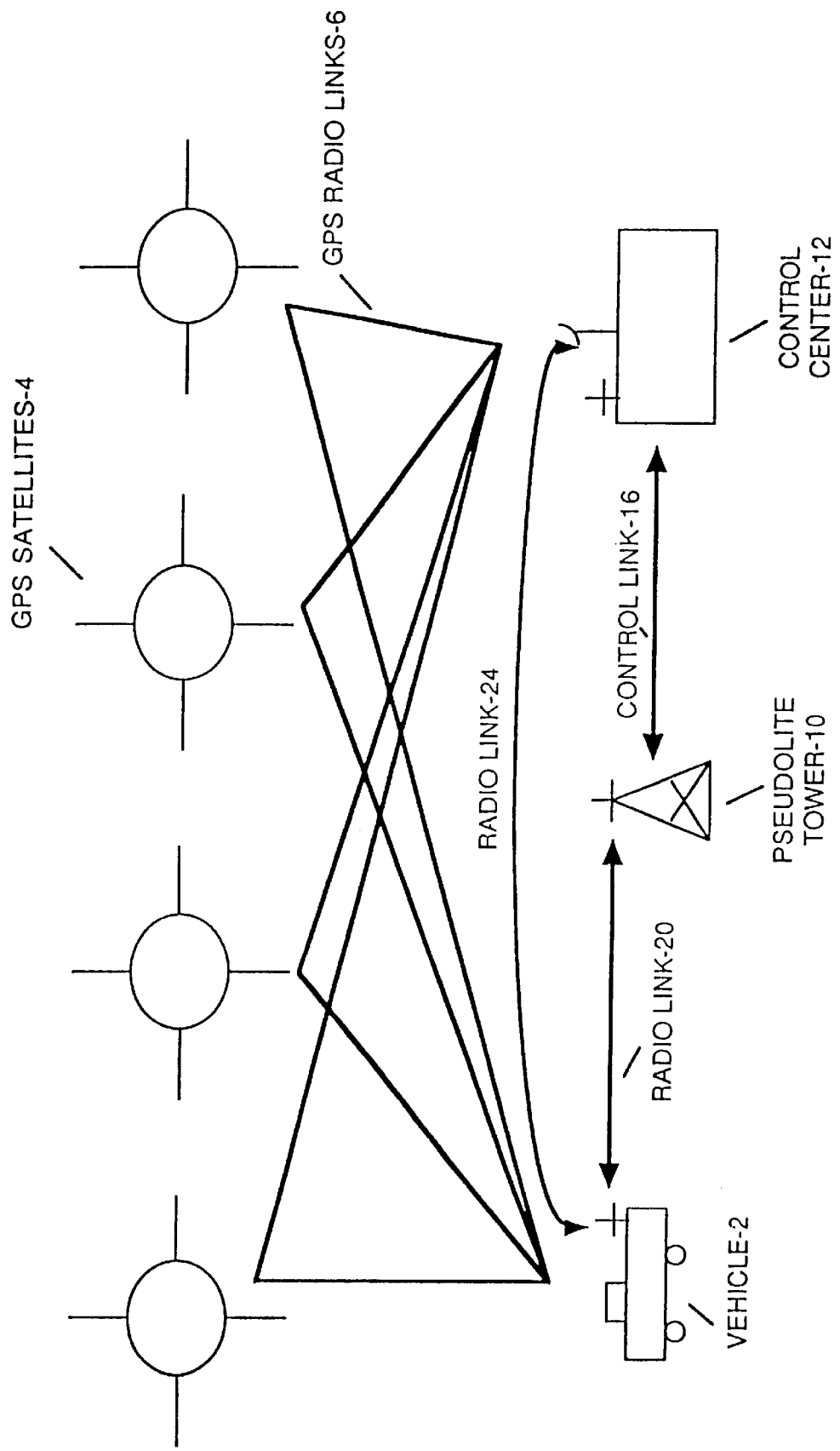
FIG. 2 is a schematic system diagram of the present invention illustrating operation of a kinematic GPS/pseudolite location and dynamic velocity/acceleration determination system and method.
Figure 3:
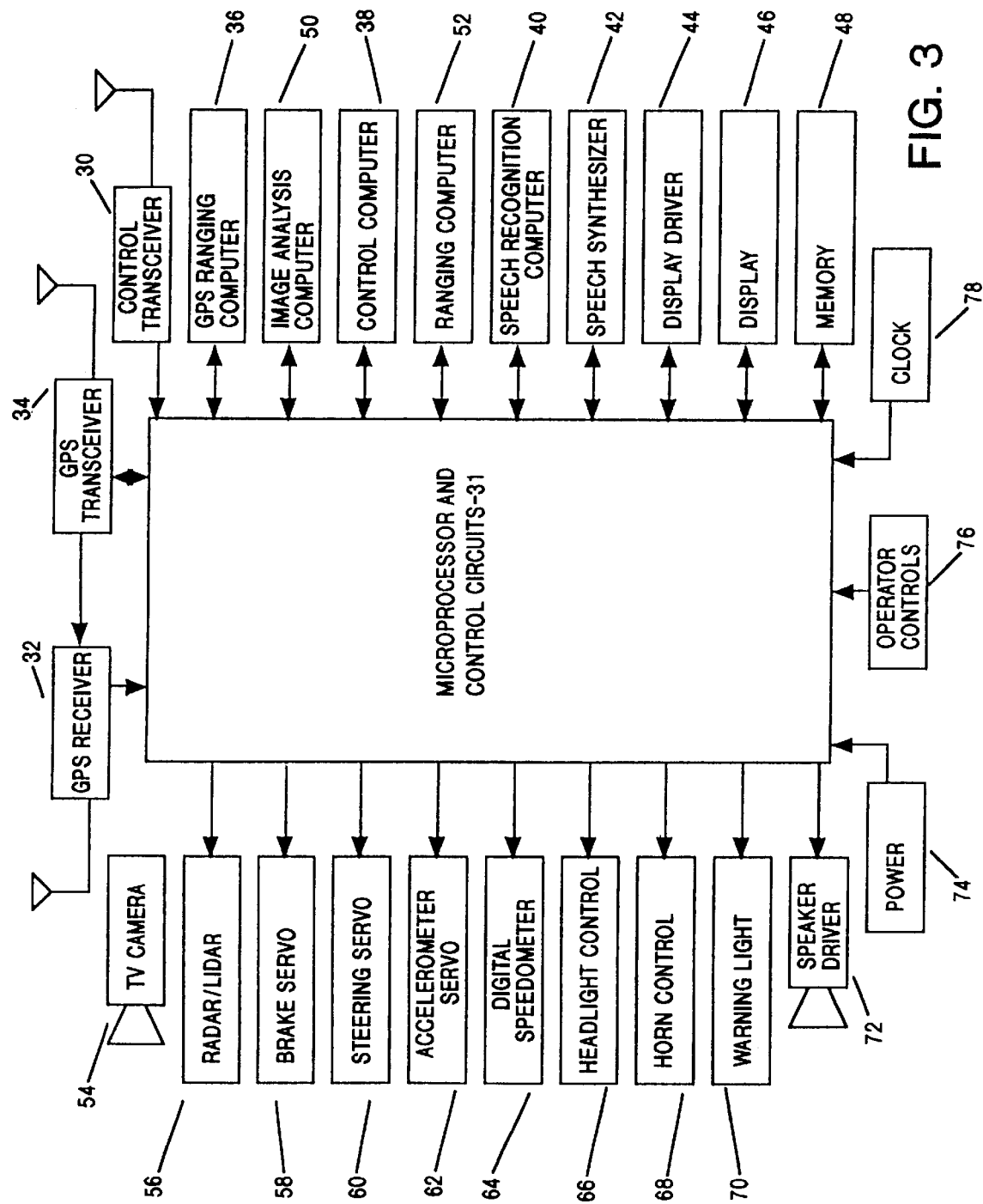
FIG. 3 is a block diagram of the overall automobile-on-the-highway collision avoidance, warning, and control system and method of the present invention illustrating system sensors, radio transceivers, computers, displays, input/output devices and other key elements.

FIG. 2 illustrates specific communication paths involved in the GPS/Pseudolite Vehicle Tracking System and Method of FIG. 1. GPS Satellites 4 broadcast ranging signals 6 received by vehicle 2 and control center 12. Differential GPS and carrier phase tracking data are transmitted via radio links 24 and control links 16. Pseudolite towers 10 communicate with vehicle 2 via radio link 20 directly (FIG. 2) or, indirectly, via communication satellites 13 and radio link 15 (FIG. 1). The total network of FIGS. 1,2 permits using precise centimeter tracking of the Vehicle 2 in the vehicle collision avoidance, warning system and methods herein described.

d. FIG. 3 System Overview

As illustrated in FIG. 3, the overall vehicle control and warning system is implemented using micro-processor and control circuits 31 to interconnect and route various signals between and among the illustrated subsystems. GPS receiver 32 is used to receive GPS radio signals 6 as illustrated in FIG. 1. In addition, GPS transceiver 34 is used to transmit and receive radio control signals 8,15 between individual vehicles 2 and Pseudolite control towers 10 and communications satellites 13 of FIG. 1. Additional control transceiver 30 receives and transmits auxiliary control signals and messages from multiple sources including other vehicles as described below. GPS receiver 32, GPS Pseudolite transceiver 34, and control transceiver 30 include necessary modems and signal processing circuitry to interface with the microprocessor and control circuits 31. As described above, the GPS transceiver 34, as well as control transceiver 30, may be implemented using frequency division, time division or code division multiple access techniques and methods as appropriate for simultaneous communication between and among multiple motor vehicles 2 and radio control towers 10. In an alternate embodiment, not shown, GPS transreceiver 34 may be a cellular radio also linked to communications satellites 13 using conventional technology described in patents referenced above. Additionally, the host vehicle may have several GPS receivers 32 positioned on the extremities of the host vehicle for use in determining host vehicle attitude relative to a reference plane and direction using conventional phase comparison technology described in patents referenced above.

The GPS ranging computer 36 receives GPS signals from the GPS receiver 32 to compute host vehicle attitude and host vehicle position, velocity and acceleration vectors for the vehicle. GPS signals are received from multiple GPS satellites by GPS receiver 32 for processing by GPS ranging computer 36. In addition, GPS receiver 32 may be configured to receive the Pseudolite signals as illustrated in FIG. 1 and discussed above. GPS transceiver 34 receives GPS correction signals from GPS control center 12 to implement differential GPS calculations using GPS ranging computer 36 as also described above. Such differential calculations involve removal of uncertainty in propagation delays encountered by the GPS radio signals 6 of FIG. 1.

GPS transceiver 34 is also configured to receive the vehicle location, velocity and acceleration vectors via radio links 8 as illustrated in FIG. 1 for other motor vehicles. These signals, together with the outputs from GPS computer 36, are fed to the automotive control computer 38 to derive the control and warning signals for the vehicle. In addition, or alternatively, GPS transceiver 34 may receive broadcast vehicle location, velocity and acceleration vectors from other vehicles in the vicinity of the vehicle being controlled as determined by control center 12 and transmitted by radio control signals 8,15 of FIG. 1.

The automotive control computer 38 generates vehicle control and warning signals based on calculations such as those described herein using expert system fuzzy logic inference rules to avoid or minimize the effects of collisions with other vehicles and/or objects. Signals from automotive control computer 38 are fed to brake servo 58, steering servo 60, accelerator servo 62, head light control 66, horn control 68, and warning light 70 to actuate and control these systems as herein above described using fuzzy logic or other expert system derived control signals. The automotive control computer 38 will also generate via speech synthesizer 42 warning signals for the driver which are annunciated using speaker driver 72 as illustrated in FIG. 3.

FIG. 3 also discloses the use of the speech recognition computer 40 to receive spoken commands from the vehicle operator to supplement, override, or otherwise alter the automated vehicle control and warning signals generated by the automated control computer 38. Speech recognition computer 40 may also be used, for example, to receive spoken commands which may be transmitted to control center 12 requesting specific information from that control center relative to driving conditions such as together with the outputs from GPS computer 36, are fed to the automotive control computer 38 to derive the control and warning signals for the vehicle. In addition, or alternatively, GPS transceiver 34 may receive broadcast vehicle location, velocity and acceleration vectors from other vehicles in the vicinity of the vehicle being controlled as determined by control center 12 and transmitted by radio control signals 8,15 of FIG. 1.

The automotive control computer 38 generates vehicle control and warning signals based on calculations such as those described herein using expert system fuzzy logic inference rules to avoid or minimize the effects of collisions with other vehicles and/or objects. Signals from automotive control computer 38 are fed to brake servo 58, steering servo 60, accelerator servo 62, head light control 66, horn control 68, and warning light 70 to actuate and control these systems as herein above described using fuzzy logic or other expert system derived control signals. The automotive control computer 38 will also generate via speech synthesizer 42 warning signals for the driver which are annunciated using speaker driver 72 as illustrated in FIG. 3.

FIG. 3 also discloses the use of the speech recognition computer 40 to receive spoken commands from the vehicle operator to supplement, override, or otherwise alter the automated vehicle control and warning signals generated by the automated control computer 38. Speech recognition computer 40 may also be used, for example, to receive spoken commands which may be transmitted to control center 12 requesting specific information from that control center relative to driving conditions such as digitized in an A/D convertor and passed directly to and through a video preprocessor and to microprocessor and control circuits 31 to an image field analyzing computer 50 which may be implemented and programmed using neural networks and artificial intelligence as well as fuzzy logic algorithms to (a) identify objects on the road ahead such as other vehicles, pedestrians, barriers and dividers, turns in the road, signs and symbols, etc, and generate identification codes, and (b) detect distances from such objects by their size (and shape) and provide codes indicating same for use by a decision control computer, 38. The computer 38 generates coded control signals which are applied through the circuits 31 or are directly passed to various warning and vehicle operating devices such as a braking servo 58, a steering servo or drive(s) 60, and accelerator servo 62; a synthetic speech signal generator 42 which sends trains of indicating and warning digital speech signals to a digital-analog converter connected to a speaker driver 72; a display 31 which may be a heads-up or dashboard display; a head light controller 66 for flashing the head lights, a warning light control 70 for flashing external and/or internal warning lights; a horn control 68, etc.

A digital speedometer 64 and accelerometer(s) 62 provide information signals for use by the decision control computer, 38, in issuing its commands. Accelerometer(s) 62 are connected to control computer microprocessor 31 through appropriate analog-to-digital converter(s). The accelerometer(s) 62 may pass data continuously to control computer microprocessor 31, or, alternatively, respond to query signals from said control computer 31. An auxiliary range detection means includes a ranging computer calculations in computer 38 which accepts digital code signals from the radar or lidar sensors 56, interpreting radar and/or laser range signals from respective reflected radiation receiving means on the vehicle.

Figure 4:
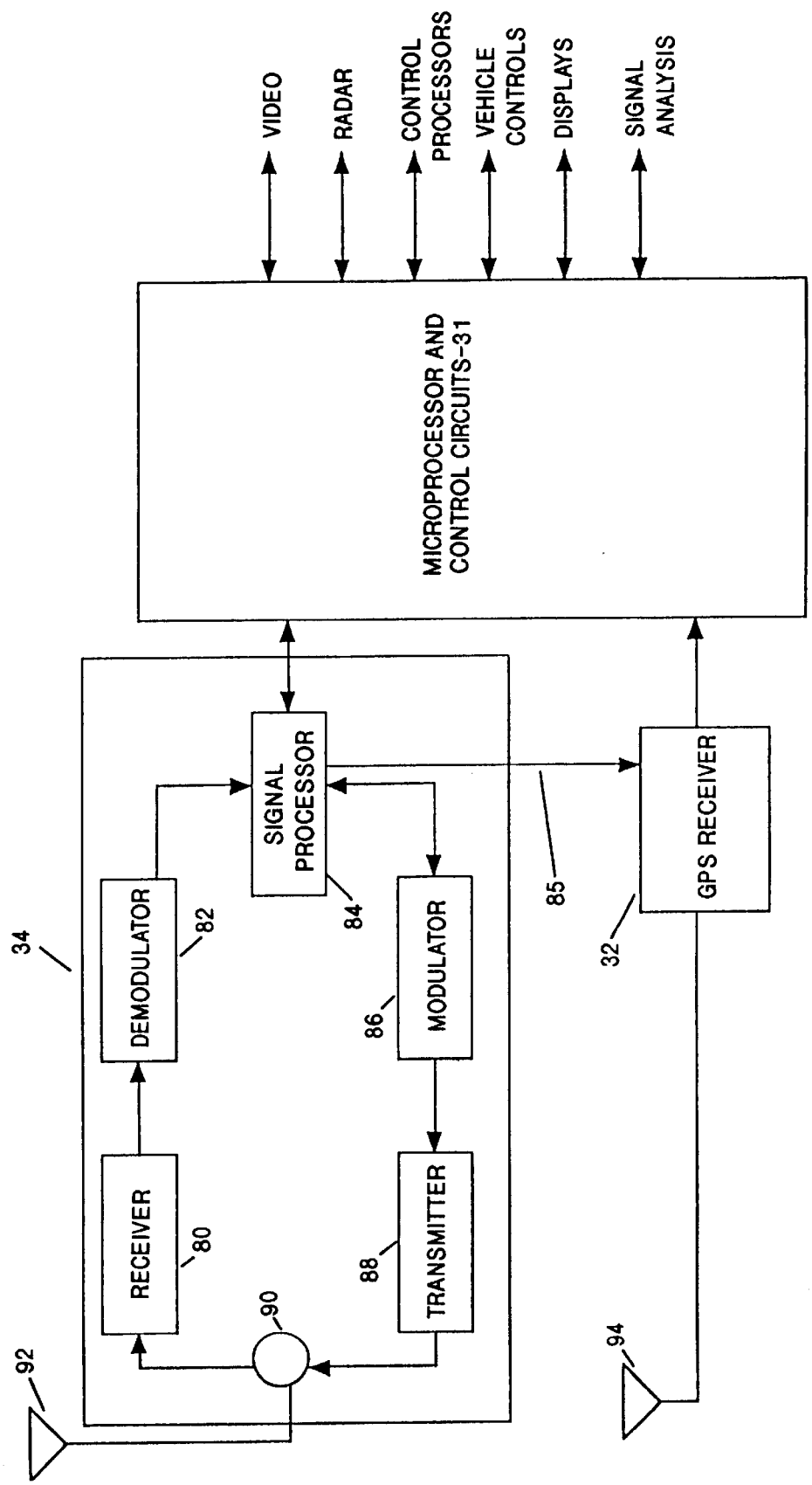
FIG. 4 is a block diagram illustrating in more detail vehicle GPS signal receivers and interfaces to other vehicle control, display and input/output systems.

The image analyzing computer 50 with its associated memory may be implemented in several different ways. High speed image processing is used with the capability to detect various hazards in dynamic image fields with changing scenes, moving objects and multiple objects, more than one of which may be a potential hazard. Requirements for wide angle vision and the ability to analyze both right and left side image fields and image fields behind the vehicle also exists. The imaging system not only detects hazards, but also estimates distance based on image data for input to the control computer 38.

e. FIG. 4 GPS/Psuedolite Radio System

FIG. 4 depicts a motor vehicle GPS/pseudolite radio system for use in the vehicles 2 of FIG. 1. The system of FIG. 4 includes the GPS transceiver 34 and receiver 32 of FIG. 3 connected to the microprocessor control circuits 31, which inturn, provide inputs to the various vehicle systems as indicated in FIG. 3 and FIG. 4. The GPS transceiver 34 receives signals from pseudolite tower 10 of FIG. 1 via radio control signals 8 and antenna 92. The transceiver 34 includes both a receiver and a transmitter section coupled to antenna 92 via a directional antenna coupler 90. The receiver 80 receives radio control signals 8 and provides standard baseband outputs to the demodulator 82 for detection of signals received from pseudolite tower 10 of FIG. 1. The output of demodulator 82 is fed to signal processor 84. Signal processor 84 also provides return information via modulator 86 and transmitter 88 for transmission to the pseudolite tower 10 and control center 12 as illustrated in FIG. 1.

The receiver 80 may be implemented separately from the demodulator 82 using standard RF, IF receiver technology to generate the baseband signal for demodulation via demodulator 82. Alternatively, modern high speed digital signal processing (DSP) technology may be used for realization of the receiver and demodulator functions in a single digital signal processing element. Similarly the modulator and transmitter may be implemented separately using standard radio system technology or via high speed DSP circuitry.

Figure 5:
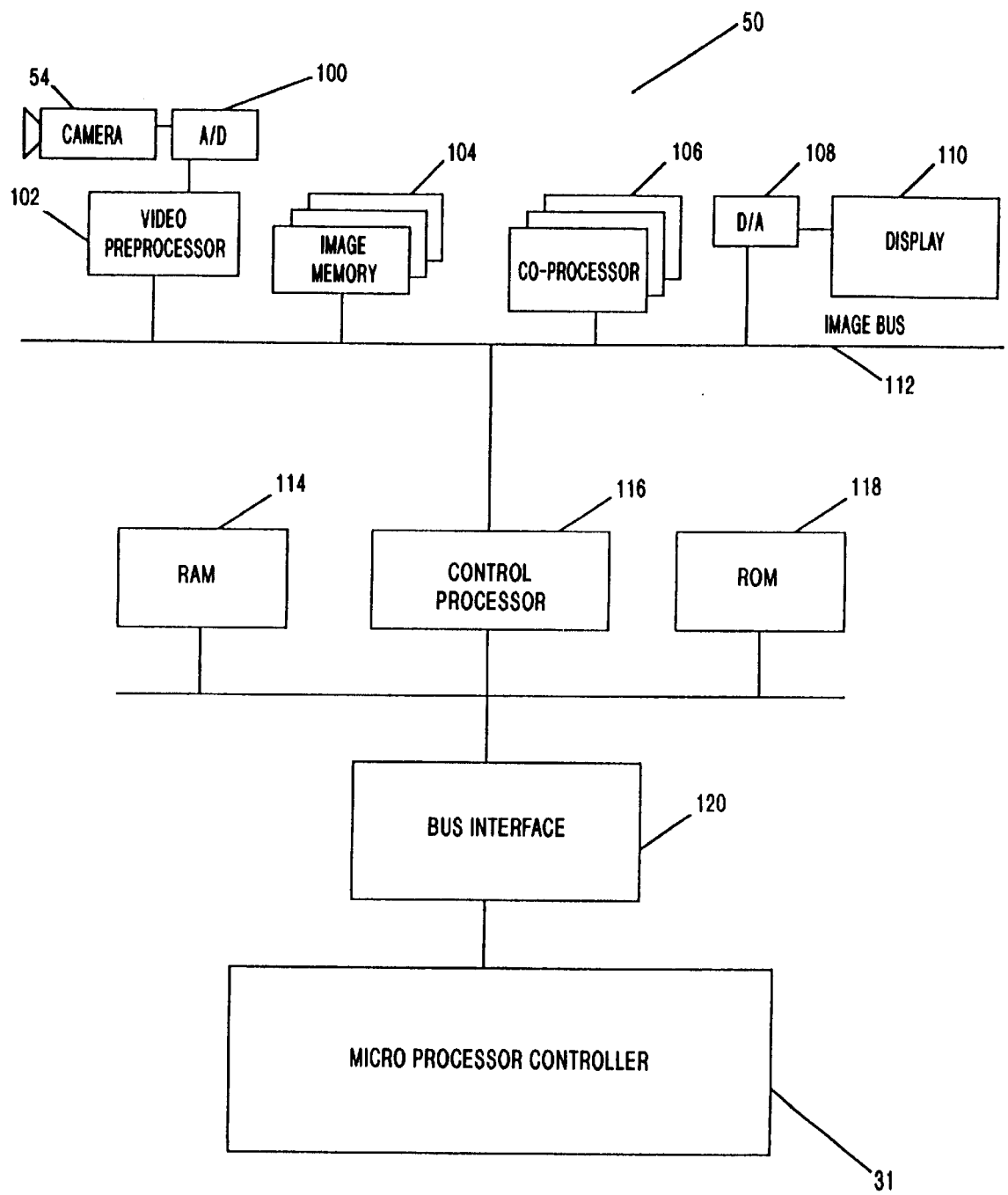
FIG. 5 is a block diagram of an image analysis computer 50 of the type that can be used in the GPS automobile-on-the-highway collision avoidance, warning, and control system and method of FIG. 3.

The transceiver 34 of FIG. 4 receives radio control signals 8,15 from pseudolite tower 10 or communication satellite 15, respectively, including range correction and phase ambiguity resolution information from control center 12. This information is transmitted via signal processor 84 to GPS receiver 32. GPS receiver 32 receives inputs from GPS satellites 4 via GPS radio signals 6 of FIG. 1. These signals are received at antenna 94 for processing in GPS receiver 32 using known GPS receiver technology. As explained above, the GPS signal received at antenna 94 is modulated with multiple PRN ranging codes. Signal 85 from signal processor 84 provides information to GPS receiver 32 to improve ranging accuracy via elimination of errors arising from propagation anomalies and clock uncertainties. In addition, as also discussed above, the signal 85 provides carrier phase information to enable GPS receiver 32 to derive ranging information with centimeter accuracy, permitting real time kinematic tracking of the motor vehicle. Thus, the use of differential GPS and carrier phase tracking ranging permit real time vehicle position and motion vector calculation. The output from GPS receiver 32 is passed via microprocessor and control circuits 31 to the ranging and control processor as indicated in FIG. 4.

f. FIG. 5 Image Processing—Parallel Architecture

High speed image processing can be implemented employing known special purpose computer architectures including various parallel system structures and systems based on neural networks. FIG. 5 shows a high speed parallel processor system embodiment with dedicated image processing hardware. The system of FIG. 5 has a dedicated image data bus 112 for high speed image data transfer. The video camera 54 transfers full-frame video picture signal/data to the image bus 112 via analog/digital converter 100 and video preprocessor 102. The video camera 54 is preferably a CCD array camera generating successive picture frames with individual pixels being digitized for processing by the video preprocessor 102. The video camera 54 may also be implemented with other technologies including known image intensifying electron gun and infra-red imaging methods. Multiple cameras may be used for front, side and rear viewing and for stereo imaging capabilities suitable for generation of 3-Dimensional image information including capabilities for depth perception and placing multiple objects in three dimensional image fields to further improve hazard detection capabilities.

As shown in FIG. 5, the video preprocessor 102 performs necessary video image frame management and data manipulation in preparation for image analysis. The preprocessor 102 may also be used in some embodiments for digital prefiltering and image enhancement. Actual image data can be displayed in real time using video display 110 via analog-to-digital converter 108. The image display may include highlighting of hazards, special warning images such as flashing lights, alpha-numeric messages, distance values, speed indicators and other hazard and safety related messages. Simulated as well as actual video displays may also be used to enhance driver recognition of dangerous situations.

The Image Analysis Computer 50 operates under the control of control processor 38 as shown in FIG. 3. The control processor 38 communicates with the motor vehicle, collision avoidance, warning and control system microprocessor controller 31 through the Bus Interface Unit 120. Results of the image analysis are passed in real-time to microprocessor controller 31 for integration with other sensory, computing, warning and control signals as depicted in FIG. 3.

The Image Analysis Computer 50 of FIG. 3 uses high speed dedicated co-processor 106 for actual image analysis under control of the control processor 116. Typical operations performed using co-processors 106 include multidimensional filtering for operations such as feature extraction and motion detection. The co-processors 106 are used for multidimensional discrete transforms and other digital filtering operations used in image analysis. Multiple image memories 104 with parallel access to successive image data frames via image bus 112 permit concurrent processing with high speed data access by respective co-processing elements 106. The co-processor elements 106 may be high speed programmable processors or special purpose hardware processors specifically constructed for image analysis operations. SIMD (single instruction, multiple data) architectures provide high speed operation with multiple identical processing elements under control of a control unit that broadcasts instructions to all processing elements. The same instruction is executed simultaneously on different data elements making this approach particularly well suited for matrix and vector operations commonly employed in image analysis operations. Parallel operations of this type are particularly important with high pixel counts. A 1000×1000 pixel image has one million data points. Tightly coupled Multiple Instruction, Multiple Data (MIMD) architectures also are used in image processing applications. MIMD systems execute independent but related programs concurrently on multiple processing elements.

Various array processor and massively parallel architectures known to those skilled in the art may also be used for real-time image analysis.

The calculation of the distance of certain recognizable objects from the vehicle is facilitated by having standard images stored in memory and recalling and comparing such image data with image data representing the object detected by the vehicle scanning mechanisms. For example, virtually all automobiles, trucks, and other standard vehicles have known widths. It follows that the distance to another vehicle can be determined by calculating its width in the scanned image. If a CCD camera is used, for example, the width can ascertained in pixels in the image field. The distance to the vehicle can then be easily calculated using a simple relationship wherein the distance will be directly proportional to the object image width in pixels. The relative velocities and accelerations can also be easily calculated from respective first and second derivatives of the image width with respect to time. These image measurements and calculations can be used in addition to GPS and radar/lidar signal measurements or they may be used alone depending on system requirements.

g. Neural Computing Network and Parallel Architecture

Figure 6:
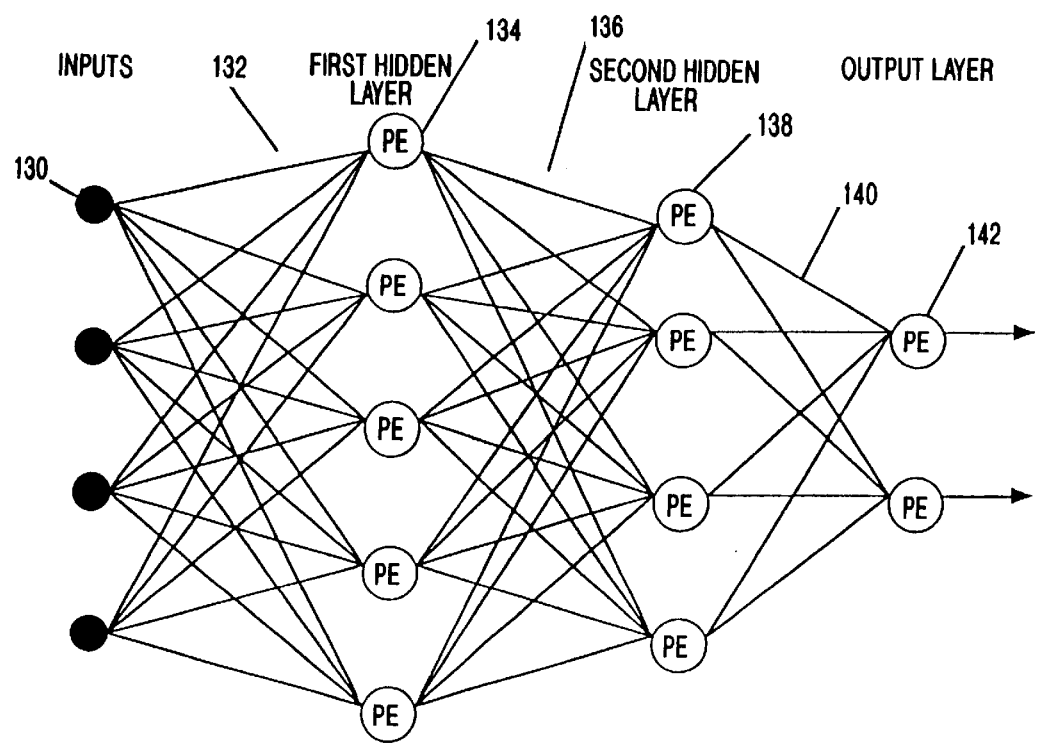
FIG. 6 is a schematic diagram illustrating a neural network of the type useful in the image analysis computer of FIG. 5.

In another embodiment, the image analyzing computer 50 is implemented as a neural computing network with networked processing elements performing successive computations on input image structure as shown in FIG. 6 where signal inputs 130 are connected to multiple processing elements 134, 138 and 142 through the network connections 132, 136 and 140. The processing elements (PE's) 134, 138 and 142 map input signal vectors to the output decision layer, performing such tasks as image recognition and image parameter analysis.

Figure 7:
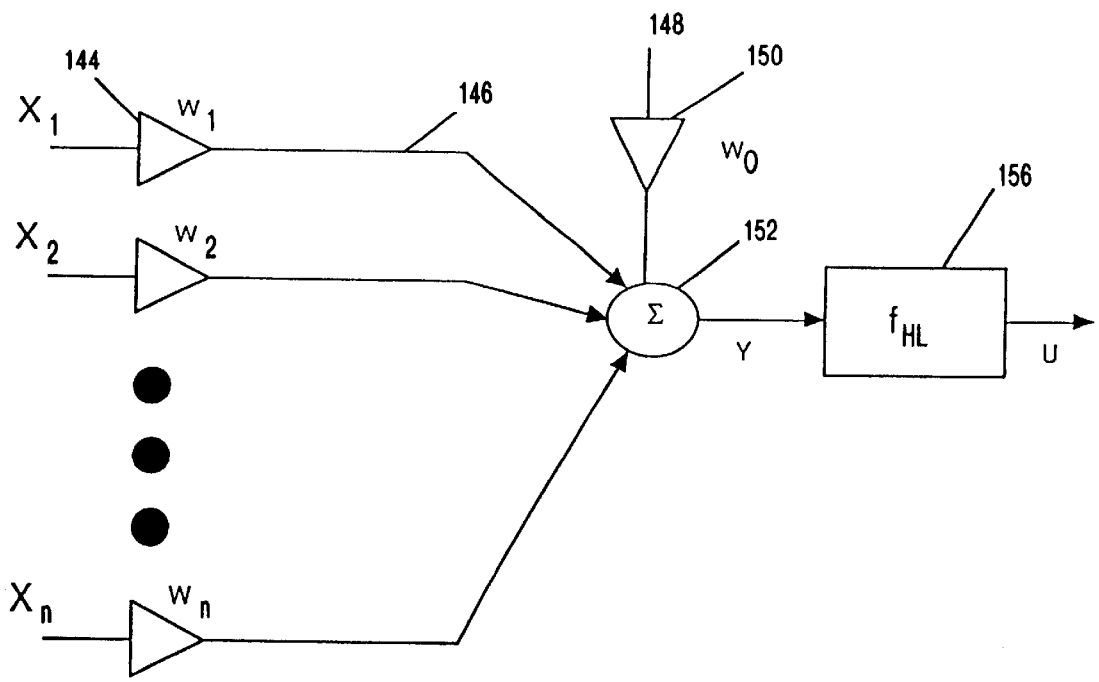
FIG. 7 is a schematic diagram illustrating the structure of a processing element ("PE") in the neural network of FIG. 6.

A typical neural network processing element known to those skilled in the art is shown in FIG. 7 where input vectors, (X1, X2 . . . Xn) are connected via weighing elements 144 (W1, W2 . . . Wn) to a summing node 152. The output of node 152 is passed through a nonlinear processing element 156 to produce an output signal, U. Offset or bias inputs 148 can be added to the inputs through weighting circuit 150. The output signal from summing node 152 is passed through the nonlinear element 156. The nonlinear function is preferably a continuous, differentiable function such as a sigmoid which is typically used in neural network processing element nodes. Neural networks used in the vehicle warning system are trained to recognize roadway hazards including automobiles, trucks, and pedestrians. Training involves providing known inputs to the network resulting in desired output responses. The weights are automatically adjusted based on error signal measurements until the desired outputs are generated. Various learning algorithms may be applied. Adaptive operation is also possible with on-line adjustment of network weights to meet imaging requirements. The neural network embodiment of the image analysis computer 50 provides a highly parallel image processing structure with rapid, real-time image recognition necessary for the Motor Vehicle Collision Avoidance Warning and Control System. Very Large Scale Integrated (VLSI) Circuit implementation of the neural processing elements permits low-cost, low-weight implementation. Also, a neural network has certain reliability advantages important in a safety control and warning system. Loss of one processing element does not necessarily result in a processing system failure.

Figure 8:
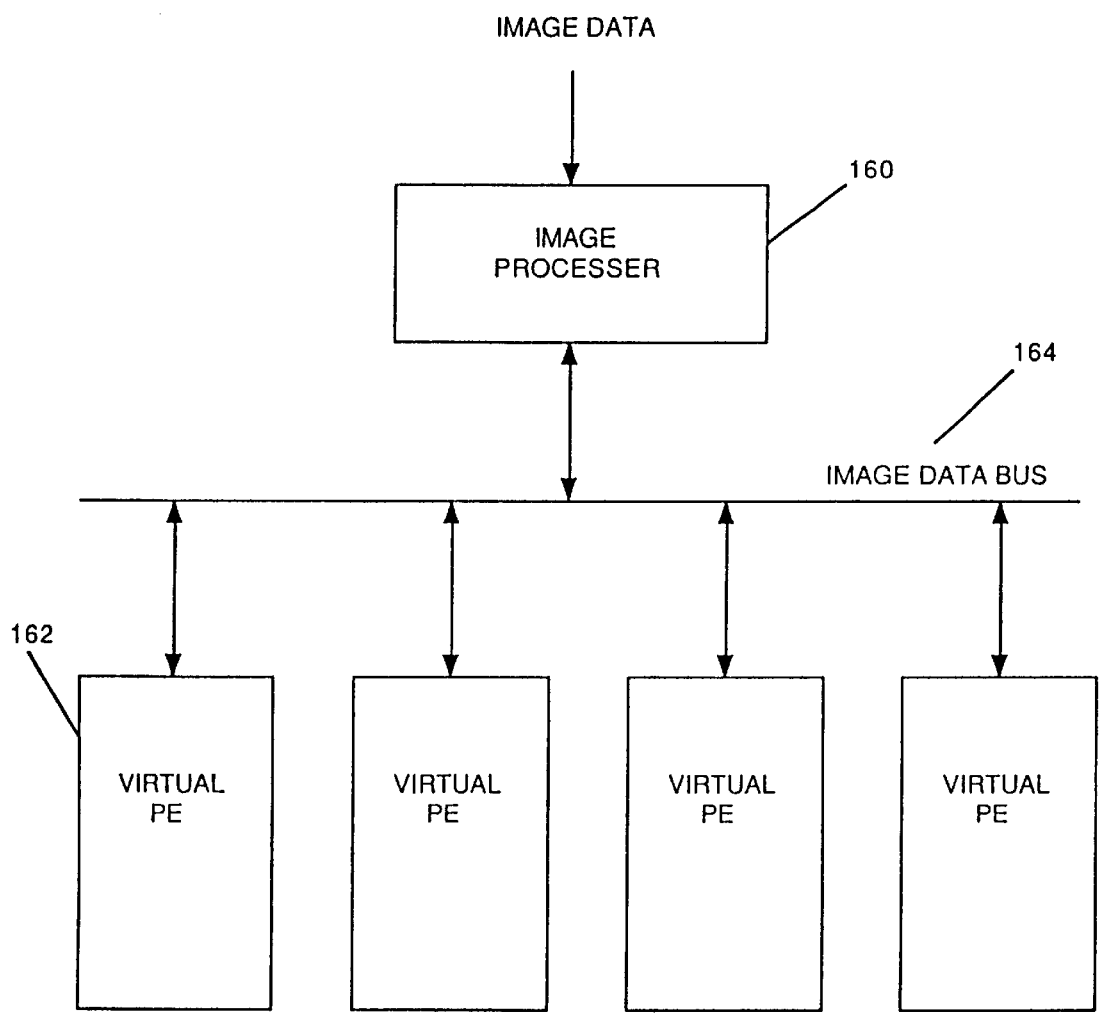
FIG. 8 is a block diagram of an alternate embodiment of a neural network image processor useful in the system of FIG. 3.

In a alternate embodiment, the neural network computing network of FIG. 6 can be implemented using multiple virtual processing elements 162 interconnected via an image data bus 164 with an image processor 160 as shown in FIG. 8. Image data presented to the Image Processor 160 is routed to selected virtual processing elements 162 which implement the neural network computing functions. The virtual PE's may be pipelined processors to increase speed and computational efficiency.

Figure 9:
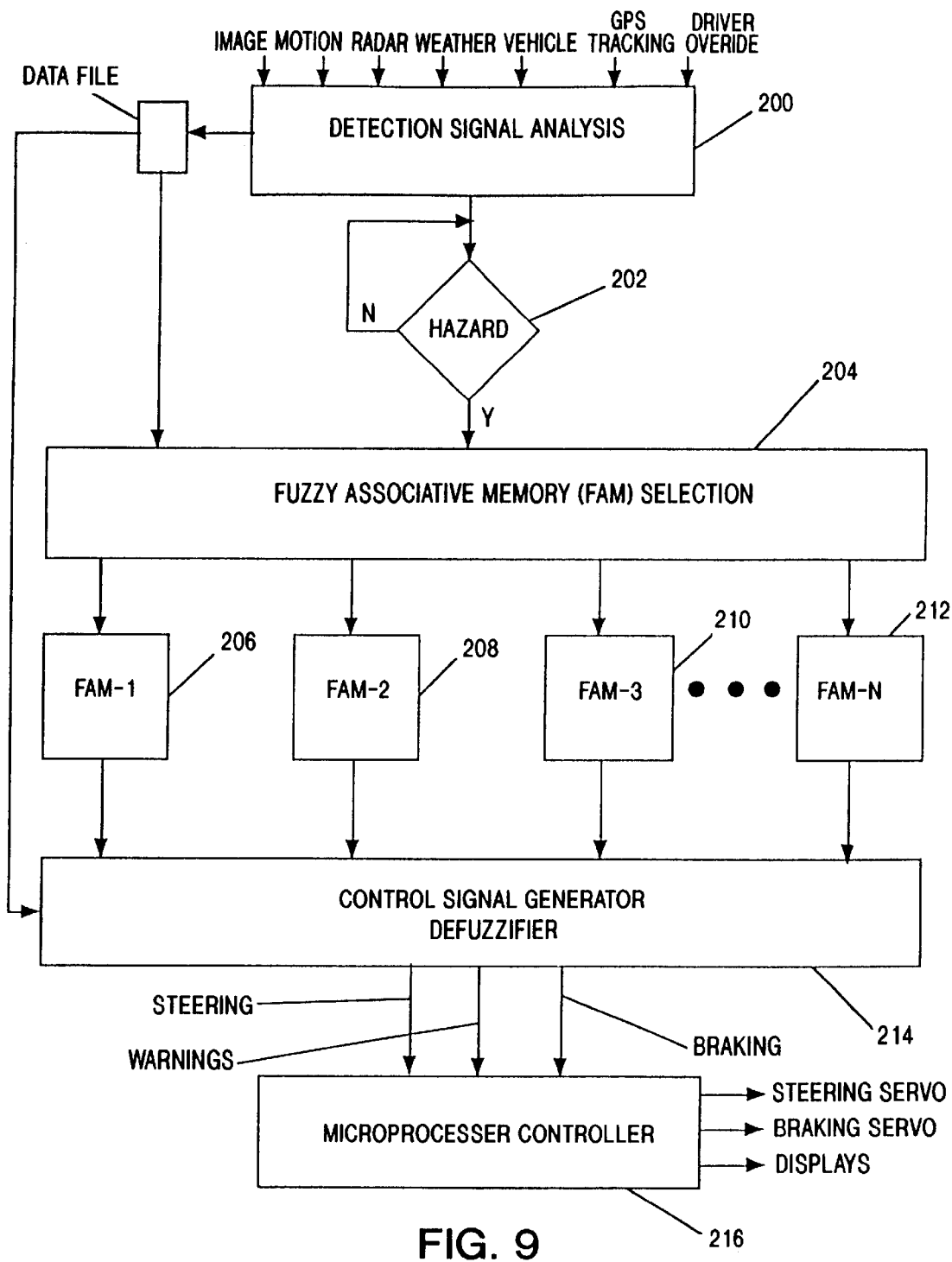
FIG. 9 is a flow diagram illustrating the overall operation of the GPS automobile-on-the-highway collision avoidance, warning, and control system and method of FIG. 3.

The decision computer 38 of FIG. 3 integrates the inputs from the image analysis computer 50, GPS ranging computer 36, digital accelerometer 62, and the radar/lidar computer 14 to generate output warning and control signals. Warning signals alert the driver of impending hazards and, depending on the situation, actual vehicle control signals may be generated to operate the vehicle in a manner that will avoid the hazard or minimize the danger to the vehicle and passengers. Control signals will be generated to operate brake servos 58, acceleration servo 62 and steering servos 60. Manual overrides are provided to ensure driver vehicle control if necessary.

h. FIG. 9 Fuzzy Logic Implementation

A particularly attractive embodiment of the control computer 38 of FIG. 3 makes use of Fuzzy Logic Algorithmic structures to implement the automated control and warning signal generation. Fuzzy Logic is particularly well suited to the vehicle control problem where it is necessary to deal with a multiplicity of image, motion, and environmental parameters, each of which may extend over ranges of values and in different combinations which require different responses.

FIG. 9 illustrates a Flow Diagram for implementing a fuzzy logic vehicle control and warning signal generation system suitable for the decision control computer 38. The system of FIG. 9 receives inputs via the microprocessor and control circuits 31 of FIG. 3. Inputs include image analysis outputs, GPS coordinating and tracking data, motion sensor outputs (including possible output from motion sensors and transmitters embedded in highway), vehicle attitude measurements, distance measurements from radar/lidar systems, and environmental parameters which may indicate adverse driving conditions including rain or ice. The input signals are analyzed in a preprocessing step for hazardous conditions in the processing block 200. When a hazard is detected, the Fuzzy Associative Memory (FAM) Section block 204 described in more detail below is activated via decision element 202. If no hazard is present, the system continues to analyze scanning signals until a hazardous situation is encountered.

The Fuzzy Associative Memory (FAM) Block 204 also receives a parameter input file from the Detection Signal Analysis Block 200. This file contains necessary information to make control decisions including, for example, hazard location (front, back, left side, right side), hazard distance, relative velocity, steering angle, braking pressure, weather data, and the presence or absence of obstructions or objects to the front, rear, or to either side of the vehicle, vehicle attitude, etc.

Figure 10A:
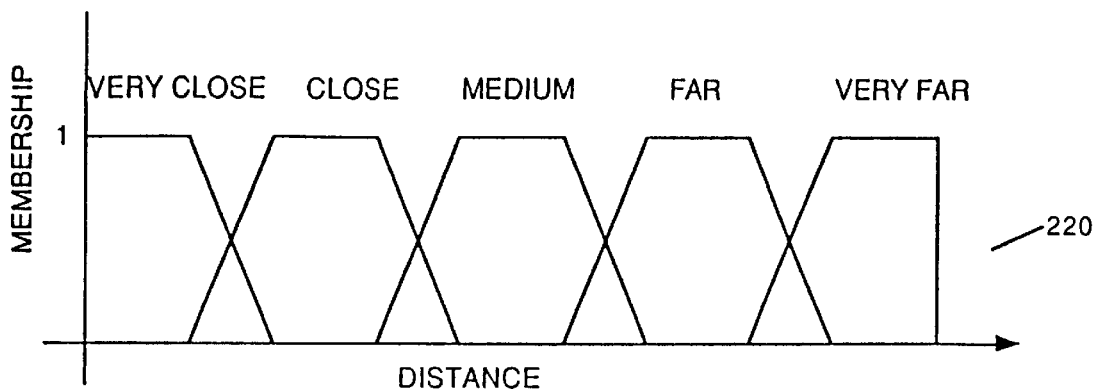
FIG. 10 is a schematic diagram illustrating typical input signal membership functions for fuzzy logic algorithms useful in the automobile-on-the-highway collision avoidance, warning and control system and method of FIG. 3.
Figure 10B:
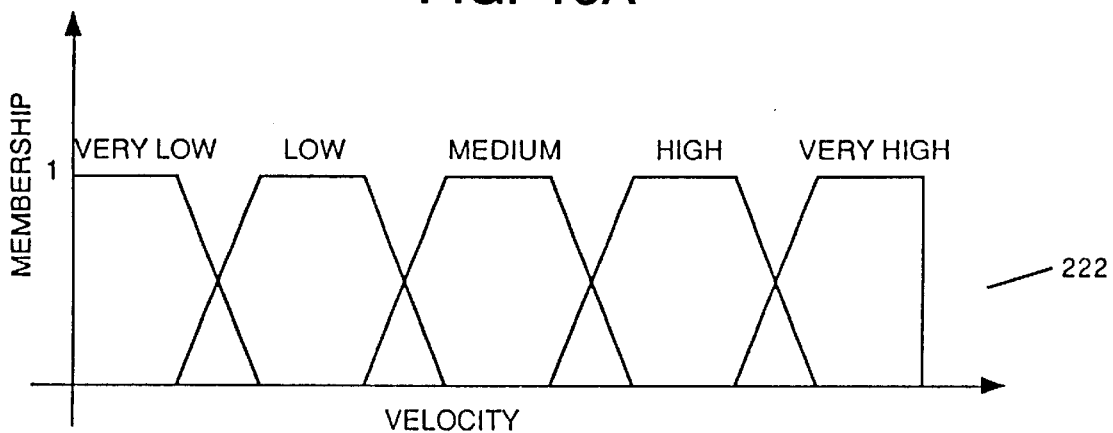
Figure 10C:
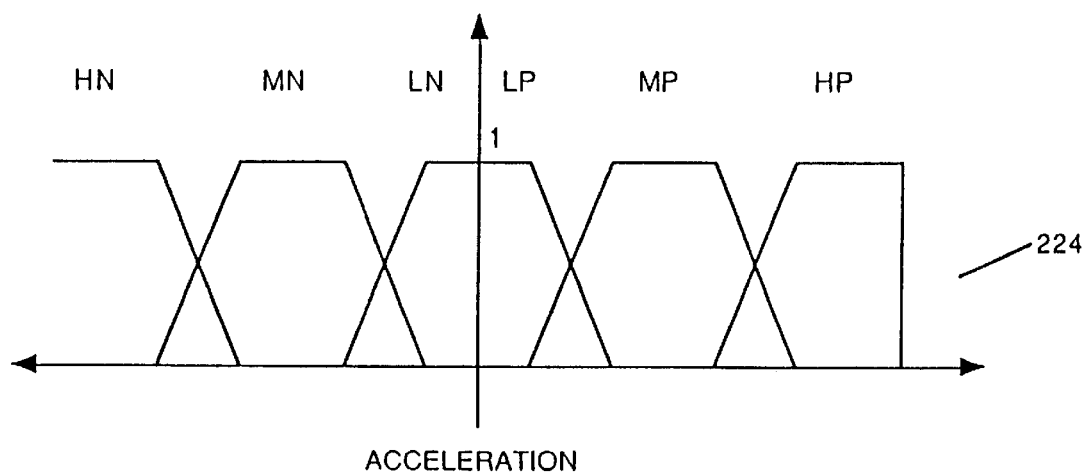

Control signals are derived using FAM's, 206, 208, 210 and 212. In practice, a large number of FAM's may be used to reflect different possible driving conditions and hazard scenarios. Each Fuzzy Associative Memory maps input control parameter combinations to appropriate output control signals. The output signals are defuzzified in the control signal generator 214 for input to the control circuiting 31 of FIG. 3. This controller in turn generates control signals for steering servos, braking servos, and display and warning signals.

i. FIG. 10 Fuzzy Logic Algorithm Inputs

The FAM's operate with input signals measuring, for example, distance to the hazard, relative velocity of the vehicle relative to the hazard and relative acceleration between the vehicle and the hazard. Membership functions 220, 222 and 224 for these three variables are shown in FIG. 10. The distance variable is classified using membership function 220 as being Very Close (VC), Close (C), Medium (M), Far (F) or Very Far (VF). Overlap between membership in the various grades is indicated by the overlapping trapezoids of FIG. 10. Certain distances are in more than one membership grade, being, for example, on the high end of being very close and the low end of being close.

Figure 11A:
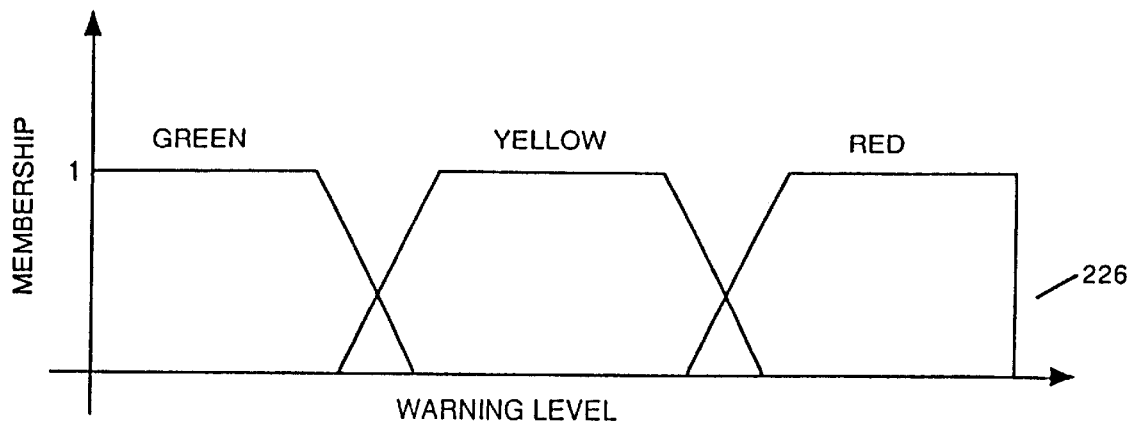
FIG. 11 is a schematic diagram illustrating typical output signal membership functions for fuzzy logic algorithms useful in the automobile-on-the-highway collision avoidance, warning, and control system and method of FIG. 3.
Figure 11B:
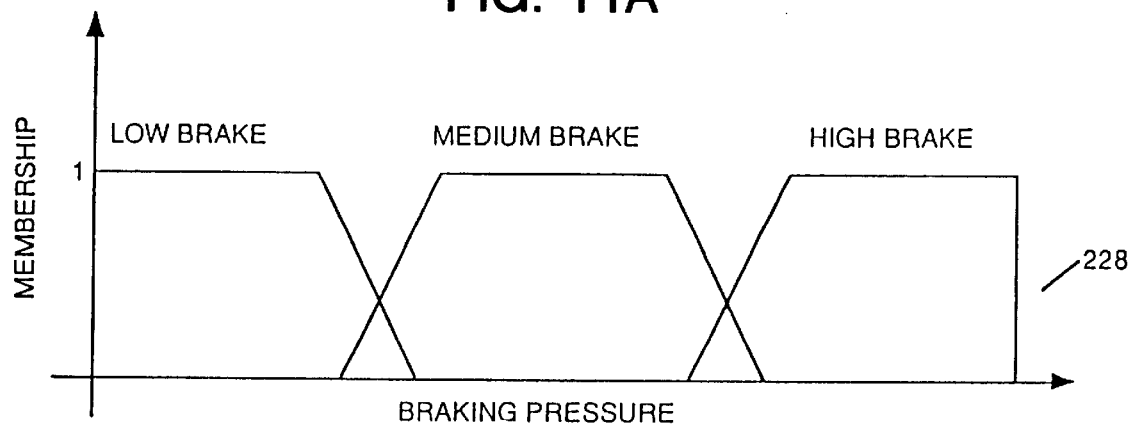
Figure 11C:
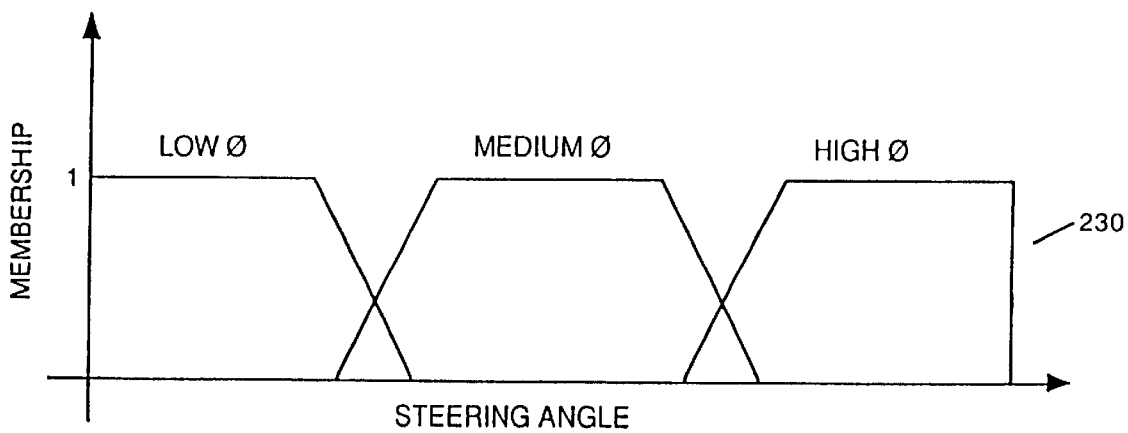

Similarly, the membership function 222 for relative velocity grades inputs as Very Low (VL), Low (L), Medium (M), High (H) and Very High (VH) with overlap of membership grades indicated by the intersection of membership grade trapezoids. Relative acceleration is graded as being either positive or negative. Deceleration of the vehicle's velocity relative to the hazard is classified as negative acceleration. Both positive and negative acceleration are classified using membership functions 224 as being Low (L), Medium (M) or High (H). Overlapping "fuzzy" membership is indicated with the overlapping trapezoids, permitting possible membership in multiple grades. For example, a particular velocity might have a degree of membership in grade "Low" of 0.2 and a degree of membership in grade "Medium" of 0.8.

j. FIG. 11 Fuzzy Logic Algorithm Outputs

Three outputs are generated from the Fuzzy Associative Memory or FAM bank: (1) Warning Level; (2) Braking Pressure and (3) Steering Angle. The Fuzzy output membership functions 226, 228 and 230 for these signals are shown in FIG. 11. Three trapezoidal membership functions are used for Braking Pressure: (1) Low Brake (LB), (2) Medium Brake (MB), and (3) High Brake (HB). Similarly, the Steering Angle is graded as Low Angle (LO), Medium Angle (MO), or High Angle (HO). Steering will be right or left depending on side obstructions, vehicles, or other conditions as indicated by the detection signal analysis block, 200, of FIG. 9. The warning level is indicated as being green, yellow, or red, depending on the danger level presented by the detected hazard. Continuous or discrete warnings can be generated on the output. Possibilities include visual light indicators of different intensity, continuously variable audible alarms, continuously variable color indicators, or other arrangements with possible combinations of visible and audible alarms. Warning indicators can be combined with actual video displays of vehicle situations including hazards and nearby objects. The synthetic speech signal generator, 42, of FIG. 3 may be used to generate synthetic speech signals defining spoken alarm warnings.

k. FIG. 12 FAM Maps

FIG. 12 depicts typical FAM's 240 for generating the output control signals from the input signals. Each FAM is segmented in six sections depending on the membership grade of the acceleration variable. For example, if the relative acceleration is High Positive (HP), the distance is Close (C), and the relative velocity is Medium (M), then the rule stated in the FAM requires grading the warning as Red (R), the Brakes as Medium (MB), and the steering as Small Angle (SO). As a logic statement or premise, this becomes:

If Acceleration is High Positive (HP), Distance is Close (C), and Velocity is Medium (M), then Warning equals Red (R), Braking equals Medium (M) and Steering Angle equals Small Angle (Sφ).

As Another Example

If Acceleration is Low Negative (LN), Distance is Medium (M) and Velocity is Very High (VH), then Warning equals Red, Braking equals Medium (MB), and Steering Angle equals Small Angle (Sφ).

Each premise has multiple control variables, each with possibly different degrees of membership. Using Fuzzy Logic principles, the minimum of the truth expression for each variable can be taken as the truth level of the premise.

For example, if the membership grade for accelerator High Positive (HP) is 0.6, for Distance Close (C) is 0.45, and for velocity medium (M) is 0.8, then the truth level for the Warning Red (R), Braking Medium (M) and Steering Angle Small (Sφ) will be 0.45.

With overlapping Fuzzy Membership grades, more than one FAM 240 will typically fire in response to a given set of values for the input control variables. Each FAM that fires will yield a particular set of truth value premises for each output variable. The result may include multiple output memberships with different truth values. For example, it may happen that two braking memberships result such as Low Braking with a truth value of 0.2 and Medium Braking with a truth value of 0.6. The corresponding overlapping membership functions can be defuzzified using these values by known techniques such as the centroid method The FAM's of FIG. 12 specify 150 such logic rules. Warning Levels, Braking Pressure, and Steering Angle become higher as the danger from the impending hazard increases. Additional FAM entries, not shown, are used to compensate for different driving conditions. For example, a different set of rules is used for inclement weather such as encountered with rain, ice or snow. Also, if side obstructions prevent steering adjustments, different braking scenarios are necessary. Additional FAMs may be used for different vehicle attitudes, or for skidding or spinning vehicles. Another set of FAM logic rules is also necessary in the event of a hazard to the rear of the vehicle, simultaneous front and rear hazards, or hazards approaching from the right or left side. Such extensions to the teachings presented herein are described below and expand the situations for which the warning system offers protection in avoiding or minimizing the effect of a collision.

The Control Signal Generator 214 of FIG. 9 serves to defuzzify the outputs from the Fuzzy Associative Memory. The defuzzification process converts the output fuzzy sets into particular values that can be used to exercise appropriate control. Various algorithms can be used to defuzzify the output including using the maximum indicated output value in the selected membership class or the centroid method which provides output signals based on center of gravity calculations depending on the range of outputs indicated by the different input variables.

k. Driver Override

Figure 13:
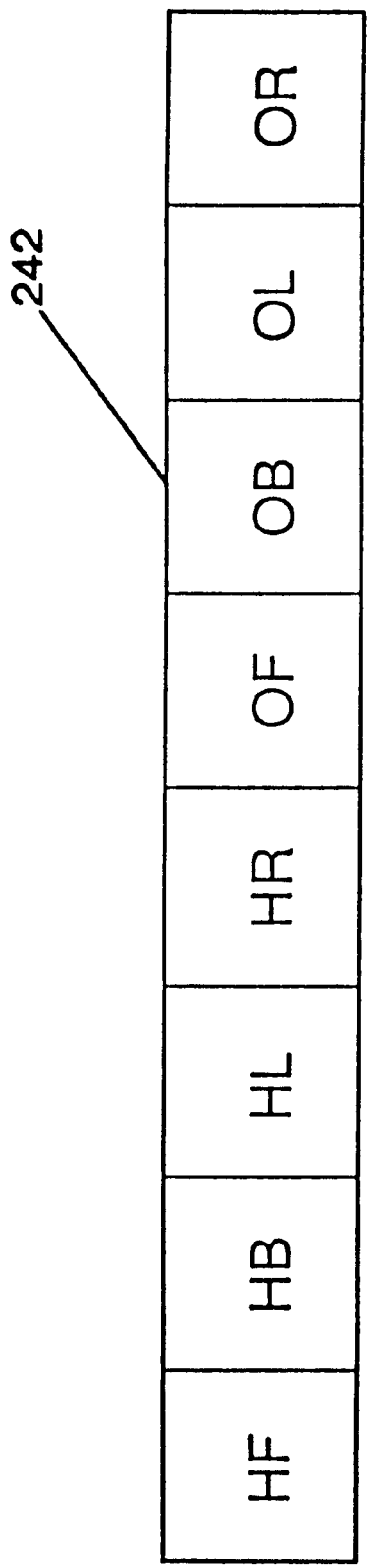
FIG. 13 is a schematic diagram of a hazard/object state vector useful in implementing the fuzzy logic vehicle warning and control system and method of the present invention.

An important attribute of the system is the driver override feature indicated by the override input to the detection signal analysis 200 of FIG. 9. The driver override permits the driver to take control at any time by manually braking or steering the vehicle. In practice, then, the automated system will first warn the driver and then provide immediate automatic corrective action if necessary. Having gained the drivers attention, the driver may then regain control and operate the vehicle to avoid the hazard. Thus the automatic system will normally only apply initial corrective action with the driver then taking control. Of course, if the driver fails to take over, the automated system will continue to operate the vehicle to avoid or minimize the danger presented by the hazard.

l. FIG. 13 Hazard/Object Vector

Figure 14:
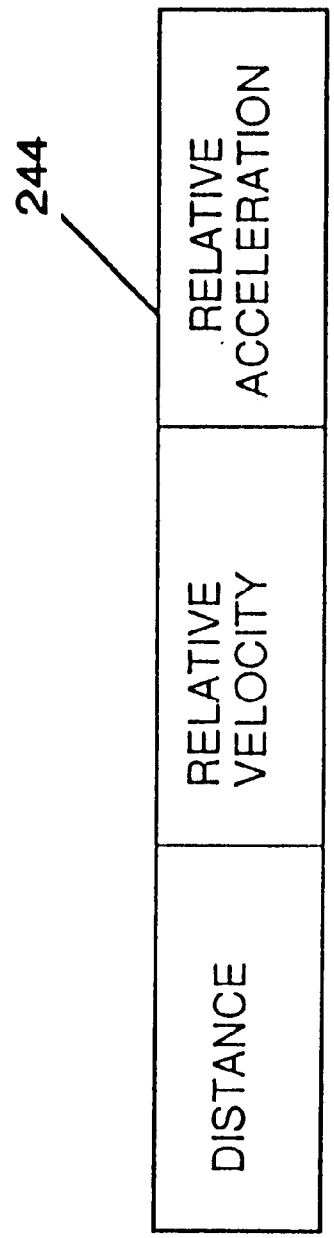
FIG. 14 is a schematic diagram of a hazard collision control vector useful in implementing the fuzzy logic vehicle warning and control system and method of the present invention.

FIG. 13 shows a Hazard/Object State vector 242 used in the motor vehicle warning and control system herein described. Each state vector has eight bits and represents a particular row of the possible state vectors of FIG. 15. Hazards and obstacles may occur to the front (HF), back (HB), left side (HL) or right side (HR) of the vehicle. For purpose of this discussion, a hazard is a potentially dangerous object such as another vehicle, post, pedestrian or other obstacle when the relative motion of the vehicle under control and the hazard could lead to a collision. An obstacle is an object to the front, rear, right side or left side of the vehicle that might become a hazard depending evasive action taken by the vehicle control system to avoid a hazard. A zero, "0", indicates no hazard or obstacle, a one "1", indicates the presence of a hazard or obstacle. As indicated in the state vector, multiple hazards and/or obstacles may be present.

m. FIG. 14 Hazard Collision Control Vector

FIG. 14 is a Hazard Collision Vector 244. This vector has three fields indicating respectively distance between the vehicle and a particular hazard, relative velocity between the vehicle and a particular hazard, and relative acceleration between the vehicle and a particular hazard. This vector is calculated for hazards detected using GPS kinematic motion vectors and by the image analysis computer 50 of FIG. 3 and various other sensors including radar/lidar sensors 56 in FIG. 3. The data in the hazard collision vector is used to rank hazard dangers when more than one hazard is simultaneously detected, and also as input to the fuzzy logic decision system implemented in decision control computer 38 and described below.

n. FIG. 15 Hazard/Object State Table

FIG. 15 is a table listing various possible combinations of hazards and obstacles that may be encountered by the motor vehicle warning and control system herein described. Each row is a possible state vector of type shown in FIG. 13. For example, state vector 44 corresponds to a situation where there is a hazard in front of the vehicle and obstacles to the left and right of the vehicle. Thus, in this situation, it is dangerous to steer the car to the left or right to avoid the hazard. Appropriate avoidance action is this case is to slow the car to minimize the possibility of a collision with the vehicle directly in front of the controlled vehicle.

As another example from the table of FIG. 15, in state vector 11, the hazard is to the left of the controlled vehicle. In this case, the hazard may be an approaching vehicle from the side wherein the relative motion of the two vehicles will, if not corrected, result in a collision. The controlled vehicle is clear of obstacles to the front and back but may not turn to the right because of a potentially hazardous obstacle located there.

Figure 16:
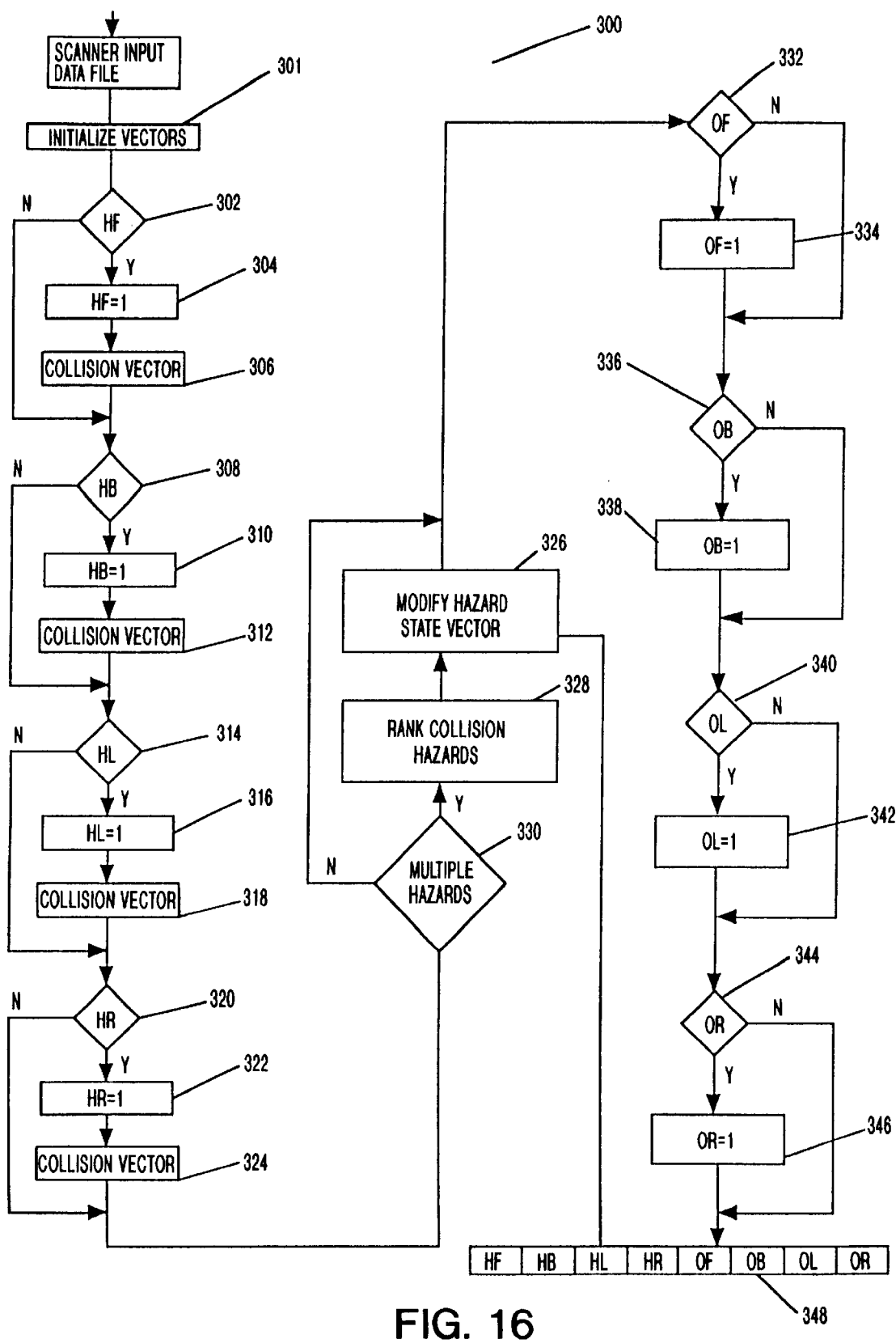
FIG. 16 is a representative exemplary more detailed logic flow diagram for the analysis of detection signals prior to accessing fuzzy logic control structures in the GPS automobile-on-the-highway collision avoidance, warning, and control system and method of the present invention.

The state vectors of FIG. 15 are determined by the Detection Signal Analysis block 200 of FIG. 9. The state vectors of FIG. 15 become part of the data file passed to the Fuzzy Associative Memory (FAM) selection block 204 and to the Control Signal Generator Defuzzifier 214 of FIG. 9.

o. FIG. 16 Analysis of Detection Signals Prior to Accessing FAM

FIG. 16 is more detailed drawing of the Detection Signal Analysis Block 200 of the Flow Diagram shown in FIG. 9. The more detailed Flow Diagram of FIG. 16 is used to set the variables in the State Vector FIG. 13 and to enter parameter values in Hazard Collision Vector of FIG. 14. As shown in FIGS. 9 and 16, the Detection Signal Analysis Block, 200, receives a Sensor Input Data File from the multiple image, motion and environment sensors of FIG. 3. This data file is used to evaluate potential hazards and set the various control parameters needed in the Hazard/Object State Vector, 242, and in the Hazard Collision Vector, 244, of FIGS. 13 and 14 respectively.

The process flow diagram of FIG. 14 first initializes the Hazard/Object State Vector, 242, and the Hazard Collision Vector, 244, in block 301, placing zeros in all control fields. Initial calculations are also made in this block using data from the sensor input data file to evaluate potential hazards and identify objects or obstacles to the control system for alerting the driver and, if necessary, exercising direct control over the operation of the vehicle.

Using this information, successive bits are set in the Hazard/Object State Vector as indicated in FIG. 16. Decision element 302 will cause the "HF" bit of the Hazard/Object State Vector to be set to "1" in Block 304 if a hazard is found in the front of the vehicle. Block 306 then calculates the Hazard Collision Vector corresponding to the frontal hazard for entering into the Hazard Collision Vector 244 of FIG. 14. Block 306 formats this data for use in the Fuzzy Logic vehicle control algorithm herein above described providing numerical values for distance, relative velocity, and relative acceleration between the controlled vehicle and the frontal hazard. These numerical values are used later in the control algorithm to rank collision hazards in the event multiple, simultaneous hazards are detected and the control system is called upon to alert the driver and possibly control the vehicle to minimize collision impacts while dealing with multiple dangerous situations.

If no frontal hazard is detected, the flow diagram of FIG. 16 branches around the frontal Hazard/Object State Vector Operation 304 and frontal Hazard Collision Vector Operation 306. Whether or not a frontal hazard is present, the flow continues to the rear hazard decision element 308 in FIG. 16. The operation here is basically identical to that described above from the frontal hazard calculation. If a hazard exists in back of the vehicle, the "HB" bit is set to logic "1" in Block 310 and the corresponding Hazard Collision Vector is calculated and formatted as described above for the frontal hazard situation in Block 312. If no hazard exits to the rear, the Blocks 310 and 312 are branched around.

The same procedure is followed for hazards to the left and right of vehicle in Blocks 314 through 324 of FIG. 16. In this way, the flow from Block 302 to 324 will set all of the hazard control bits of the State Vector 242 of FIG. 13 and provide necessary control parameters for the Hazard Collision Vector 244 of FIG. 14 for each hazard detected by the system.

If more than one of the bits, HF, HB, HL or HR are set in the blocks 302 to 324 of FIG. 16, multiple hazards exist representing a very dangerous situation for the vehicle. The existence of multiple hazards is indicated by decision element 330 based on the values of HF, HB, HL and HR. If multiple hazards do exist, it is necessary to evaluate and rank each detected hazard so that the most effective avoidance strategy can be adopted. The detailed collision hazards are analyzed and ranked in Block 328 of FIG. 16. Hazard ranking is achieved from the respective collision vectors of the indicated hazards as calculated in Blocks 306, 312 and 318 or 324. As discussed above, the parameter values in these blocks indicate numerical values for distance, relative velocities and relative accelerations. Using these parameters, the time to collision can be calculated for each detected hazard using well known kinematic equations. The most dangerous hazard then can be determined and control signals generated accordingly.

While time to collision is an important control parameter for multiple hazards, other factors may be considered and programmed into the Motor Vehicle Collision Avoidance Warning and Control System and Methods herein described. This is especially possible with advanced image analysis such as the neural network implementation of the image analysis computer 50 herein before described. Using such advanced, high speed image recognition techniques will allow identifying pedestrians, animals, particular vehicle types such as trucks or other large and potentially very destructive collision objects. Special algorithmic sensitivity to avoid certain obstacles based on their respective identifications may also be programmed into processing Block 328 of FIG. 16.

Having ranked the collision hazards in Block 328, the Hazard/Collision State Vector 242 can be modified in Block 326. This operation permits indicating to the FAM selection Block 204 of FIG. 9 which of the multiple detected hazards is currently the most dangerous. One approach is to downgrade all hazards except the most dangerous from a hazard to an obstacle in the Hazard/Collision state vector 242 of FIG. 16. This would ensure that the Fuzzy Associative Memory Selection Block 204 of FIG. 9 would direct the system to the particular FAM most responsive to the highest ranking hazard as determined in processing Block 328 of FIG. 16 while still instructing the system to avoid the other hazards.

It is also possible to set threshold levels for differences in parameter values as calculated and compared in the Ranking of Collision Hazards in Block 328 of FIG. 16. It may occur that multiple hazards are essentially of equal danger making it unwise to rank one higher than the other. In this case, Block 326 of FIG. 16 would not upgrade one hazard over another, but rather would use an input in the form of the Hazard/Object State Vector 242 that ranks both as hazards permitting selection of a Fuzzy Associative Memory element in Block 204 of FIG. 9 that is best responsive to the multiple hazards.

Figure 17:
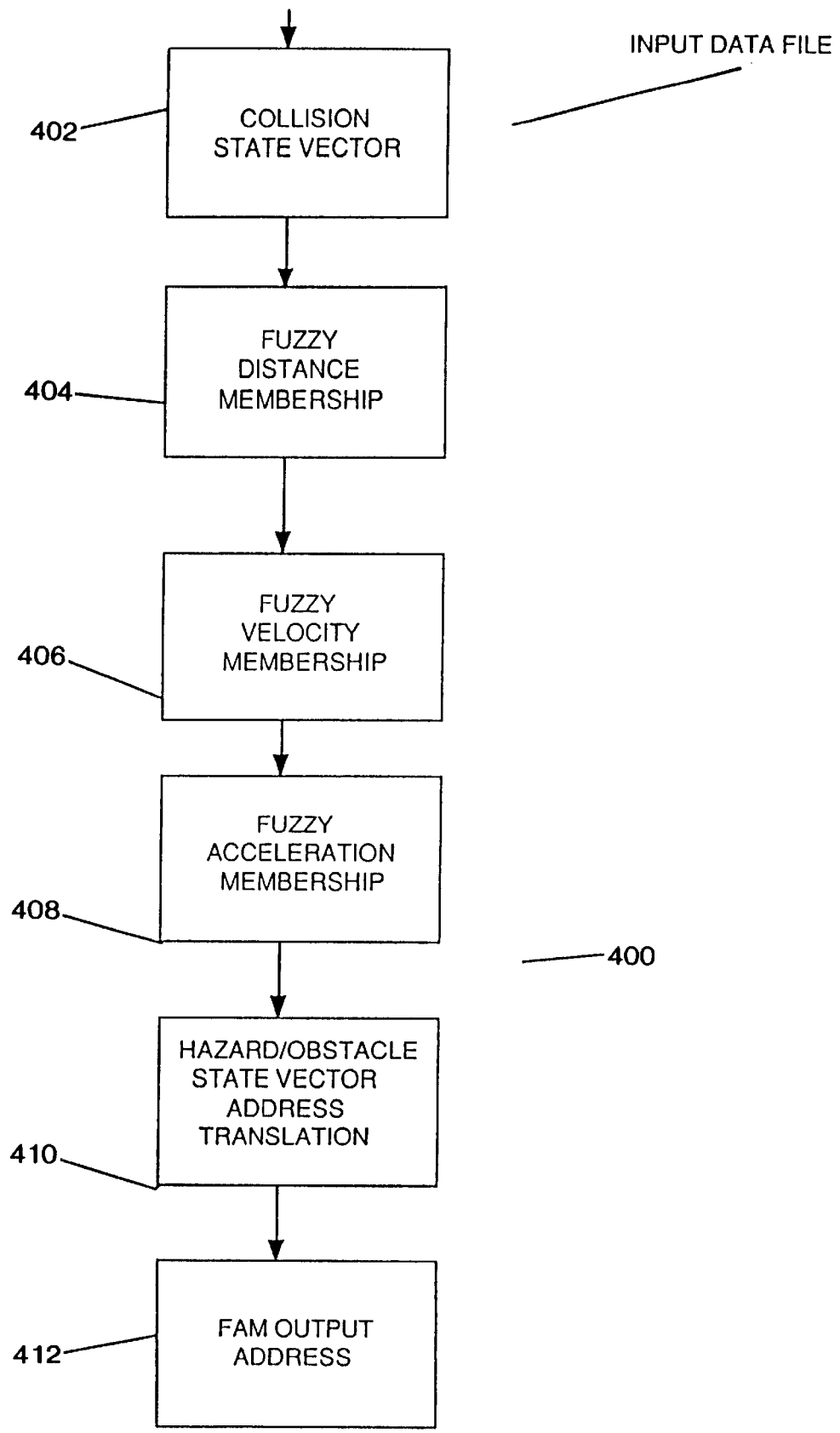
FIG. 17 is a block diagram of a more detailed logic flow diagram for the fuzzy associative memory ("FAM") selection processing of the present invention.

Having evaluated front, back, right side and left side hazards, the flow diagram of FIG. 16 proceeds to set the object or obstacle bits OF, OB, OL and OR in the vector 242. Recall that front, back, left and right side obstacles are herein defined as objects which are not currently hazards but may become a hazard if the wrong evasive action is taken. Examples include vehicles approaching in adjacent lanes that are not on a collision course, automobiles safely behind the controlled vehicle, a tree by the side of the road, and so forth. Blocks 332 through 346 set bits OF, OB, OL, and OR depending on the presence or absence of front, back, left or right objects to be avoided in controlling the vehicle.

p. FIG. 17 Detailed FAM Selection

FIG. 17 shows a more detailed flow diagram for the Fuzzy Associative Memory (FAM) Selection Block 204 of FIG. 9. The collision vector inputs contain numerical values for relative distance, velocity, and acceleration of the vehicle and the impending hazard. Block 204 uses this information as indicated in FIG. 9 to decide the respective fuzzy membership grades. Fuzzy distance membership is decided in block 404; fuzzy velocity membership is decided in block 406; and fuzzy acceleration membership is decided in block 408. Once decided, these membership grades serves as indices for addressing the Fuzzy Associative Memories (FAM's) as illustrated in FIG. 12. Membership is determined in the respective cases by limits as indicated in FIG. 10.

Figure 18:
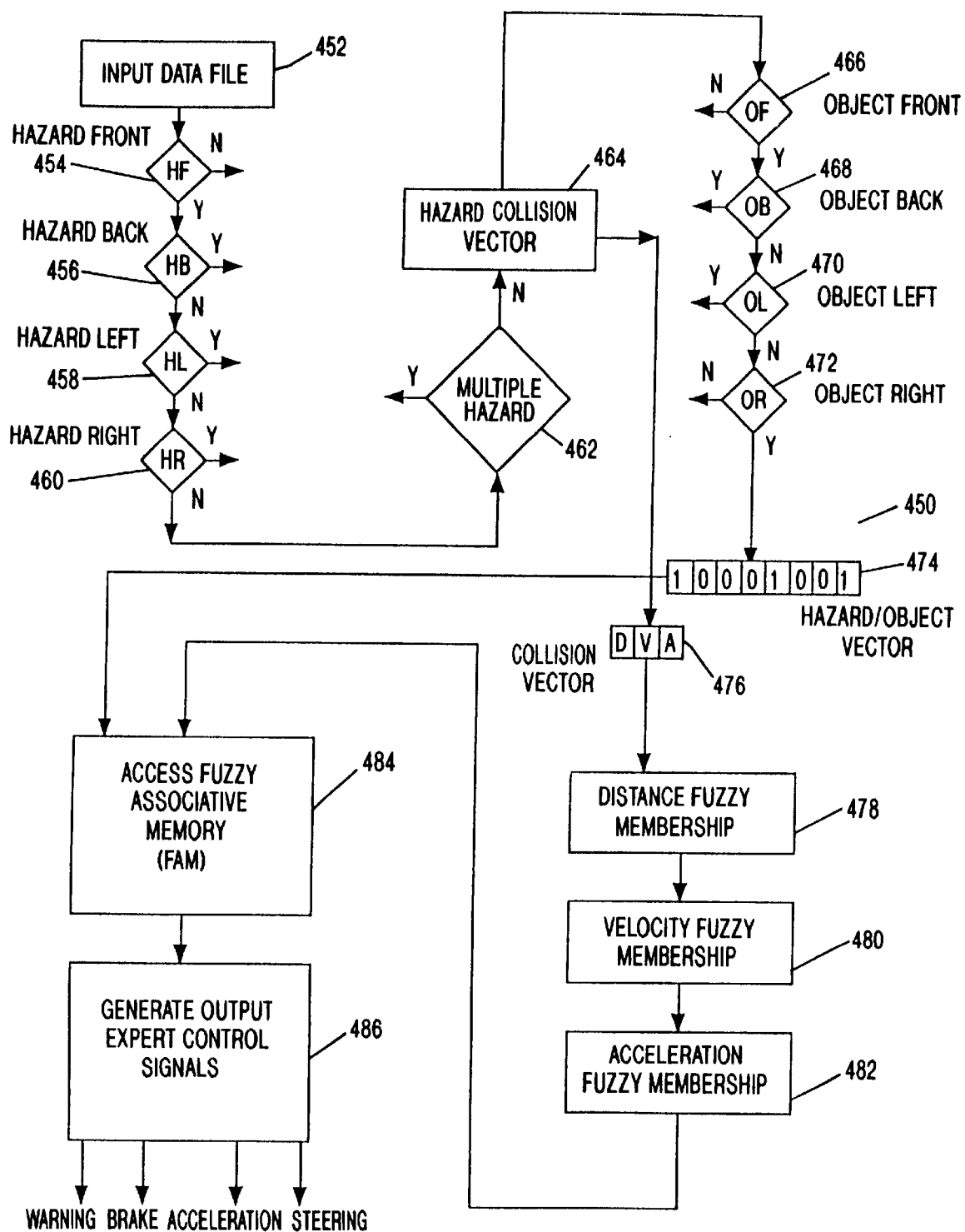
FIG. 18 is a more detailed representative exemplary system flow diagram illustrating the operation of the automobile-on-the-highway collision avoidance, warning, and control system and method.

The Hazard/Object State Vector also serves as an index into the total FAM. A simple address translation provides the actual address of the FAM locations appropriate for the detected hazard/object combination indicated in the vector. Control signals are then directly read from the FAM ensuring rapid overall system response. Signals are immediately generated to control braking, steering and warning systems as shown in FIG. 9. These output signals are likewise treated as fuzzy variables with membership classes as shown in FIG. 10. Defuzzification takes place in processing block 214 of FIG. 9 as herein above described.

q. FIG. 18 Example of System Operation

The Motor Vehicle Collision Avoidance Warning and Control System and Method herein above described is capable of dealing with hundreds, or even thousands, of different combinations of variables representing image analysis data and vehicle motion parameters. Indeed, given the continuous nature of the variables, in the limit the number of situations is infinite. Control signal generation is implemented using the above described parallel image processing, fuzzy logic, and fuzzy associative memories (FAM's). It is instructive to consider the system operation for a particular example situation. To this end, FIG. 18 illustrates the logical system flow based on the herein above described embodiment for the situation wherein the system detects a hazard in front of the controlled vehicle.

The operation of the system with this scenario is as outlined in FIG. 18. The sensor input 452 file is used to evaluate respective hazards in 454, 456, 558 and 460. The result is the indication that a frontal hazard exists but no other hazards are present. The hazard collision vector is prepared with numerical values for relative distance, velocity and acceleration as indicated in FIG. 18. The system flow continues with an analysis in blocks 466, 468, 470 and 472 of the presence of objects that might become hazards depending on the evasive action taken by the system. There is, of course, an object in the front of the vehicle which is in fact the hazard of concern. An object is also detected to the right side of the vehicle, limiting evasive action in that direction. Using this information, the Hazard/Object Vector 474 become [10001001].

Using the collision vector for the hazard in front of the controlled vehicle, the Fuzzy Membership Grades for distance, velocity and acceleration are evaluated in blocks 478, 480 and 482. Overlapping membership is possible depending on the values for the control variables. Using the combination of the Hazard/Object Vector and Fuzzy Membership Grades, the FAM is accessed in block 484 to determine the "expert" driving response control signals. The FAM entries indicate that the warning, braking, and angle steering to avoid the hazard or minimize danger to the vehicle. Defuzzification is used to determine exact output control variable values. The steering swerve, if any, will be to the left because of the object detected on the right side of the vehicle. With this information, appropriate warnings and displays are activated and control action is taken. Even if the driver does not respond to the warnings, the evasive control steps will tend to reduce the danger.

In the system of FIG. 9, a different FAM is used for each state vector of FIG. 15. Furthermore, as indicated in FIG. 12, different FAM's are used for different relative accelerations of the controlled vehicle and the impending hazard. There are a total of 68 state vectors in FIG. 15, and 6 different relative acceleration FAM's in FIG. 12 yielding a total of 408 different FAM's. The particular set of six FAM's of FIG. 12 correspond to state vectors with a hazard in front of the vehicle only and no obstacles in the rear nor on at least one side. Thus this set of FAM's may be used with state vectors 41, 42, and 43. It can be seen that a given set of FAM's may be used with multiple state vectors, thereby reducing the number of actual required Fuzzy Associative Memories or FAM's.

It is important to understand that the Motor Vehicle Collision Avoidance, Warning and Control System and Method herein described is based on the real time feedback control with Fuzzy Logic algorithms providing corrective action, the results of which are immediately analyzed by the warning control system using high speed image processing based on advanced parallel computing structures and/or neural network image analysis. Fuzzy Logic permits incremental control when necessary with continuous real-time feedback. The results of this control are immediately sensed and further control action activated as necessary to minimize the danger presented by the hazard. This continuous closed loop operation closely emulates the response of a human driver with immediate visual feedback, rapid evaluation of alternatives, and reflexive response in handling a vehicle in a hazardous situation.

It is also important to note that the response rules programmed in the FAM's are "expert" driving rules for the specified conditions. These rules are defined by expert drivers and represent the best possible driving responses. Computer simulations and studies may also be used in defining these rules. This "Expert System" is designed to minimize driving mistakes in hazardous situations. Note that even verbal warnings corresponding to the driving hazard/obstacle states are derived based on FAM defined expert driving responses. These warnings are delivered as described above via synthetic speech system 42 of FIG. 3. Thus the driver has the assistance of an on-board, real-time expert speaking to him or her and advising on the optimum driving response to a given roadway condition.

A further extension of the described system is responsive to visually or electronic detectable road markers such as lane markers, safe speed markers, curve warnings, or other hazard indicating devices installed along or in the roadway. The same system herein above described can be responsive to signals detected from such warnings and integrate this information into the overall vehicle control system.

r. Navigational Computer

In a modified form of the invention, it is noted that system of FIG. 3 may also perform as a navigational computer informing the driver of the motor vehicle containing same of the location of the vehicle by controlling the display 46 to cause it to display characters describing such location and/or a map showing the road or street along which the vehicle is travelling and its location and direction of travel there along by means of an indicia such as an arrow. The map may graphically or by means of characters include auxiliary information such as towns and cities along the route of travel, distances thereto, alternate routes of travel, road conditions, information on traffic density, hazardous conditions, weather ahead, sightseeing information and other information derived via short wave or other receiving or input means which outputs digital codes to other computers. Such information may be derived via earth satellite short wave transmission and/or local or roadside radio transmitters as the vehicle approaches and passes same and/or may be input via wire or short wave to a short wave receiver of the vehicle, such as its audio radio, receiver or an auxiliary receiver connected (via an analog-to-digital converter) to computer 31 via an input bus (not shown).

s. Trip Computer

The computers of FIG. 3 may also be programmed with trip or travel data derived via short wave, telephone line, microwave satellite or other communication system connected to a remote computer or by a select pluggable memory or recorder output. Vehicle instant location data codes received via GPS satellite location or electronic triangulation and the codes generated may be employed to properly access map defining graphics data and to effect the display of the proper map graphics on the heads-up or video display 46.

t. Keyboard/Microphone/Speech Recognition

A keyboard and/or microphone (located, for example, in the steering wheel or steering wheel hub) of the vehicle and a speech recognition computer such as computer 40 may be employed by the driver to generate command control signals for controlling the trip or navigational computer and effecting the display and/or playback of synthetic speech of select information on the location, direction of travel, distances to select locations, towns or cities, map information or other information as defined above.

u. Stored Video Images

In yet another form of the invention, the memory of the image analyzing computer 50 and/or an auxiliary memory therefor may contain image data derived from the output of a television camera on a vehicle travelling the same road, roads or route travelled by the driven vehicle. Such image data may be derived from archival memory once the expected route or routes of travel is known, which archival memory data was generated by computer processing the output of TV camera 54 during previous travel of the vehicle along the same route and/or from TV scanning of other vehicles. Such previously generated image signal data may be utilized to improve or effect proper operation of the system by providing data on stationery objects and background, or road images along the route of travel.

Thus the system and method herein disclosed may have (a) microphone and analog to digital converter of speech signals connected thereto as well as, (b) a short wave receiver of data, and, (c) an input keyboard as described.

v. Roadway Sensors/Transmitters/Autosteering Autospeed Control

Figure 19:
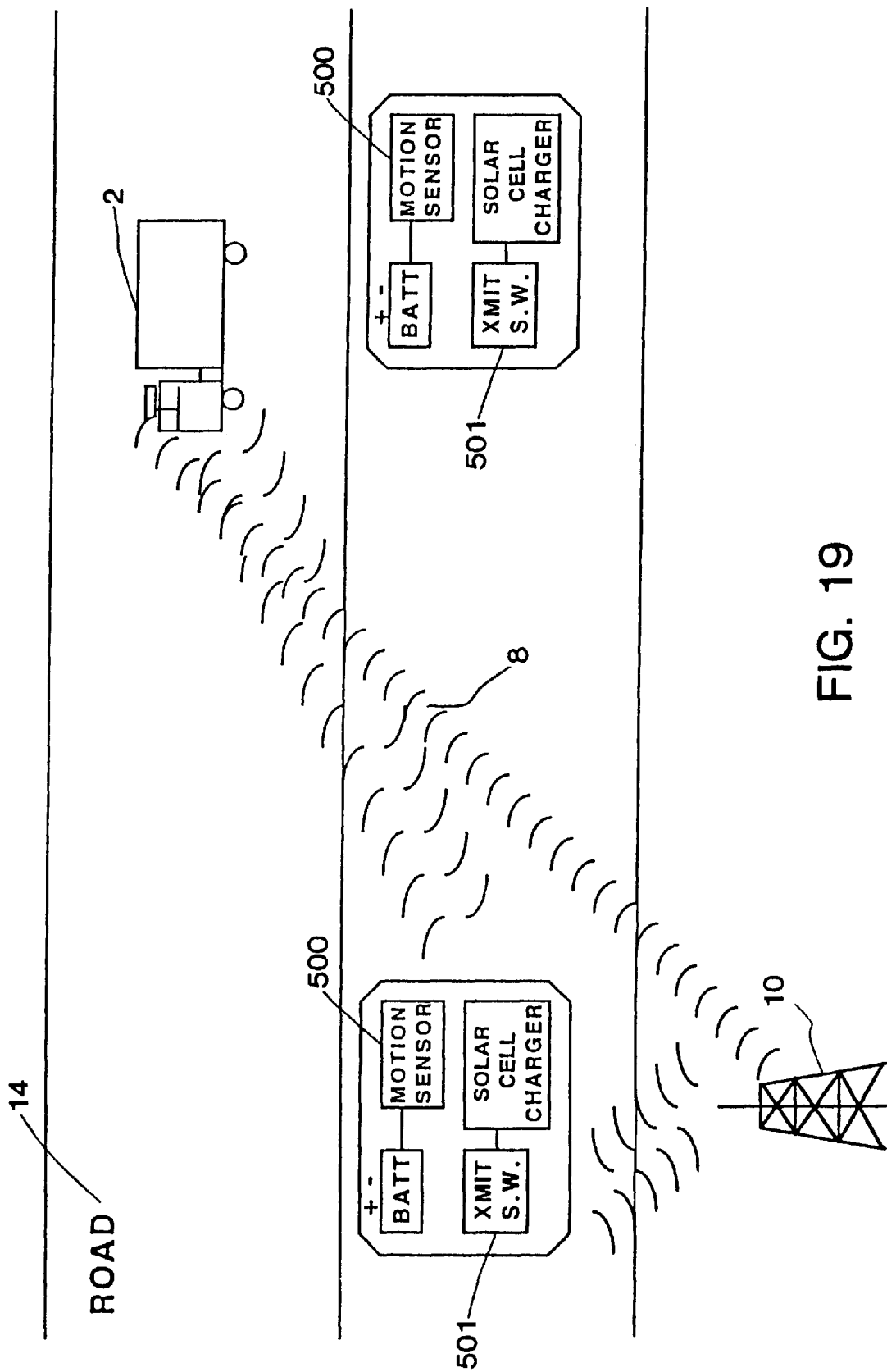
FIG. 19 is a plan schematic view of a motion sensor and short wave transmitter buried in a highway which may be used in the present invention to sense traffic conditions on a stretch of highway and transmit hazard/object data to a vehicle, a pseudolite tower or a control center as described in the present invention.

It is also noted that system herein disclosed may be employed with suitable software as described above, or with additional sensors or sensing systems added to the system to sense traffic lane times along roads and highways (FIG. 19), active and/or passive signal or code generators 500 and short-wave transmitters 501 buried in the highway and/or at the side of the road travelled and/or supported by other vehicles, to automatically operate the vehicle containing such computerized system during the normal travel of such vehicle between two locations and/or destinations. For example, select highways or select sections of a highway may be designed and operable to accommodate (only) vehicles which are equipped with disclosed system which is operable to steer and control the speed of the vehicle in accordance with control signals generated by the decision control computer 38 when it is specially programmed to guide and control the speed of the vehicle in its travel along the select highway or road. To supplement the signals generated by the image analyzing computer 50, or as a replacement therefor, an auxiliary computer 50A, not shown, may be provided connected to the control circuits 31 and operable to receive and analyze information signals or codes generated as a result of digitizing the output(s) of one or more sensors on the vehicle sensing (a) highway marker or lane delineating lines, (b) curb and/or divider markings, (c) embedded or roadside code generators (FIG. 19), (d) electro-optically scannable indica or reflectors along and/or at the side of the road or a combination thereof. The radio transceiver 34 may receive radio-frequency codes generated locally as the vehicle passes while one or more electro-optical scanning systems employing solid state lasers and photodetectors of the reflected laser light may be employed to provide such coded information which is processed by the computer(s) 50 and/or 50A to provide vehicle control or operational signals which may be used per se or by the decision control computer 38 to control and maintain control of the vehicle to keep it travelling in a select lane and at a select speed in accordance with the set speed for the highway or the select lane thereof along which the vehicle is travelling and/or the speed of other vehicles ahead of the computer controlled vehicle containing system 10.

w. Auto Monitor of Driver's Erratic Driving Patterns and Unusual Vehicle Attitudes and Warning A further enhancement of the herein defined automated vehicle warning system makes use of a separate driver monitoring computer to constantly monitor vehicle attitude and driver actions and reactions while operating the vehicle. This type of monitoring is especially helpful in determining driver fatigue or detecting erratic driving patterns caused for example, from driving while intoxicated or under the influence of drugs. Erratic driving patterns may include swerving in steering of the vehicle, uneven or unnatural acceleration or deceleration, combinations of unusual or unnatural driving patterns, driving much slower or faster than other vehicles around the automobile being monitored, unnatural sequences of exercising control over the vehicle such as alternate braking and acceleration, braking or stopping in a flowing traffic stream, or excessive acceleration. Also, driving patterns inconsistent with surrounding vehicle motion can be detected such as any action by the driver that increases rather than decreases the possibility of a collision in a dangerous or hazardous situation. A separate driver monitoring system can detect all of these situations and respond by warning the driver or, if necessary, activating the automated vehicle control system.

x. Warning Other Vehicles of Imminent Collision

The motor vehicle collision avoidance, warning and control system can warn other vehicles of an impending or detected possible collision by flashing exterior warning lights and/or sounding audible alarms including the horn. The system may also warn other vehicles via radio transmission which activates warnings in adjacent vehicles of dangerous situations. Drivers of other vehicles can then be warned by audible or visual warning devices and/or displays and can take necessary evasive action. The radio signal can also alert police or highway patrolmen of dangerous driving patterns by identifying the vehicle. As a further extension, the vehicle satellite Global Position System (GPS) and Psuedolite electronics permit precision vehicle location, which information can be transmitted with the hazard warning signals, permitting law enforcement and roadway safety personnel to precisely locate the vehicle detected as being in a hazardous situation caused by the driver or other conditions.

y. Black Box Recorder

A further enhancement of the vehicle collision avoidance warning and control system and method disclosed herein makes use of a recorder to record the last several minutes of driving action for future analysis. Such recordings permit reconstruction of events leading up to collision permitting more accurate determination of causes including fault.

z. Security Monitoring Areas for Security Purposes

The systems and methods described above may also be employed for automatically observing, from ground or airborne platforms, and computer analyzing the presence, locations, movements and activities of people and vehicles in an observed area or areas of the earth being monitored for security purposes. For example, in the case of optimizing firefighting operations, the disclosed systems may be used to observe fire fighting equipment and/or firefighters wearing background-contrasting, reflective yellow clothing by direct or infrared GPS/DGPS/LPS airborne and/or ground observation backed up by multiple supplemental scanning technologies and computer processors, corroborated by the firefighters' mobile, handheld GPS personal transceivers, all of which enable the computer processors at the observing or base location to make realtime decisions regarding the personnel's endangerment or to direct improved firefighting response if they are not in the right location relative to hotspots of fire. In the case of non-firefighters being secretly observed, such as, terrorists or guerilla activities where local GPS receivers are not available, the disclosed systems are completely functional to provide precise positioning of the observed activities and optimize operations relative thereto.

The foregoing description of a preferred embodiment and best mode of the invention known to applicant at the time of filing the application has been presented for the purposes of illustration and description. It is not intended to be exhaustive or to limit the invention to the precise form disclosed, and obviously many modifications and variations are possible in the light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A computer controlled collision avoidance and warning method comprising the acts of:
    receiving continuously from a network of satellites on a first communication link at one of a plurality of vehicles GPS ranging signals for initially accurately determining the one vehicle's position on a surface;
    receiving continuously at the one vehicle on a second communication link from one of a plurality of stations having a known fixed position on the surface DGPS auxiliary range signals, including correction signals for correcting propagation delay errors in the GPS ranging signals and pseudolite signals for assistance in making further measurements for still further improving the accuracy of the GPS ranging signals and of determining the one vehicle's position on the surface;
    determining continuously at the one vehicle from the GPS, DGPS, and pseudolite signals the one vehicle's kinematic tracking position on the surface with centimeter accuracy,
    providing information descriptive of particular hazards and objects in the pathway of the one vehicle derived from conventional image analysis systems carried on the one vehicle;
    communicating the one vehicle's status information including the information descriptive of particular hazards and objects in the pathway of the one vehicle and the kinematic tracking position to each other one of the plurality of vehicles and to the one station or one of a plurality of control centers;
    analyzing the information descriptive of the particular hazards and objects and analyzing the kinematic tracking positions and the status information to identify and evaluate the particular hazards and objects in the pathway of the one vehicle;
    determining in a fuzzy logic associative memory the one vehicle's expert driving response relative to the particular hazards and objects in the pathway of the one vehicle;
    generating expert driving response control signals for actuating a plurality of control systems of the one vehicle in a coordinated manner;
    intelligibly indicating a warning of the particular hazards and objects in the pathway of the one vehicle; and
    coordinating actuating the control systems of the one vehicle with the control signals to operated the one vehicle laterally and longitudinally in real time to avoid contact with the particular hazards and objects in the pathway.

2. The method of claim 1 where the pseudolite signals include carrier phase signals and the further measurements include ambiguity resolution measurements.

3. The method of claim 1 wherein the first communication link is a GPS receiver and the second communication link is a GPS transceiver each operating on separate predetermined frequencies.

4. The method of claim 1 including a third satellite communication link for auxiliary control information.

5. The method of claim 1 including pathway scanning technology providing e information descriptive of particular hazards and objects in the pathway of the vehicle.

6. The method of claim 2 wherein the pathway scanning technology comprises television technology.

7. The method of claim 1 wherein the analyzing act includes:
    analyzing the one vehicle's attitude; and
    wherein the act of determining the one vehicle's expert response further comprises the act of:
    attitude compensating the expert response.

8. The method of claim 1 wherein the communicating act further comprises the act of:
    communicating on the second communication link.

9. The method of claim 4 wherein the communicating act further comprises the act of:
    communicating on a third control communication link via a separate control transceiver in the one vehicle.

10. The method of claim 1 wherein the kinematic tracking position information includes position, velocity and acceleration Vectors.

11. The method of claim 1 wherein said GPS ranging signals; said DGPS auxiliary range signals, including said correction signals for correcting propagation delay errors in the GPS ranging signals and pseudolite signals for assistance in making further measurements for still further improving the accuracy of the GPS ranging signals and of determining the one vehicle's position; and said information descriptive of particular hazards and objects in the pathway of the one vehicle and the kinematic tracking position of the one vehicle are received from another one or each other one of the plurality of vehicles, the one station, one of the control centers or a communications satellite.

12. The method of claim 1 wherein the communicating act further comprises the act of:
communicating using a speech synthesizer computer which recognizes the voice of the one vehicle's operator.

13. The method of claim 12 further comprising the act of:
displaying on a heads up display in the one vehicle a response to the one operator's speech received in the one vehicle.

14. The method of claim 1 further comprising the acts of:
detecting multiple particular hazards and objects in the pathway relative to the vehicle;
wherein the analyzing act includes analyzing all particular hazards and objects and ranking all potential hazards and objects for determining the most effective avoidance strategy; and
wherein the act of determining the one's expert response further comprises the act of:
determining with the fuzzy logic associative memory and fuzzy logic algorithms one vehicle's expert response relative to each hazard and object.

15. The method of claim 14 wherein the detecting act includes:
detecting the hazards and objects by scanning with one or more television cameras supported on the one vehicle; and
wherein the analyzing act includes:
processing and analyzing digital signals indicative of video images detected by the one or more television cameras.

16. The method of claim 14 wherein the detecting act includes:
detecting the hazards and objects by scanning with one or more radar-based ranging mechanisms supported on the one vehicle;
wherein the analyzing act includes:
processing and analyzing digital signals indicative of the bearing, distance, and elevation to the hazards and objects detected by the radar-based ranging mechanisms.

17. The method of claim 14 wherein the detecting act further comprises:
detecting the hazards and objects on or about the pathway in the vicinity of the one vehicle by scanning a motion sensing device embedded in the pathway and transmitting to the one vehicle signals indicative of the bearing, distance and elevation of the detected hazards and objects relative to a reference.

18. The method of claim 14 wherein the hazards and objects include fixed or moving, or known or unknown obstacles.

19. The method of claim 14 wherein the communicating act includes:
communicating the one vehicle's status information describing selected ones of the detected hazards and objects, and
the receiving act includes:
receiving the others' status information describing selected ones of the others' detected hazards and objects.

20. The method of claim 1 wherein the analyzing act further comprises:
analyzing inputs from the one vehicle's input describing characteristics of the operator of the one vehicle.

21. The method of claim 1 wherein the analyzing act further comprises the act of:
calculating a collision vector for each hazard and object in the pathway of the one vehicle.

22. The method of claim 1 wherein the act of determining the one vehicle's expert response includes:
determining a hazard and object avoidance maneuver.

23. The method of claim 1 wherein the act of intelligibly indicating a warning further comprises the act of:
warning the operator of the one vehicle's expert response, and
wherein the coordinately actuating act further comprises coordinately actuating the control systems only with an imminent collision.

24. The method of claim 1 wherein the warning act further comprises the act of:
visually indicating the existence of a hazard or object in the pathway of the vehicle.

25. The method of claim 24 wherein the act of visually indicating the existence of a hazard or object in the pathway of the vehicle further comprises the act of:
displaying a visually perceptible symbol in the one vehicle.

26. The method of claim 24 wherein the act of visually indicating further comprises the act of:
displaying the relative position and motion between the one vehicle and a hazard and object in the pathway of the one vehicle.

27. The method of claim 1 wherein the warning indicating act further comprises the act of:
repeatedly actuating a horn system or a warning light system.

28. The method of claim 1 wherein the warning indicating act further comprises the act of:
generating sounds of select speech of warning of hazard or object in the pathway of the vehicle.

29. The method of claim 28 wherein the generating sounds of select speech act further comprises the act of:
recommending the one vehicle's expert response.

30. The method of claim 29 wherein recommending the one vehicle's expert response act further comprises the act of:
synthetically generating warning words of speech depending on the kind of expert response necessary to avoid the hazard or object.

31. The method of claim 2 wherein the coordinately activating step further comprises the act of:
operating one or more of the following systems depending on the kind of expert response determined by the fuzzy logic associative memory and fuzzy logic algorithms; acceleration, steering and communication system.

32. The method of claim 1 further comprising the act of:
repeatedly repeating the communicating act.

33. A GPS-based vehicle proximate detection method comprising the acts of:
receiving continuously from a network of satellites on a first communication link at one of a plurality of vehicles GPS ranging signals for determining the one vehicle's position relative to a surface;
receiving continuously at the one vehicle on a second communication link from one of a plurality of stations having a known fixed position on the surface DGPS auxiliary range correction signals for correcting propagation delay errors in the GPS ranging signals and pseudolite signals for assistance in making further measurements for still further improving the accuracy of the GPS ranging signals and of determining the one vehicle's position relative to surface;

determining continuously at the one vehicle from the GPS, DGPS, and pseudolite signals the one's kinematic tracking position relative to the surface with centimeter accuracy;

determining the one vehicle's attitude relative to a predetermined direction over the surface using multiple antennae supported on the extremities of the one vehicle coupled to the GPS receiver and phase comparing the GPS signals simultaneously received at the antennae;

communicating the one vehicle's status information including the kinematic tracking position to each other one of the plurality of vehicles and to the one station or one of a plurality of control centers, and receiving at the one vehicle each of the others' of the plurality of vehicles status information including the others' kinematic tracking position;

analyzing in a neural network the one vehicle's attitude, and the kinematic tracking positions and status information to identify and evaluate proximity of each other one of the plurality of vehicles relative to the one vehicle;

determining in a fuzzy logic associative memory the one vehicle's attitude compensated expert response relative to each other vehicle;

generating expert response control signals for actuating a plurality of control systems of the one vehicle in a coordinated manner; and coordinately actuating the control systems of the one vehicle with the control signals to operate the one vehicle laterally and longitudinally in real time relative to the proximate position of the other vehicles.

* * * * *